US006889385B1

(12) United States Patent
Rakib et al.

(10) Patent No.: US 6,889,385 B1
(45) Date of Patent: May 3, 2005

(54) HOME NETWORK FOR RECEIVING VIDEO-ON-DEMAND AND OTHER REQUESTED PROGRAMS AND SERVICES

(75) Inventors: Selim Shlomo Rakib, Cupertino, CA (US); Fabrice Michel Raymond Quinard, San Jose, CA (US); Peter Albert Monta, Palo Alto, CA (US)

(73) Assignee: Terayon Communication Systems, INC, Santa Clara, CA (US)

( * ) Notice: Subject to any disclaimer, the term of this patent is extended or adjusted under 35 U.S.C. 154(b) by 636 days.

(21) Appl. No.: 09/602,265

(22) Filed: Jun. 23, 2000

Related U.S. Application Data

(63) Continuation-in-part of application No. 09/483,681, filed on Jan. 14, 2000.

(51) Int. Cl.[7] ............................................. H04N 7/173
(52) U.S. Cl. ........................ 725/119; 725/82; 725/87; 725/93; 725/78; 725/133; 725/141; 709/247
(58) Field of Search ............................ 725/27, 87, 93, 725/95, 96, 91, 82, 119, 118, 116, 114, 103, 48, 49, 78, 111, 110, 109, 131, 139, 151, 100, 133, 141; 709/247, 246

(56) References Cited

U.S. PATENT DOCUMENTS

| | | | |
|---|---|---|---|
| 4,829,569 A | 5/1989 | Seth-Smith et al. .......... 380/10 |
| 4,894,789 A | 1/1990 | Yee ............................. 364/521 |
| 5,093,718 A | 3/1992 | Hoarty et al. .................. 358/84 |
| 5,130,983 A | 7/1992 | Heffner, III ................. 370/85.8 |
| 5,133,079 A | 7/1992 | Ballantyne et al. .......... 455/4.1 |
| 5,195,092 A | 3/1993 | Wilson et al. .............. 370/94.2 |
| 5,200,993 A | 4/1993 | Wheeler et al. ............... 379/96 |
| 5,247,347 A | 9/1993 | Litteral et al. ................ 358/85 |
| 5,373,288 A | 12/1994 | Blahut ................... 340/825.08 |
| 5,408,465 A | 4/1995 | Gusella et al. ................ 370/17 |
| 5,550,578 A | 8/1996 | Hoarty et al. .................. 348/7 |
| 5,572,517 A | 11/1996 | Safadi .......................... 370/50 |
| 5,572,528 A | 11/1996 | Shuen ..................... 370/85.13 |
| RE35,774 E | 4/1998 | Moura et al. ................. 348/12 |
| 5,828,655 A | 10/1998 | Moura et al. ............... 370/236 |
| 5,878,277 A | 3/1999 | Ohta ........................... 395/857 |
| 6,101,543 A * | 8/2000 | Alden et al. ................ 709/229 |
| 6,216,171 B1 * | 4/2001 | Isono et al. ................. 709/250 |
| 6,249,320 B1 * | 6/2001 | Schneidewend et al. .... 348/569 |
| 6,317,885 B1 * | 11/2001 | Fries ........................... 725/109 |
| 6,385,656 B1 * | 5/2002 | Appelman ................... 709/247 |
| 6,396,531 B1 * | 5/2002 | Gerszberg et al. ........ 348/14.01 |
| 6,477,179 B1 * | 11/2002 | Fujii et al. ................... 370/466 |
| 6,577,642 B1 * | 6/2003 | Fijolek et al. .............. 370/465 |
| 6,598,231 B1 * | 7/2003 | Basawapatna et al. ...... 725/120 |
| 6,601,106 B1 * | 7/2003 | Moberg et al. ............. 709/238 |
| 6,633,547 B1 * | 10/2003 | Akatsu et al. .............. 370/255 |
| 6,637,032 B1 * | 10/2003 | Feinleib ...................... 725/110 |
| 6,678,740 B1 * | 1/2004 | Rakib et al. ................ 709/247 |

\* cited by examiner

Primary Examiner—John Miller
Assistant Examiner—Annan Q. Shang
(74) Attorney, Agent, or Firm—Ronald Craig Fish; RC Fish Law Corp

(57) ABSTRACT

A system for providing video-on-demand service, broadband internet access and other broadband services over T-carrier systems including a pull multiplexer cherrypicker at the head end is disclosed. The pull multiplexer receives upstream requests and cull out MPEG or other compressed video packets, IP packets and other data packet types to satisfy the requests or to send pushed programming downstream. The downstream can be DSL or HFC. Each customer has a cable modem, DSL modem or a gateway which interfaces multiple signal sources to a LAN to which settop decoders, digital phones, personal computers, digital FAX machines, video cameras, digital VCRs etc. can be attached. Each gateway can coupled the LAN to a DSL line or HFC through a cable modem or a satellite dish through a satellite transceiver. A PSTN and conventional TV antenna interface is also provided.

24 Claims, 21 Drawing Sheets

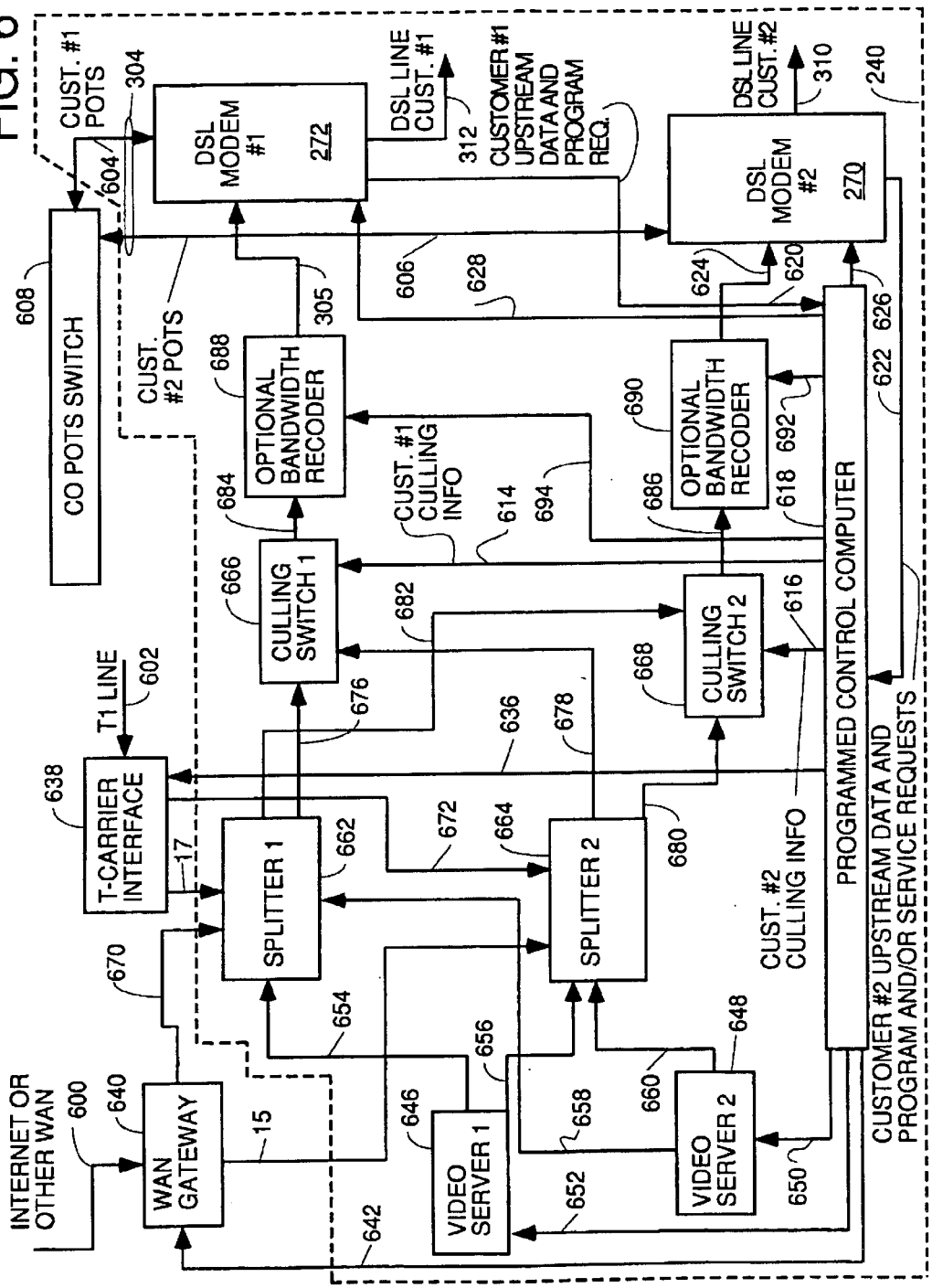

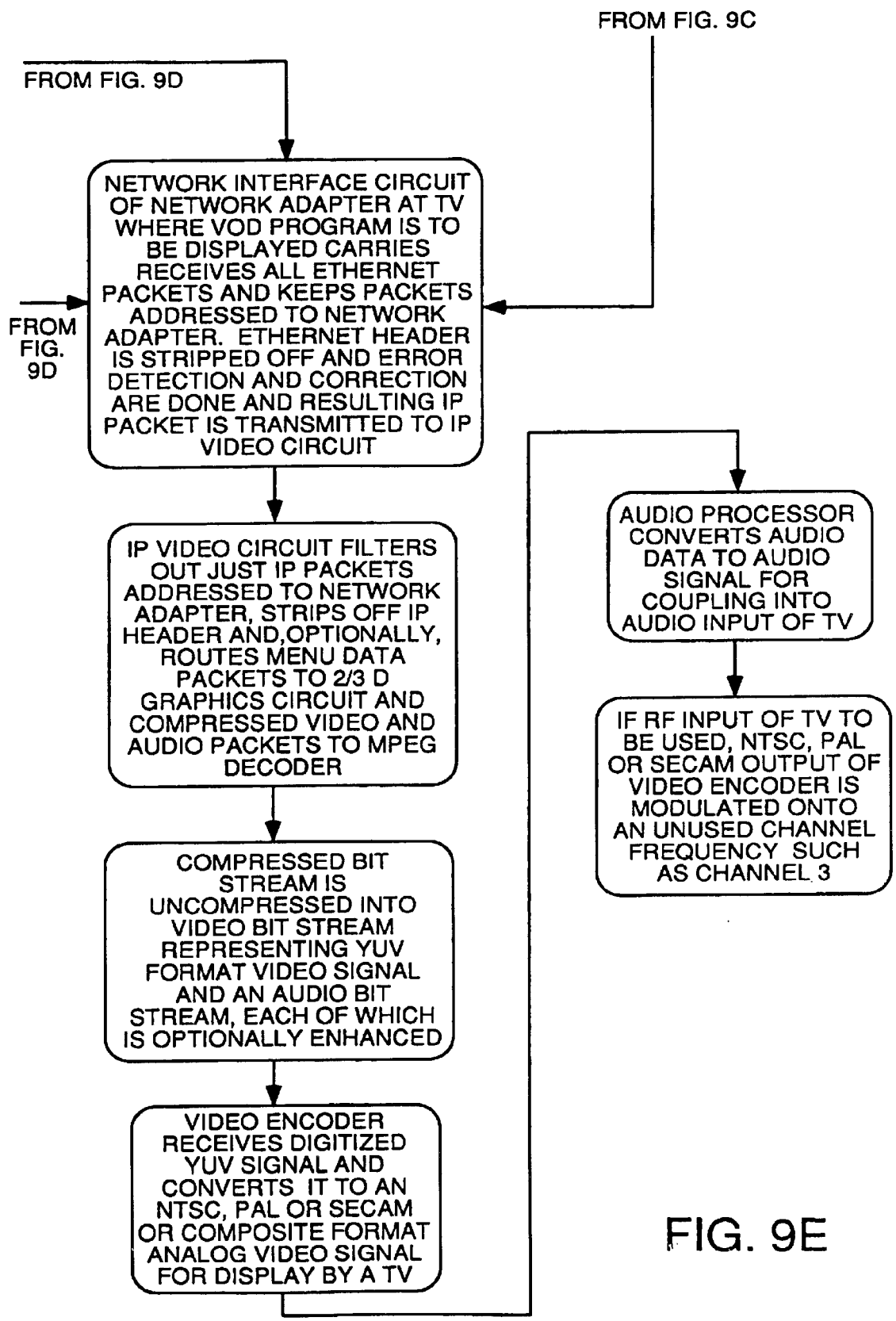

HOME NETWORK FOR RECEIVING VIDEO-ON-DEMAND AND OTHER REQUESTED PROGRAMS AND SERVICES

This is a continuation-in-part of a co-pending U.S. patent application entitled HOME NETWORK FOR ORDERING AND DELIVERY OF VIDEO ON DEMAND, TELEPHONE AND OTHER DIGITAL SERVICES, filed Jan. 1, 2000, Ser. No. 09/483,681 which is hereby incorporated by reference.

FIELD OF USE

The invention finds utility in the head end offices of cable TV operators, ADSL system head end and potentially wireless head ends for delivery of video-on-demand programming in digital format as well as other services such as digital. telephony or wideband internet access.

BACKGROUND OF THE INVENTION

Most cable TV systems in the prior art have been broadcast only where individual programs were modulated onto 6 MHz bandwidth analog RF carriers that were frequency division multiplexed. As the internet became more popular: and telephone services became deregulated and other digital services became more popular, there has arisen the notion of delivery of digital data over cable TV systems in a portion of the bandwidth unused by the analog CATV programs. This gave rise to cable modems.

Video-on-demand services have been known in hotel television systems for several years. Video-on-demand services allow a user to select a program to view and have the video and audio data of that program transmitted to her television set. Examples of such systems include: U.S. Pat. No. 6,057,832 disclosing a video on demand system with a fast play and a regular play mode; U.S. Pat. No. 6,055,560 disclosing an interactive video-on-demand system that supports functions normally only found on a VCR such as rewind, stop, fast forward etc.; U.S. Pat. No. 6,055,314 which discloses a system for secure purchase and delivery of video content programs over distribution networks and DVDs involving downloading of decryption keys from the video source when a program is ordered and paid for; U.S. Pat. No. 6,049,823 disclosing an interactive video-on-demand to deliver interactive multimedia services to a community of users through a LAN or TV over an interactive TV channel; U.S. Pat. No. 6,025,868 disclosing a pay-per-play system including a high-capacity storage medium; U.S. Pat. No. 6,020,912 disclosing a video-on-demand system having a server station and a user station with the server stations being able to transmit a requested video program in normal, fast forward, slow, rewind or pause modes; U.S. Pat. No. 5,945,987 teaching an interactive video-on-demand network system that allows users to group together trailers to review at their own speed and then order the program directly from the trailer; U.S. Pat. No. 5,935,206 teaching a server that provides access to digital video movies for viewing on demand using a bandwidth allocation scheme that compares the number of requests for a program to a threshold and then,. under some circumstances of high demand makes another copy of the video movie on another disk where the original disk does not have the bandwidth to serve the movie to all requesters; U.S. Pat. No. 5,926,205 teaching a video-on-demand system that provides access to a video program by partitioning the program into an ordered sequence of N segments and provides subscribers concurrent access to each of the N segments; U.S. Pat. No. 5,802,283 teaching a public switched telephone network for providing information from multimedia information servers to individual telephone subscribers via a central office that interfaces to the multimedia server(s) and: receives subscriber requests and including a gateway for conveying routing data and a switch for routing the multimedia data from the server to the requesting subscriber over first, second and third signal channels of an ADSL link to the subscriber.

Video-on-demand on cable TV systems to receive requests from cable subsribers for video programs or services such as high speed internet access or access to T1 or other high speed digital telephony services have not yet completed development. Such systems receive upstream requests and deliver requested video programs with associated audio and other data, as well as bidirectional delivery of internet protocol packets from LAN or WAN sources coupled to the head end bidirectional delivery of telephony data packets to and from T1 or other high speed lines of the public service telephony network. A need has arisen for a video-on-demand service over cable TV systems as well as delivery of other services such as wideband internet and T1 telephony access over cable TV systems.

SUMMARY OF THE INVENTION

A genus of video-on-demand pull technology cable TV systems is defined herein. Each system includes one or more "pull multiplexers" and one or more video stream inputs and one or more transmitters or transceivers at the head end, and a plurality of customer premises distributed along the downstream transmission medium.

A "pull multiplexer" is defined as a head end "cherry picker" multiplexer that has circuitry and/or software which functions to, at least:

receive upstream program and/or service requests, typically video program requests or requests for internet access etc., from the customer premises (or at least some of them if an array of pull multiplexers are used to divide up the work);

map the requests to program identifier codes (hereafter PID) that correspond to PIDs that will be in data packets encoding the desired program(s) and any associated audio, graphic, text or other auxiliary data and, in some embodiments, communicate PIDs and other packet identifying data to one or more video servers, and, in some embodiments, WAN servers and T-carrier interface circuits, to cause them to output data encoding requested programs and "pushed" programs to be sent regardless of requests;

receive one or more streams of compressed data packets (typically MPEG II but any compression scheme may be used) encoding a plurality of programs and/or services (such as telephony or internet access) and cull out those packets that have program identifier codes, IP addresses or other packet identifier information in the packet headers that identify the requested program or service data in the payload of the packet as well as data packets associated with the requested program(s) and/or services encoding any other audio, graphic, text or other auxiliary data packets that are to be used with the the requested program or service;

assemble the data packets culled out from the input streams into one or more output streams with each output stream containing the data packets for multiple requested programs and/or services;

outputting one output stream to each transmitter, transceiver or modem coupled to the downstream medium for transmission on a "logical channel" and "subchannel" ("logical channel" means any data path which carries one or more sets of data, each logical channel being multiplexed or otherwise physically or logically separated from other data being transmitted to another entity or in another direction on another logical channel, each set of data being carried on a subchannel of a logical channel also being multiplexed in any known way from the other sets of data being transmitted on the same logical channel) such that each logical channel carries in its subchannels one or more components of one or more requested programs and/or services and wherein, in the preferred embodiment, the collection of all such logical channels and subchannels carries only requested program(s) and/or service(s) (in alternative embodiments, some of the program slots or subchannels in selected or predetermined logical channels will carry data of programs and/or services that have not been specifically requested but which are high demand and which almost always will have users such as CNN or ESPN); and send downstream messages as to which channel(s) and subchannel(s) the program(s) and/or service(s) (in both requested and requested plus broadcast type embodiments) data will be transmitted on and the PIDs, IP addresses or other identifier information in the headers of the data packets that are to be used at the customer premises to filter out the requested programs and/or services and, in some embodiments, the broadcast high demand programs and/or services (in embodiments where there is not a shared downstream medium such as DSL lines to each customer, the filtering criteria can be dispensed with and the downstream messages only indicate which channels and subchannels contain the requested data).

Any circuitry and/or software that can accomplish these functions in the pull multiplexer are acceptable to practice the invention. Multiple specific examples of such systems within the genus of the invention are included within the detailed description section below.

The above definition of the characteristics of the "pull multiplexer" genus assumes that the downstream media has sufficient bandwidth that all the requested (and possibly broadcast) programs and/or services can be transmitted without any downward adjustment in the bandwidth of the output streams. This is often not the case however where the downstream medium is a hybrid fiber coaxial cable CATV plant (hereafter HFC). In such cases, structure to carry out an additional function is necessary in the pull multiplexer. In HFC, there is a fixed maximum amount of bandwidth available, and it must be shared by all the users coupled to the cable. Thus, as the number of requested programs and/or services rise, more and more bandwidth is consumed.

When the load rises to the point that the maximum available bandwidth is about to be exceeded, the pull multiplexer must adjust the bandwidth consumption of the output streams to stay within the bandwidth constraints. Generally, this can be done by commercially available resampling chips. Typically, downward adjustment of bandwidth is done by decompressing the compressed data packets and re-compressing them with a different, stricter compression algorithm which results in less quality but lower bandwidth consumption until the desired bandwidth is reached.

In an alternative embodiment, a pull multiplexer does all of the above (including bandwidth management if necessary) but automatically includes certain high demand programs in the output stream(s) even if they have not been specifically requested. High demand programs are programs that somebody will want to view almost always. These programs are included in one or more output streams at all times in this subgenus of species. The remaining program slots in the channels not consumed by broadcast programs are devoted solely to programs that have been requested and are shared by all users.

In another subgenus of species, the pull multiplexer includes a load management process that functions to make sure as many users as possible receive their requested services and/or programs given the bandwidth constraints of the downstream. In some species, this load management process also attempts to group all requested programs and services being used at a single customer premises on a single channel if possible so a gateway or modem with only one tuner can be used to recover all the data packets of all the requested programs and/or services. In some circumstances, a certain high demand program has been requested as part of a plurality of different requested programs from the same customer premises. Suppose this high demand program is either being broadcast or has also been requested my multiple other customers and the channel on which it is being transmitted has no available program slots for the other program(s) and/or services that have been requested by the customer.

In such a case rather than move the high demand program/service that is also being viewed/used by other customers to another channel with the need for downstream messages to all these other customers telling them where it has been moved and an interruption in service, another approach is possible. In such a situation, the load management process simply sends another copy of the data packets encoding the high demand program/service on another channel which has available slots for the other program(s) and/or services that the customer has also requested. This way, all the requested programs/services can be received with just one tuner in the customer's gateway/modem thereby reducing the cost to the customer of their equipment. One or more aspects of the processing defined in: this paragraph or similar processing described in the detailed description section, and the program structure(s) needed to do this processing, are referred to in the claims as a means for managing output streams for maximum efficiency.

As the terms are used herein, a channel is a slice of bandwidth on the downstream medium that is typically 6 MHz wide, and a program slot is a slice of the channel bandwidth devoted to carrying a requested program. A channel may be a separate radio frequency carrier having a center frequency at the middle of the band of frequencies that define the channel and passband filtered such that its spectrum does not extend outside the channel frequency limits. Typically, each requested program is comprised of a plurality of MPEG packets having one or more PIDs. All these packets for each requested program to be carried on a channel are included in the output stream fed to the transmitter and then modulated on the carrier for that channel. At the customer premises, the carrier is tuned and the digital data of the packets is recovered and packets not having PIDs of requested programs are filtered out. The remaining packets are sent over a LAN to the settop decoder box that requested the program and converted to video signals and other signal formats such as an accompanying audio track or on-screen data displayed with the program.

Alternatively, on fiber optic media, a channel may be a slice of bandwidth centered on a particular frequency by a passband filter that filters the spectrum of the output stream from the pull multiplexer to reject all frequency components outside the channel's frequency limits. For example, the digital data of the various programs carried on the channel may be spread spectrum multiplexed and summed and the overall spectrum filtered by the passband filter down to a 6 MHz wide spectrum centered on the channel frequency.

A novel aspect of the video-on-demand systems disclosed herein is that they can not only supply video-on-demand programming but also broadband internet access and other broadband services through T-carrier interfaces. The process of providing video-on-demand services along with push programming as, well as broadband services from the head end comprises the following steps generally:

receiving one or more input streams of MPEG or other compressed, video data in packets from one or more video servers;

receiving one or more input streams of internet protocol format packets from one or more WAN servers or gateways or routers coupled to a wide area network;

receiving one or more input streams of data packets from a T-carrier interface circuit;

receiving one or more requests for video-on-demand programs and/or services encoded in data provided by said one or more WAN servers or gateways or routers or said T-carrier interface circuits, said one or more requests transmitted by said customers over an upstream logical channel on said HFC;

mapping said one or more requests to one or more program identifier codes, IP packet address information or other packet identifying information, and using said program identifier codes for requested video-on-demand programs to send messages to one or more video servers telling them which video-on-demand data files to output, and using said program identifier codes and/or IP packet address information or other packet identifying information to cull out compressed video packets of at least requested video-on-demand program(s) and/or service(s);

organizing said culled out compressed video packets into one or more output data streams, each for transmission by a different cable modem on said shared HFC, each cable modem transmitting one or more logical channels, each with a plurality of subchannels;

sending downstream messages to said customers telling them which logical channels and subchannels upon which they can find their requested video-on-demand program(s) and/or services; and receiving upstream internet protocol format and/or other format. upstream data packets and routing them to the appropriate WAN server, gateway or router or said T-carrier interface circuitry.

One of the novel aspects of the systems disclosed herein is that each customer premises can have a gateway which allows signals and data from other sources besides a single broadband source such as a DSL line or a cable modem can be supplied to the peripherals coupled to the gateway by a LAN. Typical gateways have satellite transceivers, cable modems, DSL modems, an interface to the public service telephone network and tuners for conventional TV antennas. All these circuits are interfaced to one or more local area networks through an IP packetization and routing process and one or more network interface cards. Typical circuitry that couples the signal interfaces to the LAN interface are decoders to convert digital representations of signals YUV format so that an MPEG encoder can compress them down to the available bandwidth on the LAN. Similarly, incoming MPEG packets may be decompressed and then recompressed to fit the available bandwidth on the LAN. A typical process that occurs in such a gateway contains the following steps:

receiving one or more requests identifying one or more video-on-demand programs and/or services a user wishes to enjoy;

transmitting said requests to a head end cherry picker multiplexer.: which can supply the requested data;

receiving one or more downstream messages indicating from which logical channels and subchannels the data of the requested program(s) and/or services may be recovered from a downstream medium;

tuning to the specified logical channel and demultiplexing the specified subchannels and recovering the requested data as compressed video or: other data packets;

if the requested program is an analog video broadcast on the airwaves or a cable TV hybrid fiber coaxial cable network, tuning to the requested signal, digitizing and demodulating the tuned signal to generate a baseband digital NTSC, PAL or SECAM video signal;

if necessary to meet bandwidth constraints decompressing recovered compressed video and other data packets and recompressing them to a lower bandwidth that can be transmitted on the available bandwidth of said local area network;

converting digitized representations of NTSC, PAL or SECAM video signals to YUV format if said local area network has inadequate bandwidth to carry uncompressed video signals along with other network traffic then existing;

compressing YUV format data to MPEG packets having a state of compression that fits the available bandwidth;

packetizing compressed video and other data into internet protocol packets (hereafter IP packets) and encapsulating the IP packets in LAN packets addressed to the one or more peripherals that requested one or more program(s) and/or services and transmitting said LAN packets over said local area network to the peripherals that requested the data;

receiving upstream LAN packets and recovering encapsulated upstream IP packets therein; and routing said upstream IP packets to either a cable modem, a DSL modem, a satellite dish transceiver or a conventional modem for coupling to a public service telephone network for transmission on an upstream logical channel.

The organization and operation of the customer gateways also provides a unique ability to perform video conferencing without a video phone using only a TV and a video camera coupled to a settop box. The elements of such a video conferencing apparatus are:

a gateway having interface transceiver circuitry for either or both a digital subscriber line or hybrid fiber coaxial cable of a cable TV system, and having a router and network interface circuit and having means coupling said interface transceiver circuitry to said router and network interface circuitry for compressing at least video and audio video teleconference data received from said digital subscriber line or said hybrid fiber coaxial cable and packetizing said compressed data and sending said packets to said router;

a local area network coupled to said network interface circuit for carrying downstream packets of video teleconferencing data;

a settop decoder coupled to said local area network for receiving said downstream packets of compressed video and audio data and converting them into conventional NTSC, PAL or SECAM format video signals;

a conventional television coupled to receive and display said conventional NTSC, PAL or SECAM video signals;

a conventional video camera or videophone coupled to said settop decoder for outputting upstream conventional NTSC, PAL or SECAM format video signals for the upstream portion of a video teleconference;

and wherein said settop decoder includes circuitry to receive said conventional format upstream video signal, digitize said video signal, compress the resulting data and packetize the resulting compressed into upstream video conference packets addressed to said network interface and router of said gateway for transmission over said local area network;

and wherein said router routes said upstream video teleconferencing packets to the appropriate interface transceiver circuitry for either said digital subscriber line or said hybrid fiber coaxial cable, depending upon which medium is being used to deliver the upstream teleconference data.

In general, the functions performed in the pull multiplexers and cable modems and gateways and DSL modems can be performed by any conventional circuitry that is already known. Nothing about the structure or operation of the devices described herein is critical to the invention unless specifically so stated or it is essential to achieve the result described even if not specifically stated to be critical to the invention.

BRIEF DESCRIPTION OF THE DRAWINGS

FIG. 6 is a block diagram of a preferred form of DSL head end cherry picker multiplexer.

FIGS. 9A through 9E are a flowchart of a pull technology video on demand process.

DETAILED DESCRIPTION OF THE PREFERRED AND ALTERNATIVE EMBODIMENTS

Figure 1:
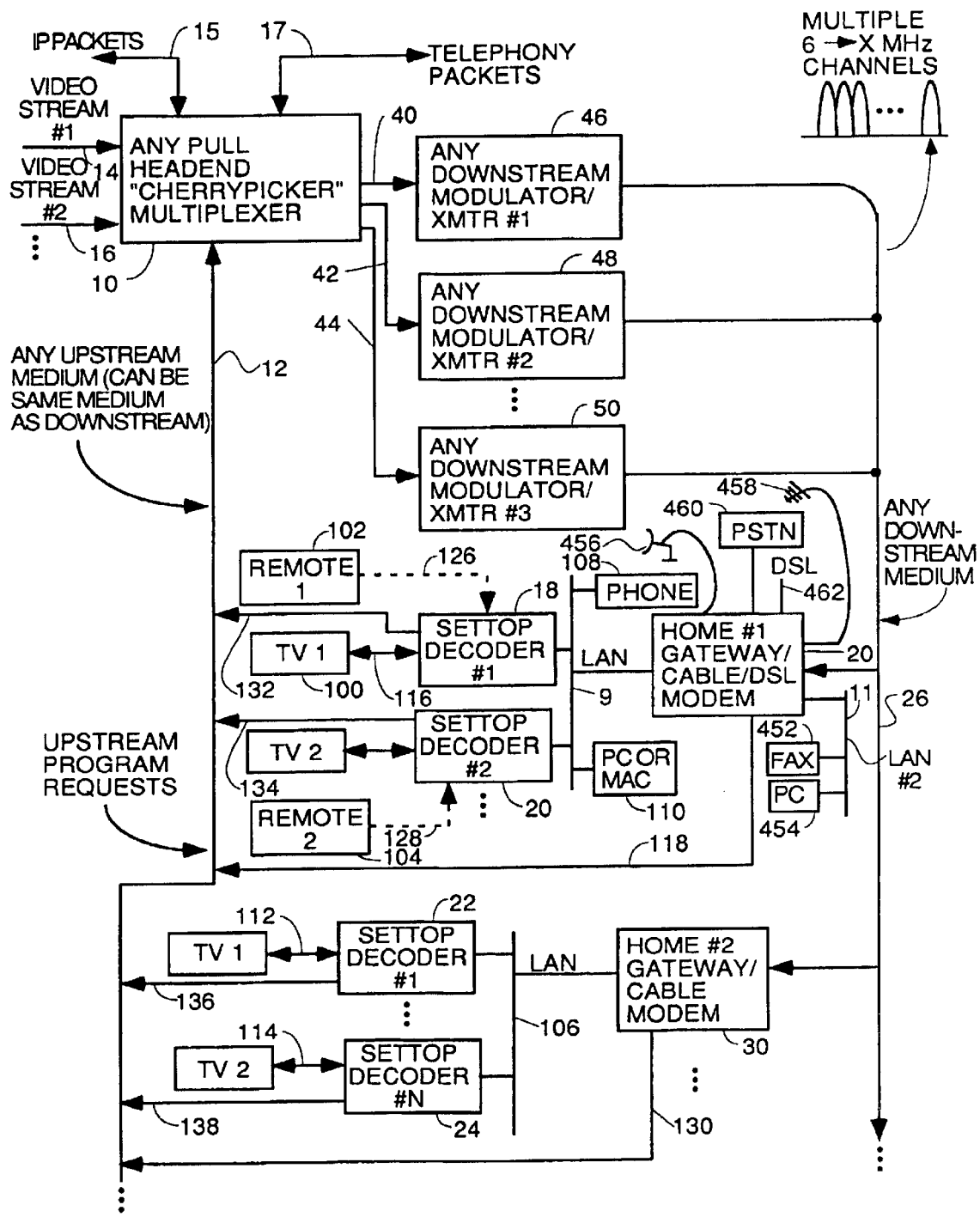
FIG. 1 is a block diagram of one embodiment of a system employing the teachings of the invention.

Generally, speaking, the genus of the invention includes all species of system architectures and methods of operation that have the following characteristics. They will include a head end multiplexer that receives upstream program and/or service requests and picks out data from input streams that satisfies those program/service requests. These head end multiplexers will output data streams for downstream transmission that satisfy those requests, and, if necessary adjust the bandwidth of the output data streams to fit the available bandwidth. The head end multiplexer will also send downstream messages to the modems or gateways at each customer premises indicating on which channels they can find their requested programs.

In some species within this genus, the head end multiplexer culls out data packets of popular programs that are frequently watched such as CNN or ESPN and mixes that data in with data packets of requested programs on the output stream regardless of whether there has been any specific request for the high demand programs/services.

In other species within the genus, the head end multiplexer also does load. management to maximize the efficiency with which requested programs are received and the available channels and program slots are used. For example, if it is known that three requests for three different services or programs have been received from a customer that has only one tuner, the management process will instruct the culling or cherrypicker switches to pick out the packets for these programs and/or services and put them all on the same channel where possible. If necessary, if one of the programs/services is already being transmitted on another channel and there is no room left on that channel for the remaining programs/services requested by a particular customer, then copies of the packets encoding the program/service already being transmitted will be transmitted on another channel that has room for the remaining programs/services requested by the customer.

In other species within the genus, the head end multiplexer also does bandwidth management in environments where available bandwidth is limited and shared between all users. Such environments include typical cable TV plants today. The head end multiplexer multiplexer, also known as a "cherry picker", manages the bandwidth of the output stream such that all requested programs are present in the output stream (assuming sufficient bandwidth is available), but their bandwidth is decreased if necessary so as to not exceed the available bandwidth on the downstream medium. In such species, the head end multiplexer will include circuitry to cull out all the requested program packets from the input streams, assemble the culled packets into an output stream and adjust the bandwidth of the output stream so as to not exceed the available bandwidth of the downstream medium. This is usually done by decompressing the data in the packets culled out from the input stream back to its uncompressed form and recompressing it with an algorithm that results in more compression so as to reduce the amount of bandwidth consumed by the output stream(s) so as to be within the bandwidth constraints of the downstream medium. Usually, the input streams are MPEG compressed video streams, but the invention is not limited to video program input or MPEG compression. The input stream may be any form of data, even uncompressed data, including IP packets or packets re-assembled from T1 timeslots or other high bandwidth telephony services. If uncompressed data is received, the cherry picker compresses it down to the available bandwidth on the downstream.

Figure 4:
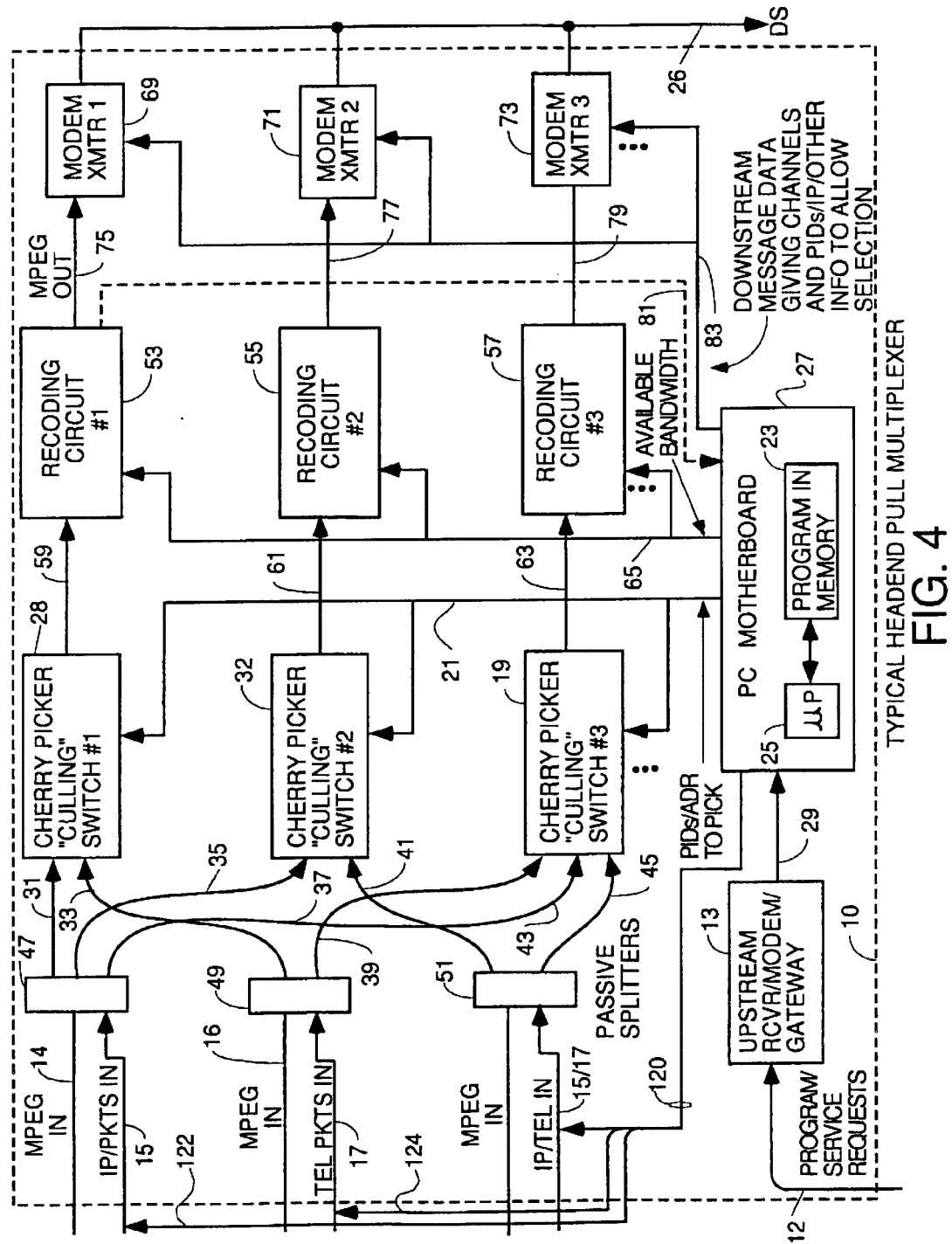
FIG. 4 is a block diagram of a prior art cherrypicker that has been modified to receive upstream program and/or service requests and upstream data and to use the program and service requests to cull out data for requested programs and services after routing the requests to video and other servers that can supply the requested data and which can route upstream data generated by customers to the proper servers.

Referring to FIG. 1, there is shown a block diagram of a system according to the teachings of the invention. A head end multiplexer or cherry picker 10 receives one or more input data streams of any type data. FIG. 4 shows a typical head end cherrypicker structure. Referring jointly to FIGS. 1 and 4, there are shown are several video input streams 14, 16 from local video and/or multimedia servers, a downlink dish etc. The structure and operation of the video and multimedia servers may be any known design including the design taught in U.S. Pat. No. 5,802,283 for a multimedia server for an ADSL network, which is hereby incorporated by reference. The input streams can also include an IP packet stream 15 from a modem, router, gateway or server (not shown) coupled to the internet or from a local server coupled to the internet. The input data streams to the cherry picker 10 can also include a stream 17 of telephony packets from, for example, circuitry coupled to any of the following type of digital data delivery networks over the public switched telephone network: N-carrier, L-carrier, T-carrier, channelized T-carrier (T1, E1, J1), DSL, ADSL, HDSL, X.25 packet switched networks, Common Channel Signaling and Control (CCS networks), Dataphone Digital Service, Switched 56 Kbps (also known as DSA) nets, ISDN, frame relay, or cell switched (SMDS or ATM) network.

The cherry picker 10 also has an input coupled to any upstream medium 12 for receiving upstream program and/or service requests from the users in the customer premises. This input is coupled to the receiver section 13 of a modem coupled to the downstream in cases where the downstream and upstream are. transmitted on the same media or to a separate gateway, receiver or modem:

where the upstream 12 is a separate medium such as a telephone line etc.

The upstream requests identify the requested program and/or services various users coupled to the system desired to view and/or use. The gateway 13 controls the upstream session via a log-in procedure, authenticates the requestor and her privileges, and validates the requested services and/or programs based upon the status as an authorized subscriber and whether or not the request is., within the privileges of that subscriber. Valid requests from authorized users are passed on to a PC motherboard 27 of cherry picker 10. In some embodiments, the gateway 13 may also send data downstream to present a menu to users of video programs, multimedia files, telephony services or wideband internet access or other wideband services which are available for selection by the user. When a valid upstream request for a program and/or service is received by the gateway 13, it transmits a message to the appropriate server requesting that a video program and/or service(s) identified in the message be transmitted to the cherrypicker 10 via the appropriate one of the links 14, 15, 16 and/or 17. The requests are also passed to the PC motherboard 27 of the cherrypicker in FIG. 4.

The cherry picker 10 converts these requests for programs and services to program identifier codes (PIDs), IP sources addresses or other identifying codes that can be used to cull out the data packets in the input streams that encode the requested programs and/or services supplied by the video/ multimedia server, the T1 interface circuitry, the internet server and/or any dish interface circuitry or other interface to a source of data to which the request was passed.

The upstream medium 12 can be any medium that can get the program and/or service requests to the cherry picker. It can be a telephone link, a satellite uplink, a microwave or radio link or it can be an upstream management and control channel that is time division, frequency division or code division multiplexed or otherwise kept separate from the downstream channels on a downstream medium 26 such as hybrid fiber coax (HFC). The cherry picker must have suitable known internal or external circuitry such as a modem, receiver etc. that can interface to the upstream medium and recover the program/service requests therefrom. In CATV systems, the cherry picker 10 can have built into it or separate, a cable modem with a receiver section 13 that recovers the upstream program/service requests. Numerous suitable cable modems are commercially available including the Terayon TeraPro and DOCSIS modems as well as those of other manufacturers. Suitable cable modems are described in U.S. Pat. Nos. 5,768,269 and 5,793,759 which are hereby incorporated by reference.

The cherry picker 10 also includes cherrypicker switch circuitry such as are shown at 15, 17 and 19 for generation of three output streams. There are as many switch circuits as there are output streams or channels to be transmitted. Each channel carries multiple programs/services, typically from four to twelve. The switch circuits 15, 17 and 19 receive upstream program/service requests on bus 21 from a management process program 23 in execution on a microprocessor 25 on a motherboard 27. The motherboard has an input 29 coupled to the data output of the upstream receiver/ modem 13 to receive the upstream program/service requests extracted by the receiver 13 from the upstream data on medium 12. The cherry picker switches, in the embodiment shown, also include inputs 31 through 45 for receiving raw data streams from the inputs. These inputs 31 through 45 are coupled to the raw data inputs 14, 15, 16 and 17 through a plurality of passive splitters 47, 49 and 51. These splitters just take each input stream and couple the data onto a plurality of output streams that are coupled to the input of the cherrypicker switches.

Each cherrypicker switch 15, 17 and 19 functions to use the program identifier codes, IP source addresses or other identifying information on bus 21 generated from the upstream program/service requests to cull out the data packets from the input streams 31 through 45 that encode the requested programs/services. Typically, this culling process is done by switching circuits that receive the PIDs or other identifying information from a management process 23 running on a PC motherboard 27 or other computer coupled to the upstream receiver. Each input stream is comprised of MPEG or other packets that have headers. MPEG packets that encode video, audio and associated data of programs that can be watched on a TV contain program identifier codes. These PIDs map to the more informative long name such as CNN, Starz, ESPN, etc. Likewise, IP packets, called datagrams, have headers which include information that can be used to cull out only the IP packets desired from, for example, streaming media IP packet streams. IP datagram headers include fields such as: the source IP address, an identification field that allows the destination host to determine which datagram an newly arrived fragment belongs to (all fragments of a datagram include the same ID), a fragment offset that tells where in the overall datagram each fragment belongs, and an options field that can be used for source routing information, service identification, security or anything else not thought of in the original standard. These header fields are used to determine which IP datagrams or fragments to cull out of the input stream. Likewise, telephony packets assembled from fragments delivered in T1 timeslots etc. can be culled out of the input stream based upon program and/or service identifying information in the packet header. The PIDs and other identifying information in each header are examined by the cherrypicker switches and compared to the list of PIDs or other identifying information identifying the requested program(s) and/or services and/or the programs/services to be pulled regardless of requests.

The culled packets selected by the recoder circuits have the headers stripped and the payload data in the packets is then decompressed and recompressed if necessary to reduce the bandwidth. This process is done by the recoding circuits 53, 55 and 57. These circuits receive the compressed or uncompressed data packets (or a combination of the two) on input lines 59, 61, 63 etc. and available bandwidth information from the management process 23 on bus 65 from the motherboard 27. Separate buses are shown coupling the motherboard to multiple circuits, but in reality, all these buses may be simply the motherboard host bus and the data described herein just sent to each circuit when that circuit is addressed by the address lines on the bus. The available bandwidth information on bus 65 tells the recoding circuits how much additional compression to perform or that sufficient bandwidth is available on the downstream to meet the current bandwidth consumption in some embodiments. In the preferred embodiment, the available bandwidth information on bus 65 just tells the recoder circuits how much bandwidth is available on the downstream. In such embodiments, the recoder circuits decide for themselves how much bandwidth is consumed by the input streams and how much compression to perform to meet the bandwidth restrictions apparent from the information on bus 65. The recoding circuits are known and commercially available from Terayon Communications Systems, Inc. in Santa Clara, Calif. They were orginally designed by Imedia Corporation and are described in U.S. Pat. Nos. 5,956,088 and 5,877,812 and 5,862,140 all of which are hereby incorporated by reference.

The recoder circuits output their compressed data to either the downstream transmitters 69, 71, 73 or to the motherboard 27 depending upon whether the recoder circuits include circuitry to repacketize the compressed data. In embodiments where the recoder circuits include circuitry to repacketize the compressed data into MPEG or IP or other packets for the downstream, the repacketized data for each of three channels is output on buses 75, 77 and 79, respectively to the three transmitters 69, 71 and 73 for these three channels.

Message data to the transmitters telling each transmitter which data packets to transmit on which subchannels can be sent in-band in packets marked with an administrative code in the headers or out of band on a subchannel or by a physically separate data path (not shown). This is true for all of the embodiments shown in FIGS. 1, 2 and 3.

In some embodiments, the recompressed data is output on a bus 81 to the motherboard for repacketization there. These embodiments are symbolized by bus 81 in dashed lines. In these embodiments, the repacketized data is transmitted via bus 83 to the transmitters 69, 71 and 73 for downstream transmission as appropriate.

Each downstream transmitter modulates the output data onto a different frequency carrier for coupling to the downstream medium in the preferred embodiment. The transmitters multiplex the data of the different channels into different logical channels on the downstream by any known form of multiplexing. The downstream multiplexing can be FDMA, TDMA, SCDMA, CDMA, STDMA, DMT or, in the case of fiber optic media transmissions at baseband, simply a digital burst of packets transmitted in assigned minislots for each transmitter and with programs and services separated at the destination host by the PIDs or other identifying information in the packet headers;

In alternative embodiments where bandwidth alteration is not necessary such as fiber-to-the curb environments, the switching circuits 15, 17, 19 etc. simply cull out the data packets of the requested program and/or services and send them to the downstream transmitters for driving onto the fiber without bandwidth alteration. In some embodiments, the video streams output by the cherrypicker switches are sent to the PC motherboard 27 for changing of PIDs or addition of: other information to packet headers.

The PC motherboard is programmed to repacketize the culled, recoded data from the recoder circuits 53, 55 and 57 into downstream packets and assemble the packets into one or more output streams on bus 83 (only in embodiments where recoding and repacketization is necessary). In all embodiments, the PC motherboard (it could be a Macintosh motherboard or Unix motherboard also) also, optionally, performs a load management process to get all requested programs from any particular customer onto the number of channels that customer's equipment is capable of tuning. This process is done by outputting the PIDs or other information by which to do the culling process on bus 21 such that the cherrypicker switches are controlled to put all the PID data from requested programs from one customer onto the number of channels that customer is capable of simultaneously tuning. If the customer's modem or gateway can only tune one channel at a time, all the PIDs for the requested programs/services are sent to one cherrypicker switch so they will all appear on one downstream channel. The load management process then generates a downstream message addressed to that customer telling the customer upon which channel the requested programs/services will appear. If the customer can tune three simultaneous channels, the requested programs and/or services can be put on three different channels if necessary, and the appropriate downstream messages are generated by the motherboard and sent downstream. The downstream messages are sent from the motherboard 27 to the downstream transmitters via bus 83.

Each output line is coupled to a separate transmitter/modulator in some embodiments symbolized by FIG. 1 by transmitters/modulators 46, 48 and 50. Each transmitter or modulator modulates the data of its output stream into a downstream channel that is typically 6 Mhz wide. Conventional transmitter/modulator circuits suitable for the downstream medium in use can be used. In CATV HFC environments where both the upstream and downstream are modulated onto the HFC, all the transmitters/modulators can be a single SCDMA cable modem such aware commercially available from Terayon under the TerraPro trademark and described in U.S. Pat. Nos. 5,768,269 and 5,793,759. These modems can accepts TDMA input streams having multiple logical channels each one of which is one of the output streams from the cherry picker 10 and modulate each output stream onto a separate logical channel or program slot of a single 6 Mhz QAM modulated RF carrier.

Each customer premises has a gateway and/or cable modem coupled to the downstream medium such as are illustrated at 28 and 30. The function of these gateways and cable modems is to receive the digital data of the requested programs/services and route it over a local area network in the customer premises to the settop decoder or other peripheral that requested the program/service. An exemplary gateway that can serve the functions of gateways 28 and 30 is taught in U.S. patent application entitled HOME NETWORK FOR ORDERING AND DELIVERY OF VIDEO ON DEMAND, TELEPHONE AND OTHER DIGITAL SERVICES having Ser. No. 09/483,681, filed Jan. 14, 2000, which is hereby incorporated by reference. Incoming packets for a video program that have been requested via settop decoder 18 are encapsulated into an Ethernet or, other LAN packet (depending upon the LAN 9 in use and sometimes hereafter referred to as simply Ethernet packets for brevity) and routed to the appropriate settop decoder that requested the program such as settop decoder 18 (sometimes the IP packet header information is stripped and in other embodiments it is not but the PIDs or other program information is not stripped). If multiple requests have been made from different settop decoders in the same household, the LAN packets for the different programs requested are addressed to the settop decoders that requested each particular program.

At the settop decoder, the payload data on all the program slots dedicated to this video program such as the audio and video data is decompressed back to its original resolution and converted to a signal format on line 116 suitable for television 100. If TV 100 is an NTSC, PAL or SECAM TV, the appropriate analog signal format such as an NTSC signal modulated onto RF channel 3 or 4 is generated. If the settop decoder is coupled to the video or S-video and audio inputs of the TV that bypass the tuner, the video and audio data is converted into analog composite video and audio signals on line 116. In some embodiments, each TV will have an intelligent remote control such as is shown at 102 and 104. Each of these remotes has a bidirectional radio frequency or infrared link to the settop decoder, and each of these remotes has a miniature display thereon upon which digital data associated with a program may be displayed either with or without simultaneous display on the data shown on the TV. For example, if a user is watching Goldeneye on TV 100 suppose there is associated digital data with this video program for home shopping when 007's car is in the scene such "BMW Z3 Roadster available locally from Acme BMW, phone number (408) 555-1212". This message can be displayed on the minidisplay on the remote only or both on the minidisplay on the remote and on the TV also.

The customer premises gateway or cable or ADSL modem in each customer premises is also coupled to other peripherals in the household such as computers or telephones or FAXes or digital VCRs or network computing devices (no local hard drive) via one or more local area networks. For example LAN 9 in customer #1's house couples gateway 28 to a digital phone 108 and a PC or Mac personal computer 110. A second LAN 11 couples gateway 28 to FAX 452 and another personal computer 454. The second LAN 11 may have a different medium type, use a different protocol or be of higher bandwidth than the first LAN as long as the gateway 28 has the appropriate network interface circuitry to interface to said second LAN.

Each gateway at a customer premises also may have inputs for and appropriate interface circuitry to receive broadcast data and other digital services such as DirectPC data from a satellite dish 456, a terrestial broadcast TV antenna 458, the public service telephone service network 460 or a DSL line 462. The gateway 28 includes circuitry to interface to each one of these signal sources, recover digital data from the source or digitize incoming analog signals, compress the data if necessary because of bandwidth availability conditions on the local area networks, encapsulate the data into IP packets and then into LAN packets and route the packets to the peripheral that requested the program/service. Upstream data from the peripherals will be received by the gateway from the LANs, the Ethernet packet headers will be stripped off and the IP packets routed to the appropriate interface circuitry interfacing the gateway to the appropriate upstream data path (which will depend upon the downstream medium upon which the downstream data arrived). For example, if DirectPC IP packets are received from the satellite dish, any upstream IP data packets will be routed to a conventional modem circuit in gateway 28 coupled to PSTN 460. Likewise, if downstream IP packets were received from the DSL line, upstream packets will be routed to a DSL modem in gateway 28 coupled to the DSL line for upstream transmission on the upstream DSL channel. If downstream IP packets are received from downstream medium 26 and it is hybrid fiber coax (HFC), upstream packets will be routed to a cable modem in gateway 28 which has an output coupled to, the HFC for transmission on the upstream logical channel.

Typically, wideband internet access IP packets will be encapsulated into Ethernet packets by gateway or cable/DSL modem 28 and addressed to the PC 110 or PC 452. The network interface card (not shown) of PC 110 or PC 452 receives the Ethernet packets and strips off the Ethernet headers and passes the IP packets up through the IP protocol stack to the application that requested them. If the application has IP packets to send back out to the internet through the headend, the packets are generated in the application and sent down to the network interface card. The NIC encapsulates them into Ethernet packets and transmits them to gateway or cable/DSL modem 28. The gateway/modem 28. then takes these packets and transmits them to the headend via data path 118 and whatever upstream data path 12 is being used using whatever form of multiplexing and modulation is being used. For example, if gateway/modem 28 is a cable modem and the upstream data path 12 is hybrid fiber coax, then the IP packets are disassembled and interleaved, Trellis encoded, code division multiplexed onto whatever logical channels are assigned to cable modem 28 and QAM modulated onto the RF carrier being used to frequency division multiplex the upstream data from the downstream data. At the headend cherrypicker, a cable modem receives the upstream signals from cable modem 28 and recovers the IP packets in conventional manner and routs the IP packets out to the internet over data path 15 to a server or router at the headend coupled to the internet. The server is a file management system which functions to receive input video and/or multimedia or other files from providers, store these files with descriptor information about them, keep track of sessions, serve the data files out on links to the cherrypicker, and handle requests for files from the cherrypicker motherboard.

Telephony works the same way. Incoming data from one or more logical channels on a T1 line for example enter the headend via link 17. Link 17 is typically coupled to known T1 interface circuitry that is responsible for gathering bytes from T1 timeslots assigned to a particular conversation and packetizing them into IP packets addressed to, for example, telephone 108. These IP packets are culled out of the stream of packets on line 17 by cherrypicker 10 and output in the output stream devoted to the channel and program slot to which telephone 108 has been assigned for a particular session. The IP packets are then transmitted downstream to gateway 28 by whatever transmitter and downstream media 26 is in use. At gateway 28, the IP packets addressed to telephone 108 are recovered and encapsulated into Ethernet or other LAN packets addressed to telephone 108. At the telephone, the Ethernet packets are received and the encapsulated IP packets are recovered and the payload data is converted to analog signals for use by the telephone. Analog signals generated by telephone for transmission out on the T1 line are then digitized and encapsulated into IP packets addressed to the T1 line interface circuitry (not shown) coupled to the cherrypicker 10. Obviously, the telephone 108 may a video conferencing or other high bandwidth device needing T1 bandwidth. The outgoing digital data from the telephone 108 or video phone or video teleconferencing apparatus also represented by 108 is then encapsulated into IP packets addressed to the T1 line interface circuitry coupled to the cherrypicker 10 at the headend. These IP packets are then encapsulated into Ethernet or other LAN packets addressed to the gateway/modem 28 and transmitted over the LAN to gateway/modem 28 where they are received and the IP packets recovered. The IP packets are then transmitted upstream to the cherrypicker 10 via data path 118 using whatever form of multiplexing and modulation that is conventional for the upstream path 12. If the upstream data path 12 is shared by all the customer premises for both upstream and downstream data transmission, then some form of upstream multiplexing such as SCDMA, CDMA, FDMA or TDMA is used to separate the upstream data from the various customers. In addition, the upstream data must be multplexed to keep it separate from the downstream data. Typically FDMA is used for that purpose but other forms of multiplexing could also be used. If the downstream and upstream data paths 26 and 12, respectively, are DSL lines, there is no need for multiplexing to separate the data from different customers since each customer gets her own DSL line, and conventional DSL multiplexing to separate upstream from downstream data is used.

At the headend, the upstream IP packets for telephony and wideband internet access are recovered by conventional upstream receiver/modem/gateway 13. The IP packets are then transferred to the PC motherboard 27 where a routing process examines the IP destination addresses and routs each packet onto the appropriate one of the lines represented by bus 120. This bus contains individual lines coupled to the T1 interface circuitry via data path 17 and to the server, router or gateway circuitry (not shown) coupled to the internet and coupled to the cherrypicker 10 via data path 15 in some embodiments, and, in other embodiments, is a packet data network sharing a single transmission medium to which both the T1 interface circuitry (not shown) and the internet server, gateway or router (not shown) are connected by network interface cards. IP packets to be sent out over the internet are routed by PC motherboard 27 onto line 122 and IP packets to be transmitted on the T1 line are routed onto line 124. These lines 122, 124 symbolize either separate physical data paths to the wide area network server(s) and telephone company digital switches or separate upstream logical channels transmitted to these servers on the same medium upon which downstream IP packets and telephony packets were transmitted to the cherry picker 10.

At customer premises #2, LAN 106 connects a gateway 30 to two different settop decoders 22 and 24 each of which converts the video and audio packets of requested programs into video and audio analog signals on lines 112 and 114, respectively.

Either the remotes 102 or 104 or the settop decoders 18, 20, 22 or 24 can be used to enter video-on-demand program requests. If the remotes are used to enter program requests, the identifying information is transmitted by an RF or infrared link to the settop decoder associated with the remote. These RF and IR links are symbolized by dashed lines 126 and 128 in FIG. 1. Service requests are generated by one or more telephones and/or personal computers and/or other peripherals at each customer premises. Each service request is encapsulated into an Ethernet (or other LAN) packet which may be addressed to the gateway/modem 28, 30 etc. or, in alternative embodiments, to the settop decoder circuits 18, 20, 22 or 24. These program and service requests are transmitted from the gateway/modem or settop decoder to the headend cherry picker via data paths 118 or 130 or 132 or 134 or 136 or 138, as appropriate. At the headend cherrypicker upstream receiver/modem 13 in FIG. 4 recovers the program and service requests and passes them on to the PC motherboard 27. There they are processed and the PIDs and source addresses in IP packets to be culled out and put into the various output streams on lines 75, 77 and 79 are derived and relayed to the culling switches 15, 17, 19 etc. The video program and service requests can be sent as long program names and then converted at the headend PC motherboard into PIDs and/or IP source addresses or other identifying information by a table lookup process. The PIDs and/or IP source addresses or other identifying information to be used by the culling switches to pull out the desired programs and services are sent to those switches via bus 21.

A system architecture according to the genus of the invention will have the following characteristics which are illustrated in FIG. 1.

First, a head end multiplexer 10 receives upstream requests for desired programs via any path 12. The upstream path can be a satellite uplink, a wide area network, the internet, an FDMA, CDMA or TDMA upstream channel on the same medium used to transmit the downstream data or the public telephone network.

Second, the cherry picker 10 must receive one or more input data streams 14 and 16 of raw data of various programs from which the requested programs are culled. The input data streams are typically video streams of MPEG compressed video, audio and other associated data defining a plurality of programs. The architecture of the invention is not limited to video program data, nor is it limited to MPEG compressed data. In some embodiments, the input data streams on lines 14, 16 etc. can be IP packets, telephony packets, video packets with associated audio and data compressed with MPEG or any other compression scheme, MP3 data, or any other types of data packets or streams known now or invented in the future or some combination of the above. All that is necessary is that the incoming data packets or stream have PIDs or IP addresses or some field of information that identifies the service or program the data encodes so that the cherry picker 10 can cull out requested services or programs or services or programs with high demand that are supplied on a constant or regularly scheduled basis on one or more channels on the downstream medium 26. This raw input data is supplied from one or more local or remote video servers, satellite downlinks, internet service providers, T1 or other high bandwidth lines, or other sources on one or more inputs to the cherry picker 10.

Third, there must be circuitry somewhere to map whatever code, channel number or name that is used by the user to designate the desired program or service to one or more program identifier code(s), hereafter PID(s), IP source addresses or any other identifier of the program or service the data encodes. In the case of PIDs, the PIDs mapped to the requested program(s) will be in the MPEG packets of the video, audio and any associated data packets of the desired program(s) in the input video streams on lines 14, 16 etc. In the case of other types of services such as high speed internet access, telephony over CATV cable plants, or fiber-to-the-curb plants, etc. This mapping function can be done at the cherry picker 10 or, alternatively, it can be done at the settop decoder boxes such as are shown at 18, 20, 22 and 24 such that the upstream program requests are already in the form of the PID(s) that identify all the components of the desired program. These PIDs will be in the MPEG packets of the video, audio and any associated data packets of the desired program(s) in the input video streams on lines 14, 16 etc. These PIDs are what the cherry picker 10 uses to cull out all the MPEG data packets of the requested programs from the input streams 14, 16 etc. In embodiments where the video, telephony, wideband internet access and other servers do not provide all video programs and services available to the input of the culling switches at all times, there must also be circuitry such as a gateway to route valid requests for video programs and/or services to the appropriate servers to cause them to transmit the data of the video program or service to the culling switches.

Fourth, there must be circuitry in the cherry picker(s) 10 that uses the PID(s), IP addresses or other service and/or program identifiers identified by the mapping process to cull out the data from the input streams that encode the program(s) and/or service(s) requested by the user(s). The culled out data packets from the raw data input streams are then assembled into output data streams, each stream to be transmitted on one channel and each stream encoding one or more programs or services up the maximum capacity of the channel.

Fifth, there must be some downstream medium and an upstream medium, but these mediums can be shared with the upstream and downstream traffic multiplexed to keep it separate. The medium type is unimportant and can include hybrid fiber coaxial cable plants of CATV systems, the airwaves, DSL lines, microwave links, wireless or other cellular systems and satellite downlinks and satellite uplinks or telephone lines for the upstream.

Sixth, bandwidth adjustment must be performed if the amount of data requested and "pushed" can exceed the available for the requested and "pushed" data on the downstream medium in use. Data that is "pushed" is data of programs and services not specifically requested which ordinarily has a high demand level and is broadcast without request because of the high probability that someone will have a request for it active). The use of pushed data for high popularity programs and services helps save bandwidth because multiple customers may be watching the same program and only the number of subchannels needed to carry the components of the pushed program or service are consumed regardless of how many customers are tuned in. Thus, for example, "Who Wants To Be A Millionaire" can be pushed on two subchannels for its audio and video components even though 1000 customers are simultaneously watching it.

Figure 2:
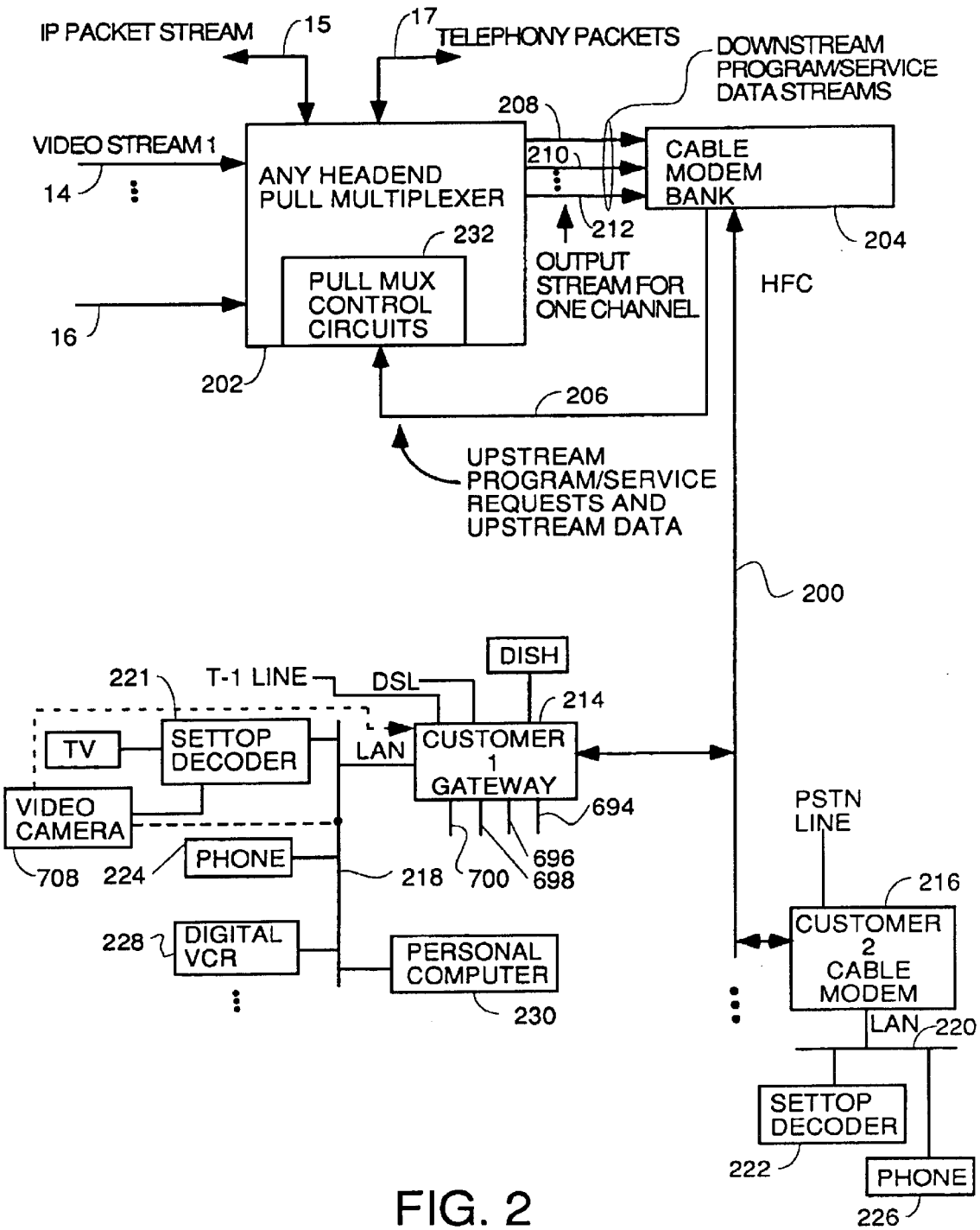
FIG. 2 is a block diagram of an alternative embodiment of a system within the genus of the invention having a pull multiplexer at the headend and a gateway at every subscriber which can receive requested video programs and/or services via a downstream HFC medium or from DSL or satellite dish inputs coupled directly to the gateway.

Referring to FIG. 2, there is shown a block diagram for a species of system employing the teachings of the invention and which uses Hybrid Fiber Coaxial cable 200 of a CATV system for both the upstream and downstream mediums. In this system, the headend pull multiplexer 202 is structured and operates in approximately the same way as the pull multiplexer 10 in FIG. 1 except that the upstream program and service requests and upstream data packets are recovered by the cable modems in cable modem bank 204 and are transmitted to the pull multiplexer via line 206 as upstream messages and/or IP packets and are simply routed to the correct place. If the upstream data is requests for programs and/or services, the computer (not shown) in pull multiplexer 202 maps the names of the programs and/or services to PIDs, IP source addresses or other data for use in culling out the requested data from the incoming streams of data on lines 14, 15, 16 and 17. In cases where the video-on-demand and other servers do not output the data of all possible services and programs that can be requested simultaneously, the pull multiplexer 202 also functions to route the PIDs and other identifying information specific to the programs and services requested to the video-on-demand server and other servers as appropriate to cause them to output the requested data.

The culled data is packetized into MPEG or other compression format packets after having been bandwidth adjusted if necessary and grouped into one or more output streams 208, 210 and 212, each output stream having packets for multiple programs and/or services therein. Each output stream is supplied a s a data input to one cable modem in a bank of cable modems 204. Each cable modem multiplexes the data from the different programs and services in the input stream into different logical channels by any known form of multiplexing such as frequency division, code division or synchronous code division, time division or synchronous time division, discrete multitone etc. The different logical channels are each then modulated onto one or more carriers that are frequency division multiplexed from each other and from the upstream data by any known form of modulation such as by quadrature amplitude modulation, QPSK etc.

Downstream message from the pull multiplexer to the subscribers indicating which carrier and logical channel on that carrier carry the requested programs and/or services are also transmitted downstream either as broadcasts or as point-to-point transmissions individually addressed to the subscribers that made the requests. The downstream messages are typically transmitted on one or more logical channels dedicated to management and control traffic or they may be transmitted on a subchannel or by any other out-of-band or in-band scheme known in networks for transmitting management and control data. If the downstream messages are broadcast, the individual gateways at each customer premises compares the PIDs and/or other identifying information in the broadcasts with the PIDs and/or other identifying information of the programs and services that were requested to find the carrier and logical channel on which the requested data will be arriving.

The structure and operation of the gateways and cable modems at the customer premises such as gateway 214 and cable modem 216 are similar to the gateways and cable modems previously described in FIG. 1. Incoming MPEG and IP packets for requested programs and services is recovered from the carriers and logical channels indicated in the downstream messages. The Ethernet addresses of the peripherals that requested each program and service is then looked up based upon the PID and/or IP source address or other identifying information in each incoming MPEG and/or IP or other format packet. When the peripherals generate their program and/or service requests, they are encapsulated into Ethernet packets and transmitted to the gateway or cable modem. Each request is recorded in a table that contains entries to identify the program/service requested and the Ethernet address of the requesting peripheral. Incoming packets from the headend usually only have PIDs and/or IP source and destination addresses but they may also have other identifying information. In some embodiments, the gateway 214 and cable modem 216 maintain a mapping table at least between the PIDs and IP addresses or other identifying information of all programs and/or services requested and the information such as the long name or menu number identifying that program or service received from the peripheral. This table can be stored in nonvolatile memory such as ROM if the mappings do not change or may be built in RAM at powerup time by a request to the headend to download the current mapping table. Basically, any known way of figuring out to which peripheral the data packets for each requested program and/or service are supposed to be addressed will suffice for purposes of practicing the invention will suffice.

After determining which peripheral requested the recovered MPEG and IP packets and other packets encoding the requested program(s) and/or service(s), the recovered packets are encapsulated into Ethernet or other LAN packets.

These LAN packets are addressed to the peripheral that requested them and driven onto the LANs 218 and 220. Note that in the embodiments of FIGS. 1, 2 and 3, the gateways may be coupled to the peripherals by individual dedicated coaxial cables, twisted pairs, Cat 5 wires, phone lines or power lines or a wireless connection using various technologies currently available. For example, instead of a shared media network like 218, or in addition to this network, individual connections or alternative networks such as power line or telephone line or wireless networks symbolized by lines 694, 696, 698 and 700 may be used. Specifically, lines 694, 696, 698 and 700 may represent Home PNA telephone line networks which may have only one (or more) peripherals attached thereto, or Category 5 LAN droplines with only one (or more) peripherals attached thereto, or power line networks each having one or more peripherals attached thereto offered by Inari or Itran or Intellon to save the expense of rewiring the home to add a network. In addition, the connection from the gateway to each peripheral may be by a wireless network such as those offered by Blue Tooth or specified in the 802.11 standard. In addition, the drop lines 694 etc. may each be a separate, dedicated coaxial line or twisted pair. The gateways 20 and 30 in FIG. 1 and 214 in FIG. 2 and 308 in FIG. 3 will each have a plurality of individual line driver modules which can be coupled to the gateway backplane. Each module is designed to drive a different type of network connection or dedicated line. All these line driver modules receive IP packets from the routing process in accordance with whatever peripherals are coupled-to each line and drive them onto the particular type of media the driver is designed to drive using whatever protocol the particular line requires. Line driver circuits for each of the dedicated and shared media types identified above are known. Driver modules for individual coaxial cables that were previously installed in a home to distribute CATV signals simply include multiplexers to transmit FDMA separated upstream and downstream logical channels in the bandwidth not used by the analog CATV signal.

The peripherals may include, but are not limited to settop decoders 220 and 222, digital phones 224 and 226, digital VCR 228, and personal computer 230. Upstream requests for programs and services and upstream data such as IP packets from these peripherals are encapsulated into Ethernet packets and sent to gateway 214 and cable modem 216. There, the Ethernet headers are stripped and the requests and upstream data are transmitted on HFC 200 on the upstream logical channel(s) that are devoted to upstream traffic. The cable modems in cable modem bank 204 recover the upstream requests and data and transmit it over data path 206 to a computer 232 in the pull multiplexer. The requests are routed to the culling switches in all embodiments and to the servers that supply the raw input data in some embodiments. The upstream data is routed to the appropriate telephony interface circuitry or internet server/gateway/router for transmission to the host or device on the other side of the transaction.

Figure 3:
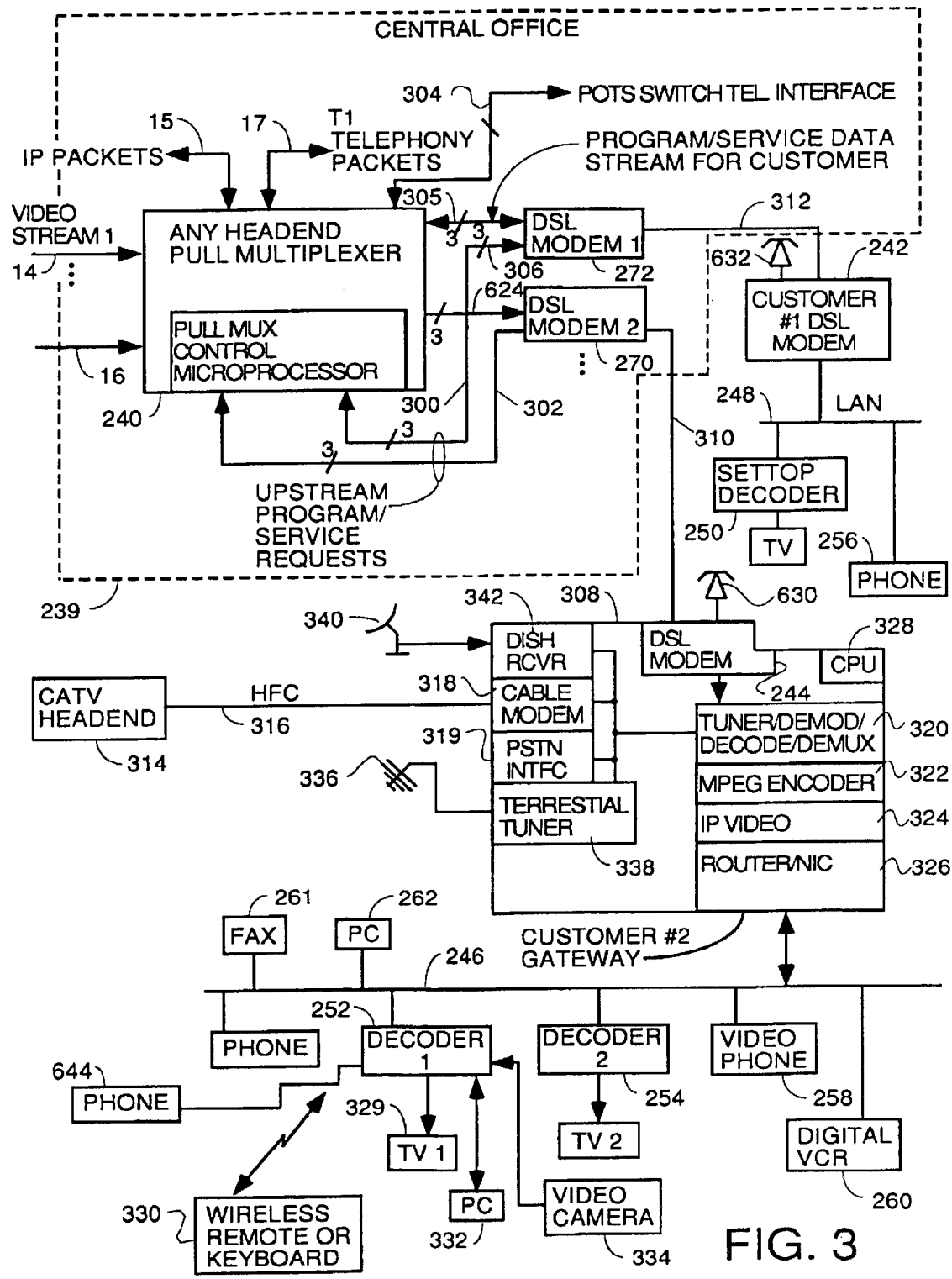
FIG. 3 is a block diagram of an alternative embodiment according to the teachings of the invention wherein the pull multiplexer at the headend delivers requested video-on-demand programs and services via DSL connections to the individual subscribers.

\*\*\* referring to FIG. 3, there is shown a DSL embodiment of a system that employs a DSL headend multiplexer within the genus of the invention. FIG. 6 is a block diagram showing more detail of a DSL multiplexer that can be used as the headend cherrypicker in the DSL environment. The reader should refer jointly to FIGS. 3 and 6 for the following discussion. Operation of this embodiment is similar to that of FIG. 2 except that the downstream and upstream medium to each customer premises is a DSL telephone line so there is no sharing of the upstream and downstream medium by data bound for different customers.

Each customer has a DSL modem such as 242 and 244 which couples the, DSL line to an Ethernet or other local area network such as 246 and 248 coupled to all the peripherals at the customer premises. The peripherals can include but are not limited to settop decoders 250, 252 and 254, phones 256 and 258, digital VCR 260, FAX 261, personal computer 262 or network computing appliances and can include household appliances that are internet ready for remote service calls and diagnosis or remote control. Some of the peripherals generates upstream requests for programs and/or services, and can generate them in any way. Typically, upstream requests for programs and services are generated by selection from a menu displayed on the peripheral such as a television coupled to a settop decoder. The menus are generated on the TV screen, computer screen, phone or FAX display from downstream menu data transmitted on a management and control channel of the DSL line to each customer premises, said downstream menu data encoding all available programs and/or services.

Each peripheral may also generate upstream data for transmission out on a wide area network 600 or a T1 line 602 or other wideband data delivery network. In addition, conventional analog telephones (not shown) can be connected to POTS outputs of the DSL modems at each customer premises, and they can generate upstream analog POTS signals which are transmitted over the POTS baseband channel of the bSL line to the DSL modem at the headend. At the headend DSL modem, the POTS analog signals are recovered and output at POTS outputs. Each POTS output of a DSL modem is coupled by a bidirectional tip and ring pair such as 604 for customer #1 and 606 for customer #2 to a CO POTS switch 608.

In addition, video phone 258 and digital FAX 261 coupled to the LAN at each customer premises can generate digital telephony data such as video conference pictures and audio that needs to be transmitted upstream for routing to the WAN server or T1 interface circuitry at the headend or via a satellite uplink via dish 340 and dish transceiver 342 for delivery to the destination. In addition, other peripherals coupled to a customer LAN such as personal computers 262 and may also generate upstream data that needs to be delivered to its destination by WAN 600 or T1 line 602 or a dish uplink or via PSTN interface circuitry 319 and a conventional telephone line such by a DirectPC PSTN upstream link.

The requests and upstream telephony and other data are transmitted to the customer gateways or DSL modems as Ethernet or other LAN packets. For example, at customer #2 gateway 308, the gateway or its internal DSL modem: 244 strips off the Ethernet headers and CRC bits after error correction and transmits the requests and data to the appropriate place. All requests for programs/services are transmitted upstream either via the DSL line 310 to the DSL central office or on the upstream logical channel of the HFC 316. All upstream data that needs to be delivered to its destination via WAN 600 or T1 line 602 is transmitted upstream via DSL modem 244 or upstream to the CATV, headend via cable modem 318. All upstream data that will be delivered to its destination by a satellite uplink or a PSTN connection is delivered to the proper interface circuit in gateway 308 such as dish transceiver 342 or PSTN interface 319.

Typically, requests for programs/services are transmitted on a management and control channel on an upstream logical channel transmitted on a carrier of a bidirectional channel that is frequency division multiplexed from the DSL baseband POTS telephony channel and the DSL wideband downstream only logical channel. Bidirectional IP packet and telephony data such as video conference data and internet access data is transmitted both upstream and downstream on upstream and downstream logical channels of the bidirectional channel, or, in alternative embodiments, may be transmitted on upstream and downstream logical channels of the 1.544 Mbps wideband DSL channel. Other downstream only wideband data such as video-on-demand and other services are transmitted in the 1.544 Mbps wideband downstream only DSL channel, or, in alternative embodiments, in a separate downstream logical channels on 1.544 Mbps wideband data channel that is FDMA multiplexed from the other channels. The DSL modems at the customer premises and the head end each transmit and receive telephony, IP packet, management and control data, video-on-demand data and other service data on separate logical channels on the appropriate carriers and channels as described above.

A DSL modem such as 270 and 272 at the headend is devoted to each DSL line to a particular customer. Each DSL modem at the headend has a conventional structure. DSL modems are commercially available from 3COM. Each DSL modem at the headend and the customer premises functions to send and receive information on three channels: a separate analog channel for "plain old telephone service" (referred to herein as POTS); a high speed wideband downstream channel based upon T1 specifications in increments of 1.536 Mbps up to 6.144 Mbps (referred to herein as the wideband channel); and, a bidirectional channel provided in increments of 64 Kbps up to 640 Kbps (referred to herein as the bidirectional channel and which carries requestes and upstream data in the preferred embodiment). DSL service is described in Horak & Miller, Communications Systems and Networks, Voice, Data and Broadband Technologies (1997) M&T Books, Foster City, Calif., ISBN 1-55851-485-6 which is hereby incorporated by reference.

At the headend, telephony data packets arrive on line 17 from the T1 interface circuitry 610 (T1 interface chipsets are commercially available). Further, analog telephony signals generated from "plain old telephone service" (hereafter; POTS) arrive from a central office POTS switch 608 on line 304 in FIG. 3 which corresponds to each customer's tip and ring pair in FIG. 6, of which pairs 604 and 606 in FIG. 6 are typical. The POTS lines for each customer are connected to POTS inputs of the corresponding DSL modem.

Digital telephony packets reach the DSL modems a different way. The pull multiplexer 240 in the central office 239 culls out digital telephony packets addressed to each separate telephone number using culling information on lines 614 and 616. This culling information is generated by control computer 618 from upstream program/service requests received on lines 620 and 622 from the DSL modems 270 and 272. The requests on line 620 are customer #1's requests, and line 622 carries customer #2's requests. The DSL modems recover these requests from the bidirectional upstream channels of DSL lines 312 and 310 of customers #1 and #2, respectively. The headend cherrypicker 240 routes the telephony data packets to the appropriate DSL modems 272, 270, etc. This routing may be by way of a separate data path to the DSL modem (not shown) or over buses 305.

In the preferred embodiment, the telephony packets are simply put on a separate logical channel (separated from the video and other service packets by header information) in the input data stream to the DSL modems. The slash marks in these lines symbolize embodiments that have three separate inputs to each headend DSL modem: one for POTS telephony, one for downstream management and control data and downstream IP data and other data not requiring high bandwidth; and one for high bandwidth downstream data such as requested video-on-demand programs and services or pushed programs and/or services. In embodiments where the headend DSL modems have a single digital data input, the telephony packets, IP packets and video-on-demand packets and other service packets in the input stream from the cherrypicker 240 are culled out in the modem by information in the headers in accordance with management and control messages received from the cherrypicker. These management and control messages tell the DSL modem which channel and logical subchannel to use to transmit each packet. These management and control messages are sent to the DSL modems from the control computer 618 via the data paths 626 and 628 in FIG. 6. The DSL modems use those control messages for two functions. First, these messages are used to control the DSL modem modulators to get the requested and pushed programs on the logical channels and subchannels specified in the message. Second, these messages are sent to each customer on the bidirectional channel to tell the customer gateway or DSL modem on which channels and subchannels it can find the requested and pushed data so the gateway or DSL modem can properly tune its tuners to recover the requested and pushed data.

Upstream telephony, request data and other upstream data from the telephones and other peripherals at the customer premises are encapsulated into Ethernet packets and addressed to a DSL modem or gateway. In the case of customer #1, the upstream data on the LAN is addressed to DSL modem 242, and in the case of customer #2, the upstream data is addressed to the gateway 308. The gateway 308 routes the telephony packets and upstream request data and other data to be transmitted to the headend to an internal DSL modem 244. The DSL modem 244 transmits the upstream data and telephony packets on the bidirectional channel (or an upstream logical channel in the broadband channel in some embodiments). Analog POTS signals from any conventional telephones 630 and 632 coupled to the DSL modems 244 and 242 are transmitted upstream as analog voice and POTS call control and call progress signals on the baseband POTS channel.

At the headend DSL modem for each customer, the analog voice and call control POTS signals are recovered and transmitted on the appropriate tip and ring pair, e.g., 606 and 604 for customers #1 and #2, to the CO POTS switch 608. Upstream request data and other upstream data such as IP packets are recovered by the DSL modem of each customer from the bidirectional channel or logical upstream channel of the broadband channel and sent to the control computer 618 via data paths 620 and 622 for customers #1 and 2, respectively. The control computer 618 then routes these upstream data packets either to the T1 telephony interface circuitry 638 via line data path 636 or WAN gateway/router/server 640 via data path 642.

The DSL modems 272, 270, 242 and 244 send and receive upstream and downstream management and control packets on the bidirectional channels of DSL lines 310 and 312. The management and control channels are transmitted on a carrier centered on 95 MHz which provides 8 Kbps of bandwidth for management and control messages and handshaking protocol between the subscriber and CO. This carrier of the bidirectional channel is used to test the copper pair transmission path and to provide approximately 16 Kbps of upstream D-channel bandwidth from the subscriber premises to the CO for request messages and upstream data such as IP packets, video conferencing data, etc. In alternative embodiments, the 1.544 Mbps broadband channel is bidirectional and the upstream and downstream data are multiplexed into separate logical channels by, TDMA, FDMA, CDMA or DMT. In other alternative embodiments, the D-channel is bidirectional and reserved for upstream data that can be sent within its bandwidth and higher bandwidth upstream traffic like video conference data of higher quality is multiplexed onto an upstream logical channel of the broadband channel with the downstream logical channel carrying compressed video and and downstream IP packets of requested and pushed video programs and services.

The high bandwidth data of downstream requested programs and services and pushed programs and services is modulated onto the broadband 1.544 Mbps channel extending from 100 to 500 Khz. The high bandwidth channel typically carries downstream only (CO to subscriber) digital data and provides 1.544 Mbps transport (1.6 mbps with overhead) for carrying digitized compressed video data and IP packets. The lower edge of the high bandwidth channel is set at 120 Khz, which is chosen to minimize channel loss and allow appropriate bandwidth for the baseband telephony channel and the bidirectional channel. This minimizes interference from impulse noise. The combined digital downstream signal utilizes the DS1 bit map specified by ANSIT1.403-1989.

Although the broadband channel generally is downstream only, in some embodiments, high bandwidth upstream traffic can also be multiplexed thereon.; There is no need for multiplexing if data transmission is unidirectional downstream on the high bandwidth channel since only the programs and services requested by one user are on that user's DSL line. If, however, upstream video conference telephony and IP packet data is to be transmitted from the peripherals to the T1 interface circuitry 638 or the WAN server 640 on the high bandwidth channel, that data may be time division or code division multiplexed onto an upstream logical channel of the 1.544 Mbps channel.

Gateway 308 also include circuitry to interface the LAN 246 at the customer premises #2 to several other sources of incoming programming and/or data and to send data out on upstream mediums other than the DSL line such as the PSTN or a satellite uplink or an HFC connection to a CATV headend. The details of the gateway 308 are given in the patent application HOME NETWORK FOR ORDERING AND DELIVERY OF VIDEO ON DEMAND, TELEPHONE AND OTHER DIGITAL SERVICES, filed Jan. 14, 2000, Ser. No. 09/483,681 which is hereby incorporated by reference, but some of the circuitry will be summarized here for completeness. For example, the gateway couples a CATV headend 314 and HFC data path 316 to LAN 246 via a cable modem 318 and various other circuits in the gateway that perform necessary services and routing of data to and from the LAN 246. The gateway includes tuner, AID, decoder, demultiplexer and demodulation circuitry represented by block 320 which performs various functions to interface the gateway to HFC 316. The HFC 316 can carry downstream conventional FDMA analog video broadcasts for video conferencing or CATV delivery, digital video broadcasts and/or downstream downstrodam DOCSIS data modulated onto upstream and downstream carriers. Thus, the gateway 308 can also request video-on-demand, video conferencing, wideband internet access or other services via the upstream logical channel on the HFC 316 as an alternative to DSL delivery.

The gateway 308 has a tuner for each downstream carrier on the HFC, all of which are symbolized by block 320. The analog video tuner (not separately, shown) tunes to whatever analog CATV video channel or video conferencing channel which has been requested and outputs an RF signal which is then digitized and demodulated to a baseband NTSC, PAL or SECAM downstream digital video signal. This data is at too high a bandwidth to send over the LAN 246, so the data must be compressed. To do that, a video decoder in block 320 (not separately shown) converts the signal to YUV format and then it is compressed in an MPEG II or other encoder 322. Next, IP video circuit 324 encapsulates the compressed video into IP packets addressed to the peripheral which requested the program, and the IP packets are sent to a router/network interface circuit 326 which routes the packets onto the correct LAN (there may be more than one LAN coupled to the gateway) and drives them onto the LAN media. A CPU 328 coordinates all this activity. More detail about the structure and operation of the home network gateway 319 is shown in FIG. 7 and the accompanying text below both of which have been brought in from the U.S. patent application incorporated by reference herein entitled HOME NETWORK FOR ORDERING AND DELIVERY OF VIDEO ON DEMAND, TELEPHONE AND OTHER DIGITAL SERVICES, filed Jan. 14, 2000, Ser. No. 09/483, 681.

If another user at customer premises #2 ordered a second video-on-demand program to be delivered by HFC in addition to a video-on-demand program via wireless keyboard or wireless remote 330, another tuner is tuned by computer 328 to the appropriate HFC video-on-demand carrier and rejects all other signals. The output of the tuner is then digitized and will contain digitized video and audio signals and may also contain IP packets of associated data. All this data will be on different program slots of one or more downstream channels from the CATV headend 314. A QAM or other demodulator in block 320 then recovers the constellation points encoding all these signals and data and a transport demultiplexer in block 320 separates the video, audio and associated data constellation points into separate streams of decoded data. Conventional conditional access decryption follows and the resulting data is usually compressed into MPEG packets by MPEG encoder 322 and encapsulated into IP packets by IP video circuit 324 and routed to the peripheral that requested it over LAN 246 via router/NIC 326.

At the settop decoder boxes such as 252, the data or requested and pushed video-on-demand programs or video conference data delivered either by HFC 316 or DSL line is received and converted into NTSC, PAL or SECAM video signals for the associated television, such as TV 328. The settop decoders such as 252 may have a video phone or conventional video camera 334 coupled thereto to generate the upstream portion of a video conference as conventional NTSC, PAL or SECAM format video signals with audio. The settop decoder includes conventional circuitry to receive, digitize, compress and packetize upstream video and audio signals and address the packets to the router/NIC 326 in gateway 308. The router sends the upstream video conference packets to the dish transceiver 342, the cable modem 318 or the DSL modem 244 for upstream transmission via satellite uplink, HFC 316 or DSL line 310, respectively. Thus, video conferencing can be achieved using the settop decoder 252 and television 328 for downstream data and the video camera 334 and settop decoder 252 for upstream video and data transmission.

Returning to the consideration of video-on-demand and pushed programs and services, any associated data to be used with a video-on-demand or pushed program (such as a pushed home shopping program), to be sent to, for example, a phone 644 near the TV being viewed (for home shopping transactions) or personal computer 332, is converted to a format suitable for the personal computer or the phone. Both the phone 644 and the PC 332 are plugged into the settop decoder 252 so as to receive the associated data so as to be able to interact with the video-on-demand or pushed program being viewed for, for example, impulse buying.

Gateway 308 also includes tuner for DOCSIS data such as wideband internet access IP packets transmitted downstream on the HFC 316, said tuner being included within cable modem 318.

The gateway 308 can also interface the LAN 246 to a conventional TV antenna 336. A tuner 338 under control of CPU 328 tunes to whatever conventional broadcast channel has been requested. The RF output of the tuner is then digitized in an A/D converter in block 320 and demodulated by a video demodulator which is part of block 320 to generate an NTSC, PAL or SECAM baseband signal. A video decoder which is part of block 320 converts the video signal to YUV format and MPEG encoder 322 compresses the video data. IP video circuit 324 encapsulates the output of the MPEG encoder and sends it to router/NIC 326 where it is routed to the appropriate settop decoder circuit for the TV that ordered the broadcast.

The gateway 308 can also interface the LAN 246 at customer premises #2 to a satellite dish 340. The satellite dish can send multiple forms of signals to the gateway. For example, analog video signals such as C-band subscription broadcast video can be received and/or digital video can be received such as DirecTV. Also, digital data services such as DirectPC may also be received. A separate tuner for each of these services is either part of dish receiver 342 or part of block 320. The DirecTV tuner will feed a QAM demodulator as part of block 320 which detects the actual symbols sent for each constellation point and outputs a digital stream to a transport demultiplexer which, under the guidance of CPU 328, separates out the MPEG packets in the subchannels or program slots carrying only the programs that have been requested or pushed programs. The MPEG packets are then sent through a transcoder which is part of block 320 to adjust the bandwidth of the isochronous video data to the available bandwidth on the LAN 246 for current load conditions. The transcoder circuit is implemented on commercially available integrated circuits which were formerly manufactured by Imedia and are now manufactured by Terayon Communications Systems, of Santa Clara, Calif., the assignee of this patent application. The transcoder receives an input from the CPU 328 regarding how much compression is needed and then uncompresses the input MPEG packets and recompresses them down to the new bandwidth as new MPEG packets. A conditional access circuit then authenticates the requester as a subscriber and decrypts the data so that it can be viewed. The decrypted MPEG packets are then sent to IP video circuit 324 for encapsulation into IP packets and then to router/NIC 324 for routing and encapsulation into Ethernet packets and driving onto LAN 246. At the settop decoder box to which the Ethernet packets are addressed, they are received, decompressed and converted back into a video signal which is coupled to the TV.

DirectPC signals arriving from dish 340 are tuned in dish transceiver 342 under control of CPU 328 and the output is coupled to a QPSK demodulator which recovers the IP packet data of the requested service. The IP packets are then sent directly to router/NIC 326 for routing and encapsulation into Ethernet packets and transmission to one of the personal computers such as 332 or a network computer (not shown).

Analog video signals such as C-band broadcasts that have been requested are tuned by the dish transceiver 342 under command of the CPU 328. The output RF signal is digitized and a video demodulator in circuit 320 converts it to baseband NTSC etc. A video decoder in circuit 320 then converts the NTSC signal into YUV format for compression in MPEG encoder 322. The compressed data is then sent to IP video circuit 324 for encapsulation into IP packets and from there to router/NIC 326 for routing and encapsulation into Ethernet packets and transmission over the LAN to the requesting settop decoder.

Gateway 308 and its LAN(s) and other input devices may be substituted for gateway 214 in FIG. 2 and gateways 28 and 30 in FIG. 1.

The DSL headend multiplexer 240 works the same way as the headend multiplexer 10 in FIG. 1 with regard to video-on-demand programs. Requests from the customers received by control computer 618 are converted to PIDs and transmitted to video servers 646 and 648 via lines 650 and 652. These video servers then output the MPEG packets of the requested programs on data paths 654 and 656 from video server 1 and data paths 658 and 660 from video server 2. Splitters 662 and 664 copy these data streams to each of the culling switches 666 and 668. The splitters also receive input IP packets from WAN gateway 640 via path 15 and from T-carrier interface circuit 638 via data paths 17 and 672. These IP packets are copied out to the culling switches also. The culling switches cull out the MPEG packets of the requested video and pushed video programs and the IP packets of the requested services from the data streams from the splitters on data paths 676, 678, 680 and 682 in accordance with culling data given to them on lines 614 and 616 from the control computer 618. The culled out data packets for customer #1 appear on line 684, and the culled out data packets for customer #2 appear on line 686. Optional bandwidth recoders then adjust the bandwidth of the resulting data streams in accordance with commands from the control computer 618 transmitted via lines 692 and 694. The resulting output data on buses 305 and 624 are transmitted downstream by the DSL modems.

\*\*\* In some embodiments within the genus of the invention, the pull multiplexer assumes that all cable modems and gateways have a sufficient number of tuners to tune in all the programs and/or services requested from a single customer premises. In such embodiments, the pull multiplexer simply gathers upstream program/service requests and culls out the packets that encode the data of the requested programs and services. These packets are then assembled into output streams for the appropriate media coupling the pull multiplexer to the requesting customer and downstream messages are sent to the customer's modem or gateway telling it on which media, channel and subchannel/program slot each requested program and/or service can be found. In embodiments where there is only one medium coupling the pull multiplexer to all the customers, the pull multiplexer just assembles the requested program and service packets into one or more output streams to be transmitted in a corresponding number of logical channels. The pull multiplexer just puts the requested programs and/or services from a single premises into whatever subchannels or program slots are available in logical channels that are not fully utilized and sends downstream messages to the customer's modems or gateways telling each customer the logical channel(s) and subchannel(s) upon which the program(s) and/or service(s) requested by that customer can be found.

This assumption that all customer modems/gateways have a sufficient number of tuners to tune all the requested programs and/or services and that they can be spread out to whatever logical channels and subchannels are not being utilized is inconvenient for customers. Specifically, for a customer that might have 3 to 5 programs and/or services requested simultaneously, that customer might need as many as five tuners in his gateway/modem in a worst case scenario. This unnecessarily drives up the expense for the customer.

Optionally, in some species within the genus, the cherry picker has a management process that pulls the requested programs and services onto the downstream medium 26 in the most efficient way. Such a process is illustrated; in the flowchart of FIG. 5. This management process starts at steps 344 and 346 by receiving upstream program and service requests. Next, step 348 analyzes the incoming program and service requests to determine from which customer. premises they came. Step 350 determines how many different program(s) and/or service(s) have been requested from the same customer premises. Step 352 then determines how many tuners each customer has in his gateway/cable modem such as 28 and 30.

Next, in step 354, the management process determines which channels and subchannels have available capacity.

Then the management process determines which channels and program slots to transmit the requested program(s) and/or service(s) on to enable all the requested program(s) and/or service(s)requested by the user to be received. The first step in that process is step 356 where the number of requested programs and/or services from each customer is compared to the number of tuners that customer has.

Next, the process of generating the output streams for all the customers with outstanding requests starts by assigning a variable N (which will be the customer currently being processed in the loop) to an intial value of one in step 360. Step 362 sets the customer number identifying which customer is being processed to the value of N. Test 364 then determines if customer #N has only one tuner. If so, test 366 determines if the number of requested programs and/or services by customer N is greater than one. If not, then the question is simply one of which logical channel in the downstream has the requisite number of subchannels available to carry the components of the requested program and/or service. Step 368 on FIG. 5B finds a logical channel with a number of subchannels open that at least equals the number of components to be transmitted in the program and/or services requested. Step 370 then sends the PIDs, IP addresses and/or other identifying information for the components of the program/service that has been ordered to the culling switch that is culling out packets for the output stream being generated for the logical channel having the available subchannels found in step 368. Step 372 sends a downstream message to the gateway or cable modem of customer #N telling it which logical channel and subchannel the components of the requested program/service will be transmitted on so that the CPU in the cable modem or gateway can tune the tuner to the right carrier and demultiplex the components of the requested program/service from the designated subchannels. Step 374 sends a message to the downstream transmitter of the logical channel on which the requested components are going to be sent identifying which packets in the input stream of the transmitter are to be put on which subchannels. Step 376 then increments N by one to start work on the next customer. Step 378 then determines if the last customer's requests have been processed, and, if so, processing vectors back to step 346 to receive new program/service requests, as symbolized by step 380. If test 378 determines that the last customer has not had her requests processed, processing vectors back to step 362 along line 379 to start the loop again to process the next customer.

Returning to the consideration of step 364, if customer N has more than one tuner, then processing flows along line 365 to step 382 is performed to determine if the number of requested program(s) and/or services is greater than the number of tuners customer #N has. If not, step 384 is performed to find one or more logical channels with a sufficient number of open subchannels to carry all components of the requested program(s) and/or service(s) to customer #N. Next, step 386 is performed to send the PIDs, IP addresses and/or other identifying information for the components of the program/service ordered by customer #N to the culling switch or switches that are generating the streams of data that are to be modulated onto the logical channel or channels located in step 384 that will be used to transmit the requested program(s)/service(s) to customer #N. The switch or switches then use those PIDs etc. to cull out the packets of the requested program(s)/service(s) and assemble the output streams. Generally, all the components for a single requested program or service will be transmitted on the same channel, so the pull multiplexer tries to find a logical channel that has a sufficient number of open subchannels to carry all the components for a particular program. For example, if a requested video-on-demand program has a video, audio and data component, then a logical channel with at least three open subchannels is preferred. However, the different components of a requested program/service can be sent on different logical channels if necessary as long as the downstream messages tell the cable modem or gateway where to find all the components. Step 388 is then performed to send a downstream message to the gateway or modem of customer #N telling it which channel(s) and subchannel(s) it will find the components of the requested program(s) and/or service(s) will be found. Processing then flows along line 389 to step 390. Step 390 sends a message or messages to each of the downstream transmitters transmitting the logical channels located in step 384 to instruct them which packets (identified by PIDs etc.) to modulate onto which specific subchannels so that the customer will find all components of the ordered program(s)/services(s) on the logical channels and subchannels indicated in the downstream messages.

Steps 392, 394, 396 and 398 increment N by one, determine if the last customer has been processed, and, if not, vector back to step 362 and, if so, vector back to step 346.

Problems can arise when the number of programs/services requested by a particular customer exceeds the number of tuners that customer has if there are not enough subchannels available to carry the requested data on a plurality of logical channels equal to the number of tuners the customer has. For example, suppose customer #1 has only one tuner in her gateway/cable modem 28 and this tuner is already tuned to logical channel 5 for delivery of one video-on-demand program. Now suppose other residents of customer #1's household request three additional programs and services. If channel 5 has an 18 program slot capacity but there are only two open program slots on channel 5 that are not being used, there is a problem. In such a case, the management process may simply move the program or service customer #1 is currently viewing/using on channel 5 to another channel with adequate unused program slots and then add the three newly requested programs and/or services from customer #1's premises to that channel. The cherry picker will then send a downstream message either addressed directly to customer #1's gateway or cable modem or broadcast to all gateways or cable modems that indicates the channel the program or service customer #1 was already tuned to is now being broadcast on and the fact that the three new: requested program(s) and/or(services) are now being broadcast on the new channel and giving the PIDs of those program(s) and service(s),packets.

Figure 5A:
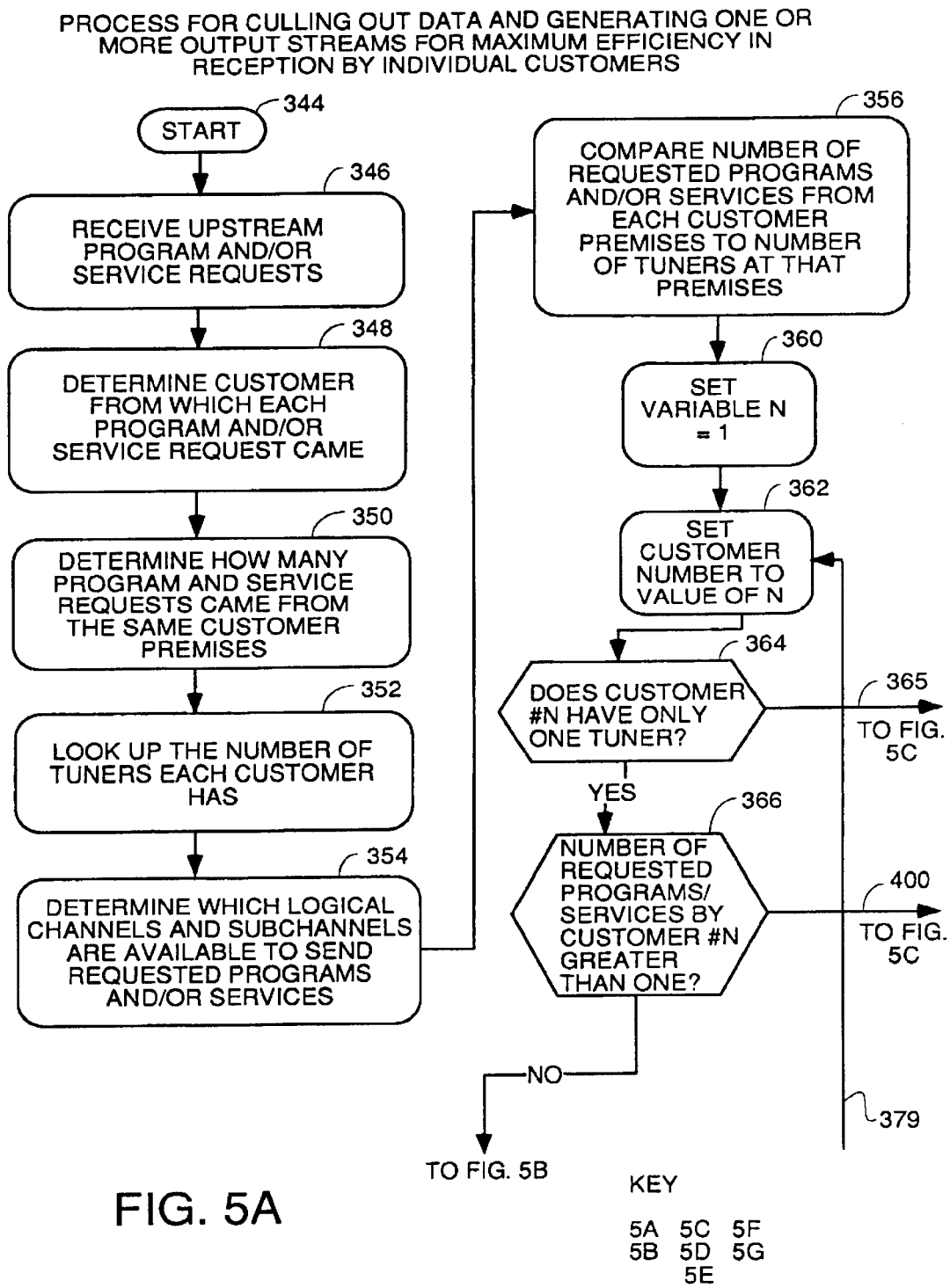
FIGS. 5A through 5G are a flow diagram of an optional process carried out in the gateway to optimize assembly of the output data streams for transmission to customers so that the most requests from the most customers can be honored given the number of tuners each customer has.
Figure 5B:
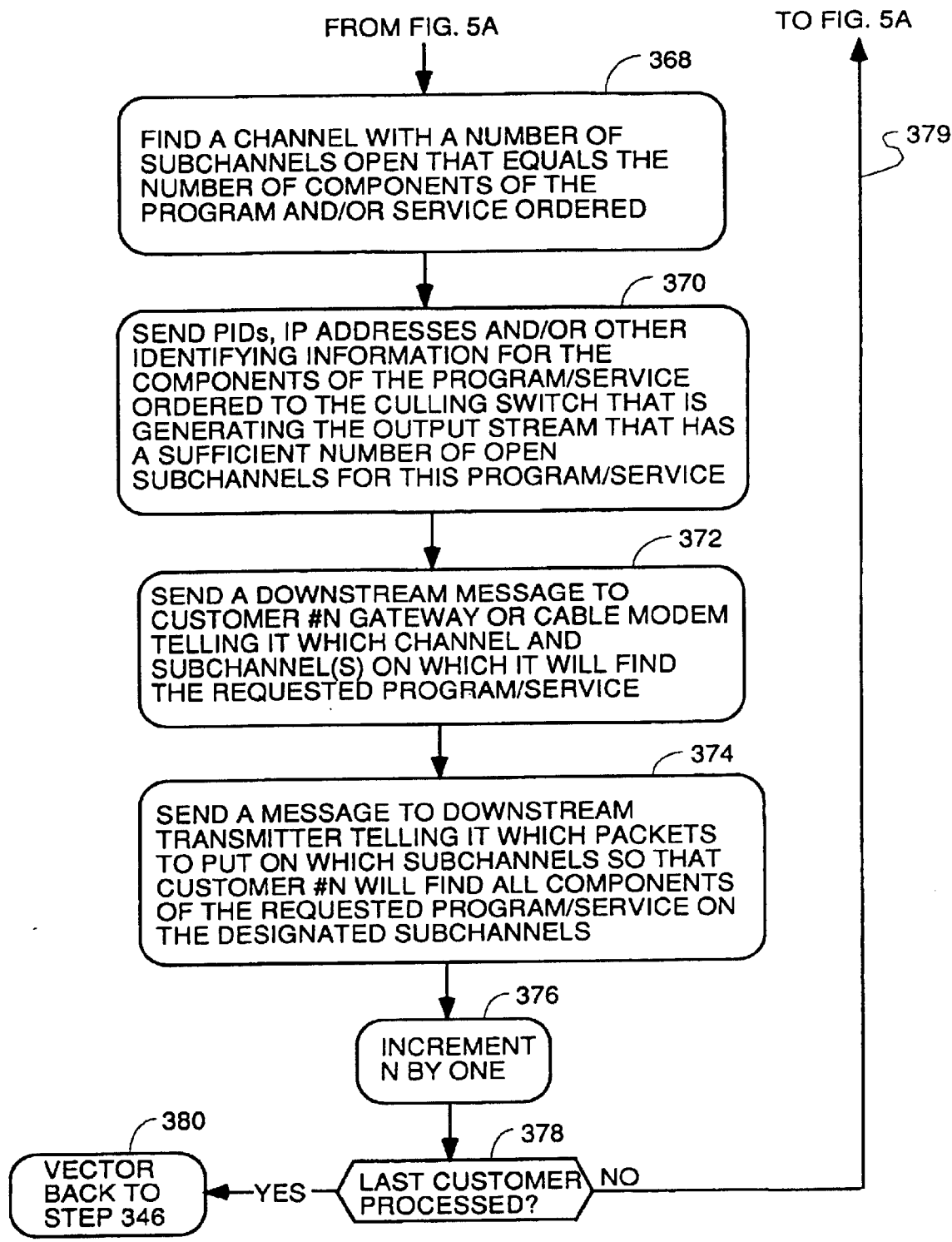
Figure 5C:
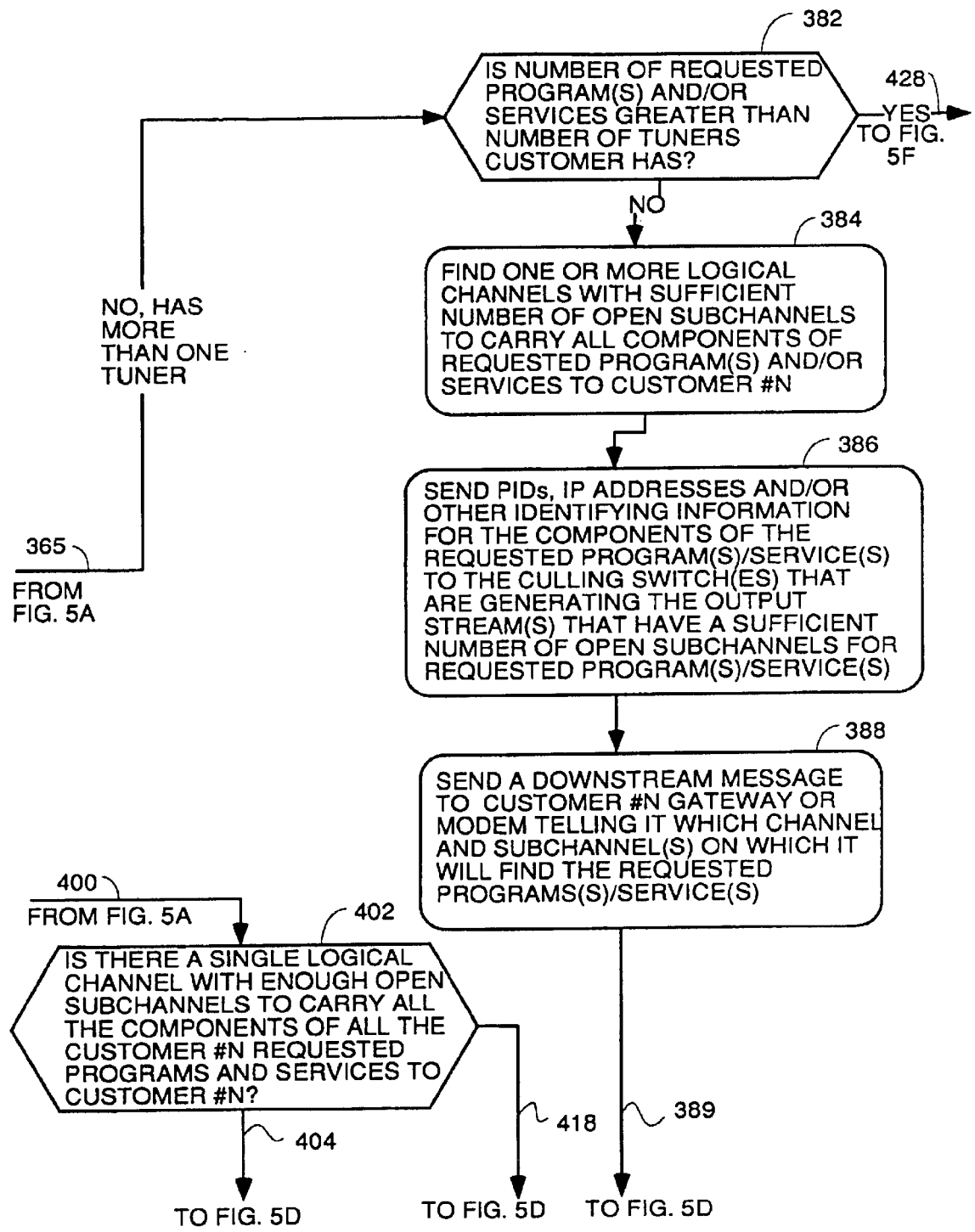
Figure 5D:
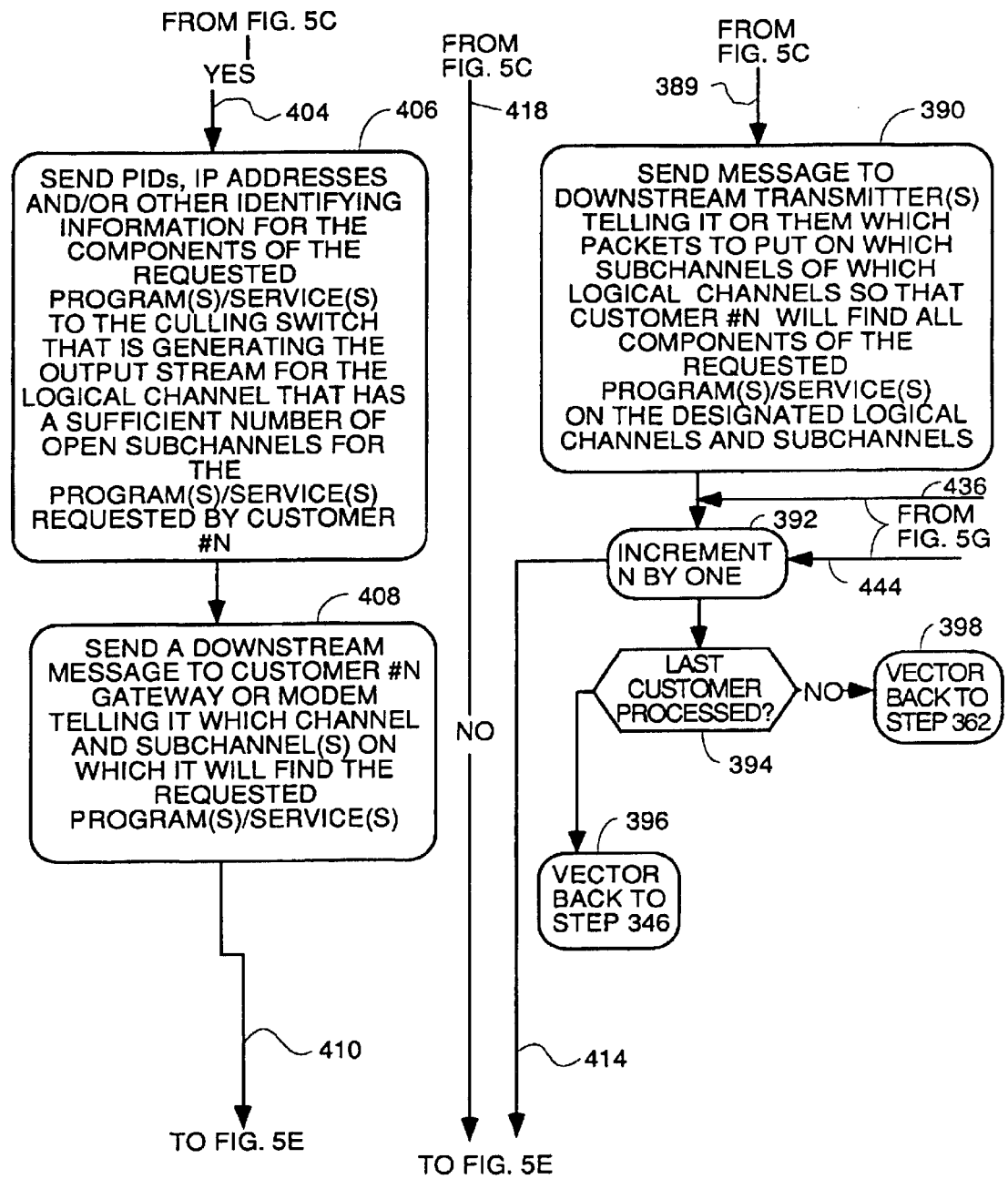
Figure 5E:
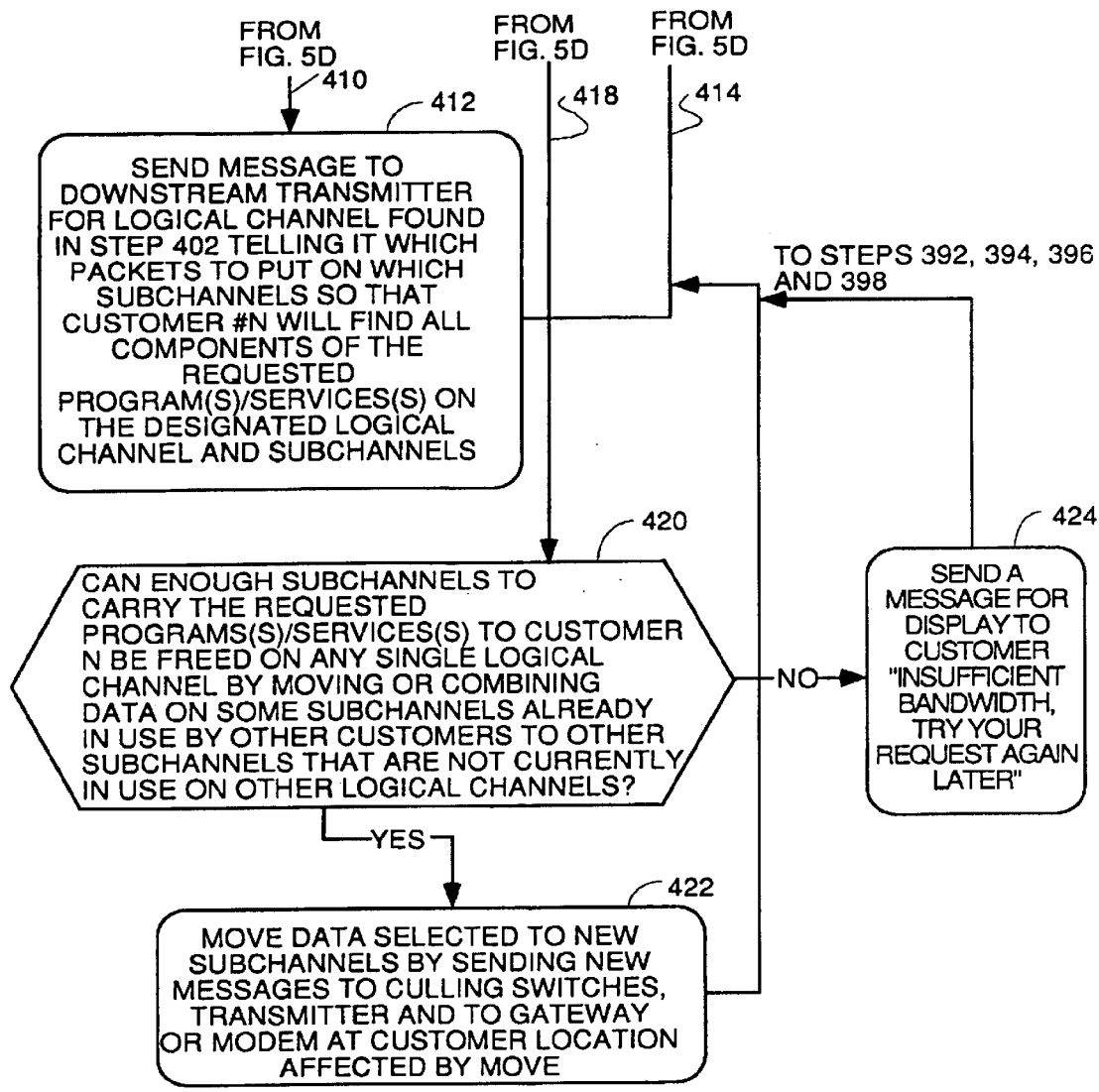
Figure 5F:
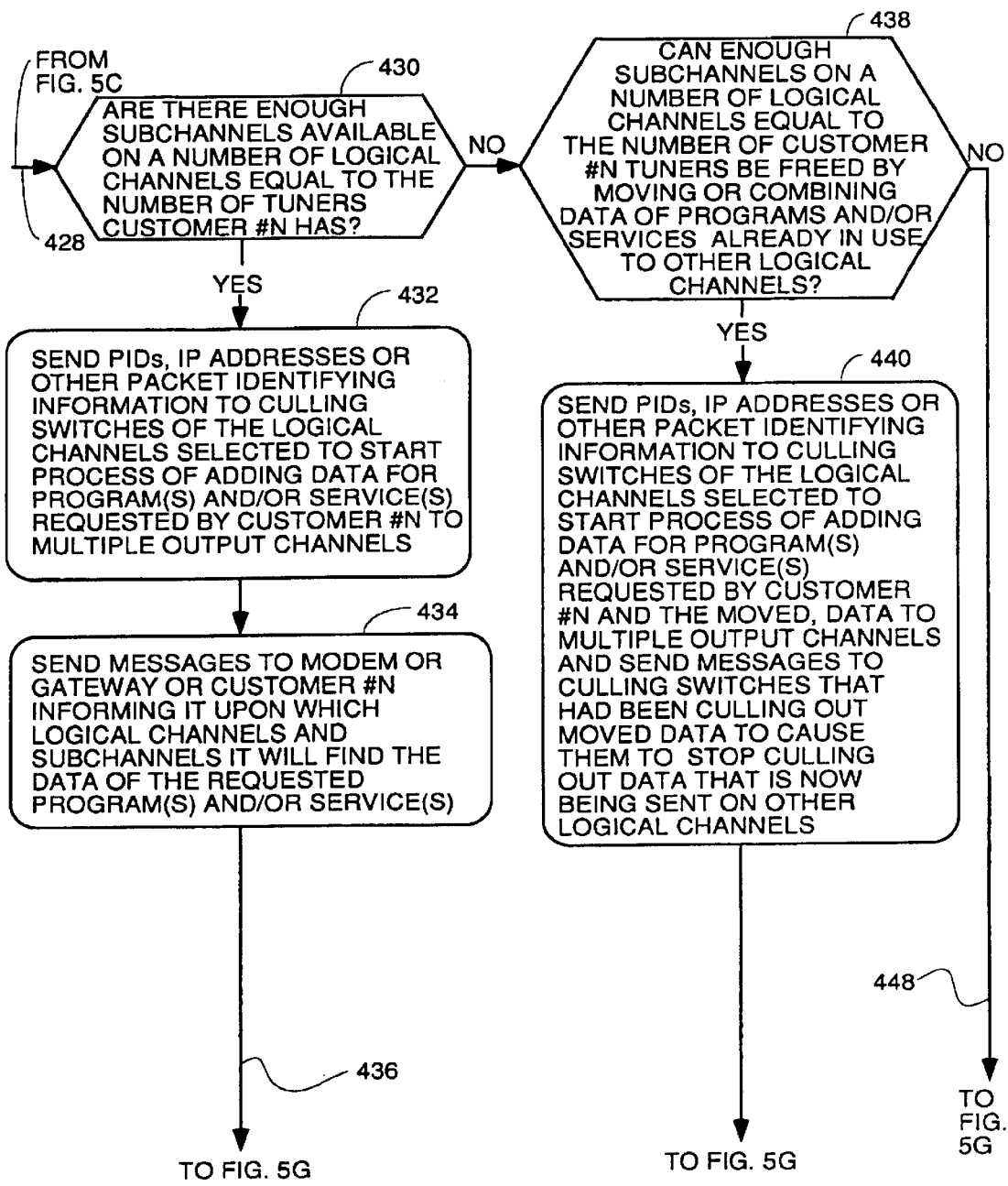

There are a number of different scenarios for matching the number of requests to the available logical channels and subchannels and the number of tuners each customer has. Any process that can accommodate as many requests as possible given the loading of the subchannels and the number of tuners available will suffice to practice the invention. The following steps from the various sheets of the flowchart of FIGS. 5A through 5X are only one example of a process that can do the necessary processing. Returning to the consideration of step 366 on FIG. 5A, if the number of requested program(s)/service(s) is greater than one but customer N has only one tuner, then processing flows on line 400 to test 402. Test 402 determines if there is a single logical channel with enough open subchannels to carry all the components of all the programs and/or services requested by customer N. If there is such a channel, processing flows along line 402 to step 406. In step 406, the PIDs, IP addresses or other information that identifies the packets containing data for the programs/services requested by customer N are sent to one culling switch. The culling switch these PIDs are sent to is the one which is generating the input data stream to the downstream transmitter which is transmitting the logical channel located in step 402. Next, step 408 is performed to send a downstream message to customer. #N's modem or gateway telling it which logical channel and subchannel(s) on which it will find the requested program(s)/service(s). Step 412 is then performed to send a message to the downstream transmitter which is transmitting the logical, channel found in step 402. This message tells the transmitter which packets to put on which subchannels of the logical channel so that the customer N gateway or modem will find them where it was told they will be. Processing then vectors along path 414 to step 392. Steps 392, 394, 396 and 398 on FIG. 5D are repeated to increment N and vector processing to the appropriate place to process the next customer or receive new requests.

Returning to the consideration of test 402, if there is no single logical channel that has a sufficient number of subchannels available to carry all the components of the program(s)/service(s) that customer N has ordered, then processing flows along path 418 to test 420. Test 420 determines if enough subchannels to carry all the components of the program(s)/service(s) that customer N ordered can be freed on any single logical channel by moving the data streams on subchannels already in use to unused subchannels on another logical. channel. This process will look at the current load on all logical channels and subchannels and compare it to the needed number of subchannels and pick a logical channel that is closest to having a sufficient number of available subchannels. The number of subchannels needed to be freed will be determined and the other logical channels will be examined to determine if there is another logical channel with a sufficient number of available subchannels to which the data can be moved or if the same data on separate subchannels in use by different customers can be combined without adversely affecting the services and/or. programs being received by the customer whose data needs to be moved. A combination of data can be made if two different customers are watching the same program and the data is being sent on different subchannels of the same or different logical channels, and if the data is in "synchronization". The data will be in synchronization if it is a broadcast that started at the same time for all users watching it or if the same video-on-demand movie or other production was ordered at the same time by two or more customers.

If such a move or combination can be made to free a sufficient number of subchannels, then the move or combination will be made, as symbolized by step 422.

To implement this move or combination, new PID and/or IP addresses etc. are sent to the culling switches to update their tables so that the culling switch generating the output stream for the logical channel from which the data is being moved will stop culling out the data packets to be moved and the culling switch generating the data stream for the logical channel to which they are being moved will start culling out the data packets. New messages are then sent to the transmitters involved so that they will put the data packets in the appropriate subchannels to which they are being moved on the new logical channel. Also, a new downstream message is sent to the modem or gateway of the customer whose data has been moved telling it where it can continue to find the data of the requested program(s)/service(s). Then steps 392, 394, 396 and 398 on FIG. 5D are performed again to increment N and begin processing the next customer.

Returning to the consideration of step 420, suppose there is no move or combination that can be made to free enough subchannels to send all the requested programs/services to a customer with a single tuner. In such a case, step 424 is performed to send a message for display to the customer indicating there is insufficient bandwidth to deliver all the requested data and requesting that the customer make her request again later. Then steps 392, 394, 396 and 398 on FIG. 5D are performed again to increment N and begin processing the next customer.

Returning to the consideration of step 382, suppose customer #N has more than one tuner, but the number of program(s) and/or service(s) she ordered is greater than the number of tuners in her gateway or modem. If test 382 determines such to be the case, processing vectors to test 430 on FIG. 5F. Test 430 determines whether enough subchannels are available on a number of logical channels equal to the numbers of tuners customer #N has to carry the program(s) and/or service(s) customer #N has ordered. Basically, the load on all logical channels and subchannels is analyzed to determine if enough available subchannels can be found to carry the program(s)/service(s) requested by customer #N on a number of logical channels equal to the number of tuners this customer has. If so, step 432 is performed to send the PIDs, IP addresses or other packet identifying information that can be used to cull out the packets of the program(s)/service(s) requested by customer #N. These PIDs are sent to the appropriate culling switches after the logical channels that have capacity are selected and the requested program (s)/service(s) are divided up into groups that will fit on the available subchannels on various logical channels. Next, step 434 is performed to send messages to the modem or gateway of customer #N informing it upon which logical channels and subchannels the requested program(s) and/or services will be found. Then path 436 is taken to step 392 on FIG. 5D to increment N and begin processing the next customer.

Referring again to step 430, suppose that process 430 could not find enough available subchannels on a number of logical channels equal to the number of tuners the customer has. In that case, processing vectors to test 438. Test 438 determines if enough subchannels can be freed to carry the requested programs and/or services to customer #N by moving the data of programs and/or services in use by other customers to other logical channels or by combining multiple requests for the same data. The combining aspect of the process represented by step 438 represents analyzing new requests to determine if the same program and/or service is already being pulled by another customer on a subchannel or if the same program and/or service is already being broadcast as pushed data. If the requested data is already being pulled or pushed on other subchannels, then the processes represented by step 440 and 442 of sending messages to the customer gateways and the transmitters and culling switches basically boils down to sending messages to the customer N gateway that tell it the logical channel(s) and subchannel(s) where the requested data is already being broadcasted or pulled by another customer. If the customer does not have enough tuners and the ones he has are already consumed by programs and/or services his family are already using and there are sufficient subchannels available on a logical channel to which one of the customer's tuners is already tuned, then a copy of the broadcast program/service or the program/service already being pulled by another customer is made on the available subchannels of the logical channel to which customer N is already tuned.

If step 438 concludes that enough subchannels can be freed by moving or combining data, then in step 440 the PIDs, IP addresses or other identifying information for both the customer #N requested programs and/or services and the programs and/or services that are being moved or combined are sent to the culling switches for the logical channels on which the customer N requested programs and services are to be sent and the new logical channels for the moved data. Also, messages are sent to the culling switches affected by programs and/or services that have been moved away to cause them to stop culling out the packets of the moved programs. Then step 442 is performed again to send messages to the gateway or modem of customer #N telling it where to find the requested program(s) and/or service(s). Step 442 also sends messages to the gateways and modems of customers whose data has been moved telling them upon which logical channels and subchannels they may now find the data of the programs and/or services they have been viewing or using. Then path 444 is taken to step 392 to begin processing the next customer.

Figure 5G:
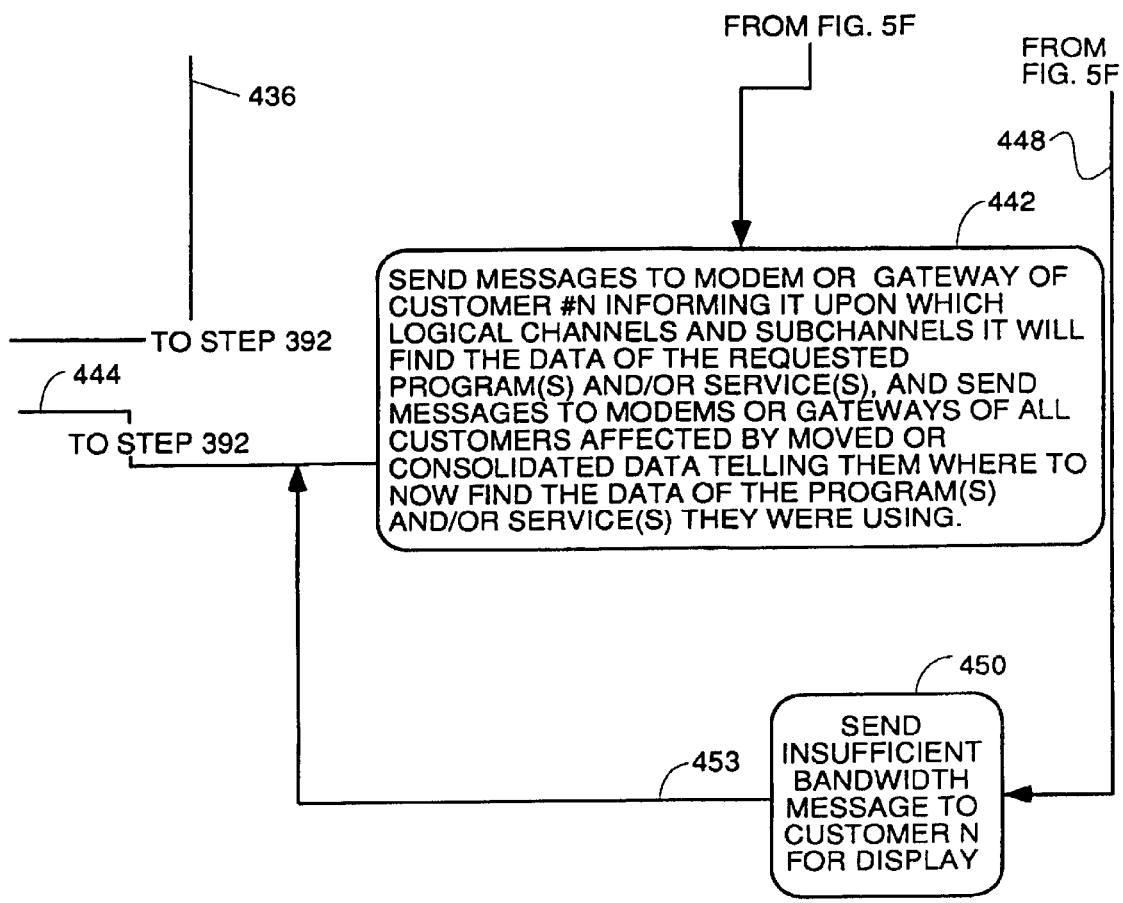

Returning again to test 438, if it is not possible to free enough subchannels to carry the requested programs to customer N by moving and/or combining data, then path 448 is taken to step 450 on FIG. 5G. Step 450 sends an "Insufficient bandwidth message" to customer N for display to her on the TV, remote or other device from which she ordered the program and/or service. Path 452 is then taken to step 392 to begin processing the next customer requests or receive new requests.

Details of Gateway Interfaces to Downstream Cable, Satellite, and ADSL

Figure 7A:
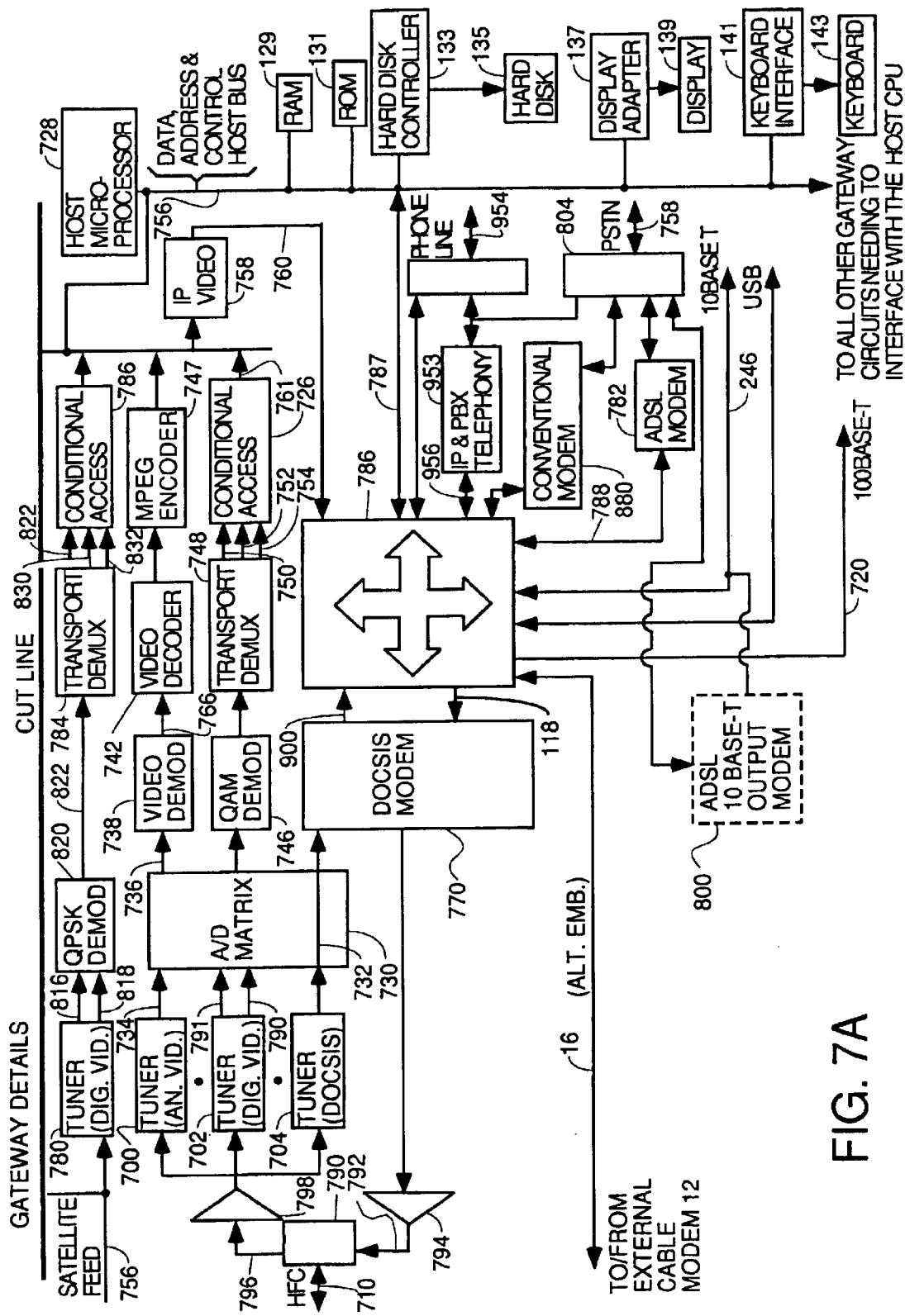
FIG. 7, comprised of FIGS. 7A and 7B, is a block diagram showing more details of the home gateway 308 in FIG. 3.
Figure 7B:
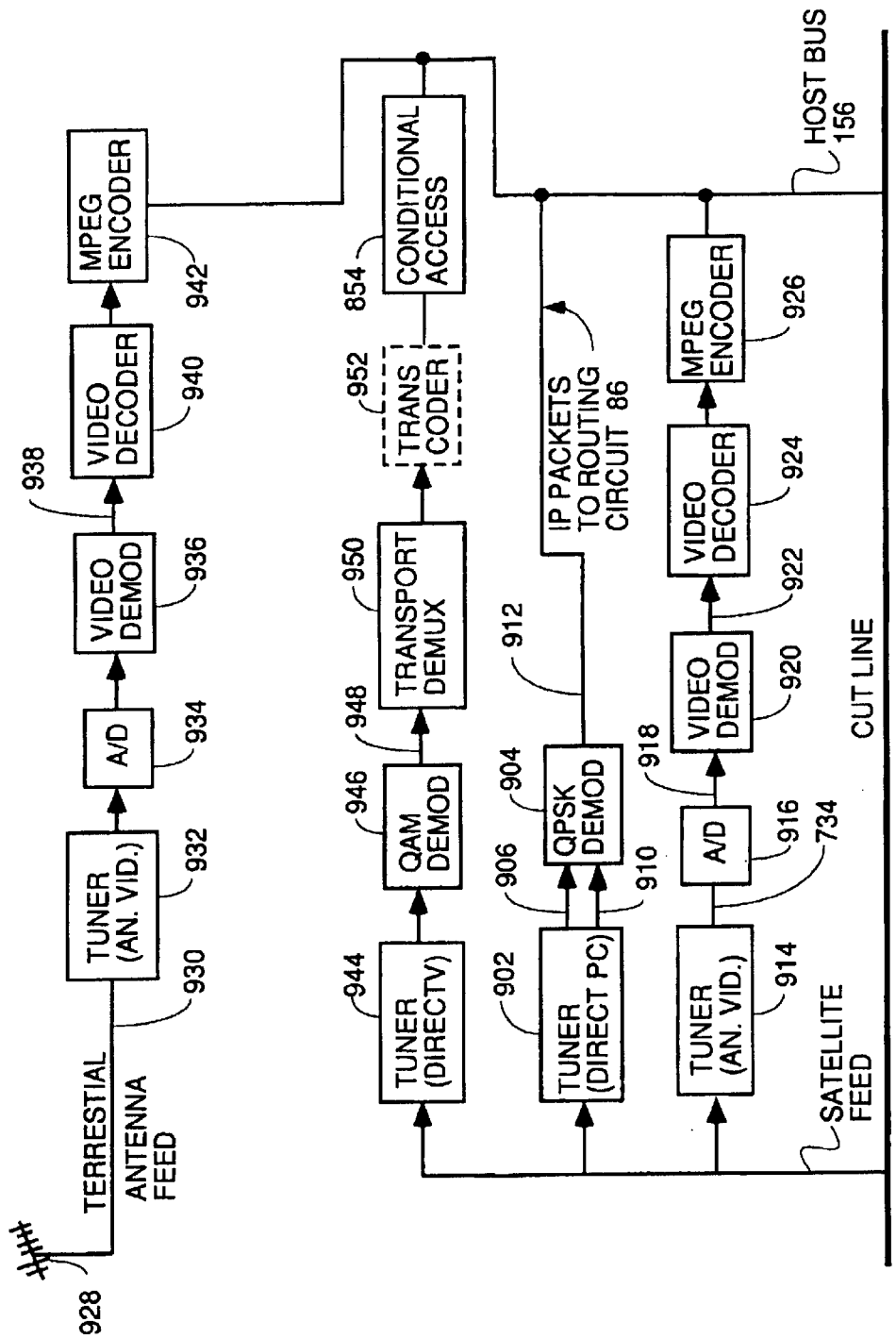

Referring to FIG. 7 comprised of FIGS. 7A and 7B (hereafter referred to as FIG. 7), there is shown a block diagram of one embodiment of gateway 308 configured as a standalone circuit where interfaces to the satellite, HFC and PSTN networks are all implemented on the circuit board. This circuitry may be an expansion card in a personal computer or it may be integrated into the motherboard of a personal computer. The other known components of the personal computer are not shown in FIG. 7 for simplicity, but suffice it to say that the host CPU of the PC is coupled to circuitry shown in FIG. 7 by the address, data and control buses of the PC such that the circuits that need control inputs or data from the host CPU may receive it. The control and data inputs needed by each circuit will be described when that circuit is described. The reference numbers used in FIG. 7 differ from those used in FIG. 3 because FIG. 7 discloses circuits which are not separately disclosed in FIG. 3 and are lumped all into one box.

The embodiment of the gateway 308 shown in FIG. 7 includes the entire circuitry of a DOCSIS 1.2 cable modem 770 therein (the "DOCSIS 1.2" label was an informal working title for a spread spectrum update to the DOCSIS 1.1 standard which was later adopted by the Cable Labs standards body as DOCSIS 2.0). Turning first to the interface circuitry to couple HFC to the LAN, HFC drop line 710 is coupled to an upstream and downstream combiner and isolation circuit 790. There, upstream modulated RF carrier signals on line 792 from upstream isolation amplifier or coupler 794 are coupled onto the cable 710 and downstream modulated RF signals are received from cable 710 and placed on line 796. Typically, combiner 790 will include a bandpass filter to prevent upstream RF signals from entering line 796 and may optionally include a termination for line 792 to prevent reflections. Isolation circuit 798, typically a buffer amplifier or capacitor or other circuitry such as a lighting arrester protects the internal circuitry of the gateway from any unwanted DC signals or lightning strikes on the HFC.

In the embodiment shown in FIG. 4, three tuners 700, 702 and 704 are used. Tuner 700 is tuned to one of the conventional CATV analog video channels in NTSC, PAL or SECAM format. Typically, the total bandwidth of the HFC will be divided up into different frequency bands for CATV FDMA analog video channels, an upstream DOCSIS data and management and control signals band, a digital VOD signals band and a downstream DOCSIS data band. The frequency band for upstream data and management and control signals extends from 0 to about 50 MHz. Within this band, upstream DOCSIS data will be modulated onto one carrier frequency and management and control data will be modulated onto another carrier frequency. There may be multiple upstream management and control channels at different frequencies or in different timeslots or on the same frequency with the data of each management and control channel having its spectrum spread with a different spreading code. Typically, the frequency band from 50 to 500 MHz will be reserved for FDMA 6 MHz wide analog CATV video signals. Digital video data such as for VOD or teleconferencing etc. is typically modulated onto one of a plurality of different frequency channels in a band above 500 MHz with each channel being about 6 MHz wide and containing a plurality of video, audio and associated data subchannels separated by TDMA. Downstream DOCSIS data such as web pages which are downloaded during high speed internet access is typically modulated onto a carrier having a frequency somewhere above the video on demand carrier frequencies.

One of the functions of the gateway 308 is to deliver requested services to, all the peripherals in the customer premises seemlessly over a shared LAN thereby eliminating the need for separate coaxial cable wiring to deliver CATV analog signals, a digital network to deliver digital data, telephone wires to deliver conventional telephone service. All these services are delivered via a single digital data distribution system comprised of one or more LANs. To that end, even CATV signals that are analog when they arrive are digitized, compressed, turned into IP packets and then into Ethernet packets and transmitted to the various televisions via a LAN.

Reception and Distribution of Analog CATV Signals

Tuner 700 starts this process by receiving control data from microprocessor 728 defining which CATV analog video channel which has been requested. Users request analog CATV broadcast channels via their IR keyboards or remote controls. These requests are encapsulated into management and control Ethernet packets addressed to host CPU 728 by a network adapter which, couples the TV which the user is watching to the local area network coupled to the gateway 308. The host CPU 728 receives these upstream request packets via router/NIC 786 and data path 787 and generates a bus packet on bus 756 addressed to tuner 700 telling it which channel to tune. The host bus 756 may be a PCI bus in a Windows based personal computer, but high traffic loads may bring such a bus to its knees since only two devices may use the bus to communicate at any particular time. In alternative embodiments, a high capacity multiplexed bus like an H.100 standard TDMA bus coupled by suitable bus drivers to the host bus in a computer with sufficient expansion slots for all the necessary expansion modules to implement a flexible gateway may be used. In other words, in smaller; bandwidth consumption embodiments where only one or two of the expansion modules are present, a Windows based personal computer with a PCI or ISA bus and one or two expansion slots may be sufficient. However, in higher bandwidth consumption embodiments where many or all of the expansion modules are present or might be added as the number of services and external networks to be used grows, the gateway 308 may also take the configuration of one or more personal computers, each with a fast microprocessor and a PCI or some other fast bus, each running one or more of the software processes for a different expansion module to divide up the labor. These servers would be coupled to the LANs by one or more NICs with their one or more host buses coupled to another expansion module interface circuit board by one or more high capacity buses such as an H.100 TDMA bus, a Firewire or even FDDI or Fibre Channel Arbitrated Loop LAN technology. The expansion module interface circuit board would have a plurality of expansion slots interfaced to the high capacity bus(es) or LAN(s) coupling the expansion module interface circuit board to the one or more servers. Each expansion slot would be available to couple one of the expansion modules shown in FIG. 8 to the shared software and hardware facilities of the servers. For simplicity of expression, all of these various alternative bus or LAN type interconnections between the server(s) and the modules in the expansion slots will be simply referred to as the host bus or the PCI bus 156. There will also be descriptions of circuits to the effect of placing data in PCI bus or host bus packets addressed to a particular circuit to which they are to be sent such as the IP video circuit 758 or the routing process 786. This is to be understood as actually placing the data into a packet with a destination address set to the destination circuit or process or seizing control of the host bus and writing the address of the destination circuit onto its control lines and placing the data to be transferred on the data lines and activating any necessary control signals to latch the address and strobe the data into a data register or other memory.

The RF output of tuner 700 on bus 734 is then digitized by an analog-to-digital converter in A/D matrix 730. The digital samples on line 736 are input to a video demodulator 738 which functions in the digital domain to demodulate the digitized analog video signal by removing the RF component. The video demodulator 738 outputs digital data on line 766 which represents a conventional baseband NTSC, PAL or SECAM format video signal.

The digital data on line 766 is at too high a bit rate to send over the LAN since uncompressed broadcast video is at 221 Mbps. Therefore, the video data must be compressed. MPEG II compression is preferred, but any known form of compression currently known or to be developed in-the future will suffice since the form of compression is not critical. MPEG II compression circuitry is well known, and is used for MPEG encoder 747. However, MPEG compression does not compress NTSC, PAL or SECAM format signals. They must first be converted to YUV format luminance and chrominance signals. This conversion is done in video decoder 742, which is a known type of circuit in any video system that uses MPEG II compression.

The compressed video data is encapsulated into PCI (or other type) bus packets addressed to IP video circuit 758. There, the compressed video data is encapsulated into IP packets addressed to the network adapter of the TV where the CATV video channel is to be viewed. The IP video circuit 758 determines which IP destination address to use in constructing the IP packets via data received from the host microprocessor 728. When the original request was received, the host microprocessor 728, in addition to telling the tuner 700 which channel to tune, also determines from the Ethernet packet source address which TV's network adapter requested the data. The IP address of this network adapter is encapsulated into a PCI bus packet and transmitted via host bus 756 to the IP video circuit. The IP packets encapsulating the digitized CATV channel are then transmitted via bus 760 to the routing process 786.

The routing process 786 is a conventional IP to Ethernet routing process which examines the IP packet destination addresses and looks up the corresponding Ethernet addresses. The IP packets are then encapsulated into Ethernet packets and routed to the appropriate LAN network interface card for LAN 718 or 720 depending upon the Ethernet destination address of each packet. The process works in reverse for incoming Ethernet packets from the LAN(s).

When the IP packets reach the network adapter of the TV that requested the CATV channel, they are converted to a video signal that can be displayed by the TV.

Video on Demand

One disadvantage of watching CATV broadcast channels is that there is no facility to have VCR like controls such as pause, rewind, play, slow motion or stop over the incoming video. This is one reason why VOD is more advantageous. We turn now to an overview discussion of VOD delivered via cable modem. Later, VOD delivered by ADSL modem or satellite dish will be discussed. The discussions herein regarding delivery of VOD however apply equally to delivery of video conferencing, services, home shopping, distance learning and other multimedia services involving video, images or other multimedia data. Also, there is great similarity in the functions and structure of the circuitry for receiving, recovering and distributing digital VOD via satellite so there will be some seeming replication of the discussions that follow. First, a quick overview.

The VOD downstream frequency band has multiple video channels, each at a different carrier frequency. Each video channel carries multiple subchannels of MPEG II compressed video with its associated audio, and sometimes with one or more additional subchannels devoted to associated data.

The tuner 702 is commanded by the host microprocessor 728 to tune to a particular VOD channel. The customer will order a particular VOD program using an infrared (IR) keyboard or remote control coupled to a network adapter such as network adapter 252 in FIG. 3. The microprocessor 728 receives the order information via management and control Ethernet packets generated by the network adapter and driven onto the LAN 720. As an example of how the video, audio and associated data subchannels of a VOD program are used, suppose the tuner 702 is tuned to a home shopping VOD channel where a plurality of customers wish to buy an item being shown by the video data on a first subchannel and being described on the associated audio data subchannel, there may be multiple customers who wish to buy the item who need to talk to an operator. These multiple customers can have their telephone calls digitized into IP packets on digital telephones with each packet addressed to the IP address corresponding to the telephone number shown on the screen. These packets get encapsulated into Ethernet packets and transmitted on the LAN 246 or 720 to the gateway 308. There, they are received by the switching process 786 and the Ethernet headers are stripped and the IP packets are sent to DOCSIS modem for transmission on an upstream channel.

At the headend modem, the IP telephony packets are recovered and routed to the IP address where the operators are standing by. Suppose, three callers are calling to buy the item being shown and described. The three different operators handling these calls have their speech digitized into IP packets addressed to the digital telephone being used by the caller they are talking to. These IP packets addressed to the telephones of the three different callers are QAM modulated by the headend modem modulator transmitting the VOD program and sent downstream as associated data on three different MPEG subchannels associated with the video and audio subchannels of the home shopping presentation.

The host microprocessor 728 tells tuner 702 which channel in the VOD band to tune to via control data transmitted via data, address and control bus 756 (also referred to as the host bus). The RF tuner 702 tunes to that channel and rejects all other signals. The A/D matrix 730 digitizes the output signals on lines 791 and 792 from the tuner 702.

Then the video, audio and associated values for each video, audio and data QAM modulated constellation point is recovered by the QAM demodulator 746.

The recovered data values are then separated by transport demultiplexer 748 into video, audio and associated data streams on lines 750, 752 and 754. The transport demultiplexer receives control data from the host microprocessor via data, address and control bus 756 which tells it which subchannels to separate out in the demultiplexing process.

A conventional conditional access circuit 726 then decrypts the recovered data to prevent any unauthorized access thereto. The decryption process can be the same process used in current Ku band satellite digital video delivery or any other conventional encryption process. Since VOD subchannels are sent to only particular users, the data can be encrypted by PGP using the public key of the user to which the data is directed. That user then uses her private key to decrypt the data.

The conditional access circuit has a conventional PCI or other bus interface circuit. Typically the gateway is implemented as one or more circuit boards on a personal computer such as a Pentium class or PowerPC Macintosh which has a system bus. Any system bus which is fast enough to carry the worst case system load bit rate will suffice. The worst case system load is based upon the number and type of peripherals in the house. Typically, a compressed digital video channel can be delivered with good picture quality at 2 Mbps, so if a household has 4 TVs all of which are tuned to a different VOD channel and one video conference going on, 10 Mbps should be adequate. PCI buses have maximum bit rates much above 10 Mbps so a PCI bus for system bus 756 is adequate for most applications. The conditional access circuit's bus interface packetizes the decrypted video, audio and associated data into PCI bus packets which are addressed to an IP video circuit 758 and placed on bus 756 via line 761.

The IP video circuit receives the PCI bus packets and encapsulates the video and audio data into IP packets addressed to the network adapter which ordered the VOD program. The associated data is encapsulated into IP packets addressed to an IP telephone coupled to the local area network 246 or decoder 252. The IP packets are then transmitted via line 760 to the routing process 786.

The routing process 786 is a conventional IP to Ethernet routing process which examines the IP packet destination addresses and looks up the corresponding Ethernet addresses. The IP packets are then encapsulated into Ethernet packets and routed to the appropriate LAN network interface card for LAN 246 or 720 depending upon the Ethernet destination address of each packet. The process works in reverse for incoming Ethernet packets from the LAN(s).

We now turn to a more detailed discussion of the process carried out by the system to receive VOD via either satellite, HFC or ADSL.

FIGS. 9A–9E together comprise a flowchart of the preferred embodiment of the processing which occurs in the system to order a VOD selection via either HFC, satellite or ADSL modem. Referring jointly to FIGS. 7A and 7B, 5 and 9A–9E, a user orders a particular video program via the IR keyboard or remote control acting as a pointing device to point to a displayed menu selection on a TV. That selection is received by the IR or RF receiver in the network adapter, as symbolized by step 706 in FIG. 6A. The video selection along with the IP address of the network adapter from which the order originated is encapsulated in an IP packet and then encapsulated in an Ethernet packet by the network adapter and launched onto LAN 246 (step 708). The IP packet has the IP address of network adapter as its source address and the IP address of the VOD server as its destination address. The IP address will usually be different depending upon whether the VOD selection has been ordered via HFC, satellite or ADSL since each network probably has its own video server. The user typically picks the VOD selection from a menu displayed on her screen for each network, so by pointing to the desired selection on the menu of the ADSL network, for example, the IP address is set to the IP address of the video server for the ADSL network.

The network adapter encapsulates the IP packet requesting the video selection in an Ethernet packet (step 708). The Ethernet packet destination address is the routing/network interface process 786 in the gateway. The IP packet payload message identifies the movie or other video program desired and, in some embodiments, identifies the particular VOD channel and subchannel the gateway's VOD tuner will be tuned to (step 708). MPEG II compressed video is transmitted on two or more subchannels (one video, one associated audio and zero or more associated data subchannels), and this is done regardless of whether the delivery media is HFC, satellite or ADSL. Step 708 represents the preferred process wherein the headend of the HFC, satellite network or ADSL central office monitors the channels and subchannels for load and sends downstream load balancing messages indicating which channels and subchannels are free. These load balancing messages are monitored by the gateways, and the channels and subchannels that are available are selected by the gateways for "camping" thereby helping balance the load across the network. In other embodiments however, the video server and/or headend may simply put the requested video selection on any unused subchannels of a channel that is not fully occupied and sends a downstream management and control message to the gateway from which the request originated indicating where the requested video selection will be found. The host microprocessor 728 in the gateway then sends data to its circuitry to cause the right channel to be tuned and the right subchannels to be demultiplexed. The "subchannel" means the particular timeslots or spreading codes or PIDs to use in receiving the video data when tuned to the frequency of the "channel". In embodiments where only one video subchannel per channel is carried, then subchannel and channel mean the same thing.

In the preferred embodiment, the headend modem (or other headend circuitry such as the uplink transmitting center in the case of satellite or the ADSL central office—hereafter these other headend circuits will be referred to as headend modems for brevity) has a plurality of VOD modulators/transmitters (hereafter called modulators), each of which is coupled to the VOD server and each of which receives a plurality of streams of MPEG II compressed video data. Each modulator is structured to transmit one VOD channel downstream with the plurality of MPEG II compressed video/audio/associated data streams being multiplexed therein.

To implement the preferred form of load balancing, the headend modem keeps track of which subchannels of each downstream VOD channel are in use. It then broadcasts management and control messages to all gateways via the HFC, satellite downlink or ADSL lines of subscribers indicating which VOD channels and subchannels are available and which upstream channels the gateways are to use in sending messages that indicate that a gateway has "camped" on a particular channel and subchannel.

The meaning of the term "camped" or "camping" is as follows. The gateways receive these broadcast load balancing messages and the host CPU of each gateway with a pending VOD request commands their VOD tuners (such as tuners 702 or a corresponding tuner in ADSL modem 782 in FIG. 7A) to tune to a channel that has an available subchannel, as symbolized by step 708. The host CPU then commands the appropriate transport demultiplexer (e.g., demultiplexer 748 for HFC delivery or demultiplexer 784 in the case of satellite or a similar but not shown demultiplexer in the ADSL modem 782) to demultiplex and select out only the compressed video and audio data subchannels carrying the requested program as well as the associated data subchannels. "Camped" or "Camping" therefore means tuning of the appropriate digital VOD tuners and transport demultiplexers in the gateway to a particular channel and subchannel.

The channel and subchannel camping information is included by the gateway in the IP packet bearing the upstream video request, or is included within a separate IP packet generated by the gateway that refers to the IP packet bearing the VOD request, also as symbolized by step 708. This camping data aids the video server or router in the headend modem (or the corresponding circuitry in a satellite or ADSL VOD network) to get the requested video data to the correct modulator which is transmitting on the VOD channel to which the gateway coupled to the requesting IP address is tuned. The channel and subchannel data included in the upstream message is also used to control that modulator to put the video and associated audio data on the appropriate channel and subchannel to which the gateway which made the request is tuned.

Figure 9A:
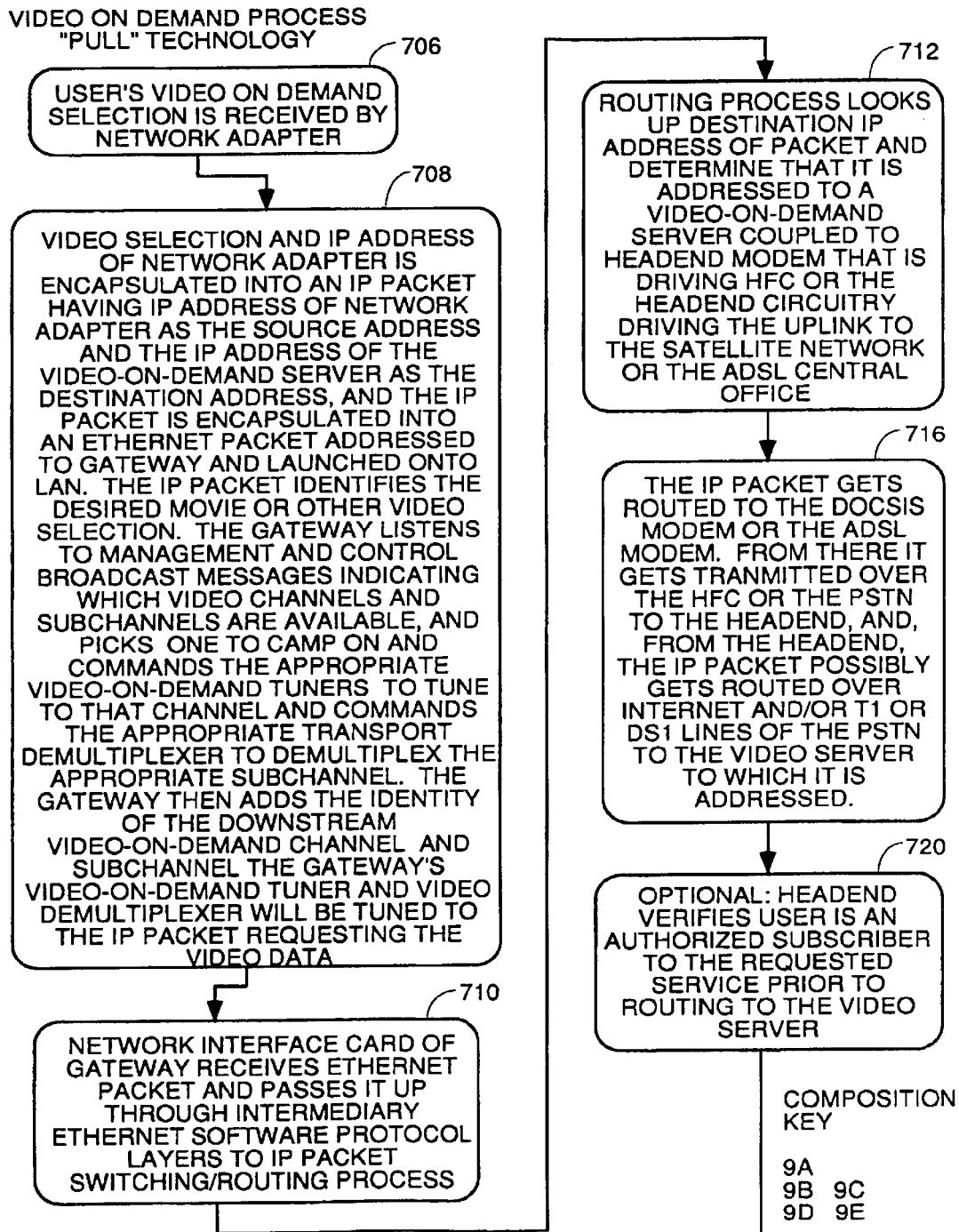

Continuing with the discussion of FIG. 9A, the Ethernet packet is received by switching process 786 (after it passes through the network adapter card of the host computer and up through the Ethernet protocol layers where the Ethernet header is stripped off as symbolized by step 710). The switching process looks up the destination address of the IP packet in a lookup table and determines from the destination address of the IP packet that it is directed to a VOD server coupled to the headend modem driving HFC 710 or the headend circuitry driving the uplink to the satellite or to the ADSL central office (step 712).

Step 716 represents the general process of transmitting the IP packet containing the VOD program request to the appropriate video server over the appropriate transmission media. The following paragraphs discuss the various cases individually, and step 716 is to be interpreted as covering each of these individual cases depending upon which video server is addressed by the IP packet. The following discussion assumes the gateway is equipped with HFC, satellite and ADSL expansion modules so that VOD can be ordered from any of these three networks. The gateway however may have only some subcombination of one or more of the HFC, satellite or ADSL modem expansion cards, so step 716 will only represent routing the IP request packet to one video server or possibly a selected one of two different video servers delivering VOD over two different networks.

In the case of an IP request packet addressed to a video server coupled to the HFC 710 via the headend modem for delivery of a VOD selection via the HFC, step 716 represents the following subprocess. The IP packet gets routed to DOCSIS modem 770 and transmitted on an upstream management and control; channel. In the preferred embodiment, the management and control channel used to transmit the upstream request is the channel designated in a downstream load balancing message from the headend modem indicating which channels and subchannels are available and which upstream channels the gateways are to use in indicating they have camped on one of the available channels and subchannels. The IP packet is recovered from the HFC and coupled directly or via the internet to the video server to which it is addressed. The video server may be coupled directly to headend modem or indirectly via the internet in which case the IP request packet is sent by a router at the headend over the internet to the video server.

In the case of an IP request packet addressed to a video server coupled to the satellite uplink headend circuitry, the upstream channel is over the PSTN so step 716 represents the following. The IP packet get routed to the ADSL modem 782 or the DOCSIS modem 770 for upstream transmission. If routed to the ADSL modem, it transmits the IP packet request message upstream over the PSTN lines to the ADSL central office where it gets routed to the video server coupled to the satellite uplink over a connection to the internet at the CO or a dial-up connection over the PSTN to the video server directly.

If the IP packet addressed to a video server that delivers VOD over the satellite network is routed to the DOCSIS modem, the IP packet gets transmitted over the HFC to the headend DOCSIS modem. There, the packet gets recovered and reassembled (if necessary) and sent to a router for delivery over the internet or other WAN to the video server to which the packet is addressed. Alternatively, the headend DOCSIS modem may make a dial up connection over the PSTN to the video server or use IP telephony to deliver the packet to the video server over the internet via IP telephony circuitry coupled to the internet at the video server.

If the IP VOD request packet is addressed to a video server that delivers via ADSL, step 716 represents the following. Routing process 786 routes the IP packet to the ADSL modem 782 where it is transmitted via the ADSL upstream channel to the ADSL modem at the CO. The CO then routes the IP VOD request packet to a video server directly coupled to the CO or gives it to a router connected to the internet for routing to a video server coupled to the CO via the internet (the term internet means the internet or any other wide area network currently in existence or which may come into existence in the future). Alternatively, the CO may make a dial up connection to the video server over the PSTN and send the IP VOD request packet over the dial up connection or may communicate with another CO where a video server is located by a T1 line or DS1 or other high speed telephone lines. The processing and circuitry for ADSL delivery of video on demand taught in U.S. Pat. No. 5,247,347 may be used, and that patent is hereby incorporated by reference.

Step 720 represents the optional step of authentication and/or conditional access gating carried out at the headend prior to routing the IP request packet to the video server. In some embodiments, the IP packet bearing the VOD request is routed to the video server only if the user making the request is authenticated and/or is an authorized subscriber to the requested service. This is typically by using the source address as a search key to search a lookup table of authorized users. The manner in which the requested services such as VOD are monitored so that they are delivered only to authorized subscribers is not critical to the invention, and the lookup function mentioned as part of step 720 can be replaced with any known manner of gating services only to authorized users. The gating function can also be done at the gateways after transmission of the VOD data downstream, and the gateway shows conditional access modules 726 and 787 and 854 representing these embodiments. In these embodiments where the conditional access gating function is performed at the gateway, step 720 is not needed. Processes for performing conditional access gating at the customer premises are well known in C band and Ku band subscription-based analog and digital video broadcasting, and need not be detailed here. To implement this known type of conditional access at the consumer premises, each gateway has a decryption module (726, 786 and similar circuitry in ADSL modem 782) with a key or password stored therein. This key or password is used by the video server or other service provider to encrypt the VOD data or other data encoding the requested service using the authorized subscriber's public key. Only that subscriber can decrypt the data using his private key. The conditional access modules 726 and 787 and 854 in FIG. 7A are intended to symbolize any of these known prior art structures and processes for blocking access by unauthorized persons to services.

After the IP packet reaches the video server, it reads the IP packet and opens the file storing the data of the requested movie or other video production (step 724). The video server then begins transmitting the video data as IP packets addressed to the network adapter that requested the movie (step 724). The IP packets contain compressed video data, typically by MPEG II compression. Step 724 is intended to represent one of the following three subprocesses of delivery of the video data bearing IP packets depending upon the video server to which the original IP packet bearing the VOD request was directed and whether the IP video data packets are to be delivered over HFC, via satellite or via a DSL connection. Step 724 is not intended to represent delivery of the VOD data by all three networks. The discussion of each subprocess is labeled by a header, and three different lines of steps are shown in FIGS. 9A–9E for the three different delivery networks since each delivery network is coupled to different circuitry in the gateway.

First, in the case of HFC delivery, step 724 represents the process of transmitting the IP VOD packets to the modulator in the headend modem which is transmitting downstream on the channel identified in the original request packet. Transmission to this modulator can be by a local direct connection, or via the internet or other WAN or by a T1 or DS1 leased line or possibly by other high speed PSTN connection such as DSL.

The video data is compressed in any known manner and is encrypted before transmission. The preferred manner of implementing conditional access is to do the gating function at the video server end of the connection to avoid wasting downstream bandwidth on requests by unauthorized users.

In the HFC delivery case, the compressed video and audio data (and possibly associated data such as IP telephony packets) is transmitted by the headend on the channel and subchannels identified in the camping data given in the original request message and arrives at the gateway via HFC 710 (step 736). In alternative embodiments, the video server and headend will cooperate to put the VOD data on unused subchannels of a channel that is not fully utilized and send a downstream management and control message telling the gateway where to find the VOD program it requested (step 736).

Upon reaching the gateway on the HFC connection, the RF downstream signal is coupled through coupler 790 to buffer/isolation circuit 798 and reaches tuners 700, 702 and 704. Tuners 700 and 704 reject it because they have been instructed by the host CPU 728 of the gateway to listen on the analog video and DOCSIS data carrier frequencies, respectively. Tuner 702 however has been instructed by host microprocessor 728 to tune to the channel on which the VOD data is modulated. In tuner 702, the RF signal is received, the RF component is removed and, a baseband signal is output on line 790. In some embodiments, the tuner 702 outputs an IF signal on line 790 which is digitized in A/D matrix 730 with the IF mixed down to baseband by QAM demodulator 746 prior to demodulation of the constellation points. Also, in some embodiments, conventional carrier recovery and clock recovery is performed in tuner 702, and the RF component is removed using a local carrier synchronized in frequency and phase with the transmitter's carriers to reduce the RF signal to I and Q baseband signals on lines 790 and 791.

The VOD data bearing RF carrier is QAM modulated, so the tuner outputs a complex analog baseband or IF signal on line 790 with an inphase and a quadrature component, each having multiple sample periods each of which defines the I and Q values for one constellation point. Both components are sent to A/D matrix 730 for sampling with one sample per constellation point on each of the I and Q signals.

The A/D matrix is comprised of either two or three A/D converters depending upon whether the DOCSIS modem 770 has A/D conversion circuitry therein. Typically, it does, so the output of the DOCSIS data tuner 704 on line 132 is shown as passing the baseband signal straight through the matrix 130 without any sampling thereby (the DOCSIS tuner 704 is actually part of the DOCSIS modem 770 usually).

The samples of the baseband analog I and Q signals on lines 790 and 791 containing VOD data constellation points are output on bus 737. The process of, receiving the RF downstream VOD signal and demodulating and digitizing each constellation point's I and Q values is symbolized by step 736. In the preferred embodiment, the clock signal embedded in the data (or transmitted on a separate channel in some embodiments) defining the boundaries of each constellation point is recovered by tuner 702 and is made available to any of the other circuits that need it to deal with the video data.

The digitized, compressed VOD data is typically QAM-64 modulated. This means that the video and audio data is transmitted in the form of constellation points each point transmitted during a different time on the quadrature carriers with video, audio and associated data constellation points transmitted on different subchannels (different PIDs) on the same channel. Each video, audio or associated data point takes the form of a complex number having a phase and an amplitude value. QAM demodulator 746 determines the complex value of video, audio and corresponding data points of the compressed VOD data that correspond to each constellation point (step 740).

Transport demultiplexer 748 functions to demultiplex the video, audio and associated data points from their respective subchannel timeslots (or codes in embodiments where the subchannels are CDMA multiplexed) as symbolized by step 744. The video demultiplexer receives a control data input from the microprocessor 728 that tells the demultiplexer which subchannel timeslots (or codes) to use in retrieving the requested VOD data.

The retrieved video, audio and associated data is output in compressed form on buses 750, 752 and 754 to a conditional access circuit 726. This optional circuit descrambles the data if the user is authorized to receive the program ordered or does other known types of conditional access gating if the conditional access function has not already been done at the headend (step 192). If the user is authorized to receive the VOD data, the video, audio and associated data points are encapsulated into bus packets used on the host bus 756 and sent over the bus to an IP video encapsulation process 758. Typically, the host bus is a PCI bus so known PCI bus interface circuits in conditional access circuit 726 encapsulate the VOD data into PCI bus packets addressed to the IP video encapsulation circuitry (step 792).

The IP video circuitry monitors the bus 756 for packets addressed to it and when it finds one, it takes the PCI bus packets that together comprise an IP packet of VOD data and reassembles the VOD data therein into an IP packet payload. In cases where the VOD data was never put into an IP packet format at the headend, the VOD video and audio data are assembled into IP packets addressed to the network adapter that requested the VOD program. Any associated data is encapsulated into an IP packet addressed to the appropriate peripheral. Usually, the IP destination address to which the video, audio and associated data are bound is included within the data itself, and if an IP packet was broken up into, for example octets or ATM cells for transmission, the original IP source and destination addresses are preserved such as by the methods described previously herein.

In the preferred embodiment, the IP source and destination addresses in the IP packet data within the PCI bus packets are used to assemble an IP packet header upon reassembly of the IP packet. The resulting IP packets are transmitted over line 760 to the routing process 786 in step 794. In embodiments where the VOD video, audio and associated data was never placed into an IP packet format, the host 728 keeps track of where each VOD request came from on the LAN and the addresses of the video server to which each is addressed. Then, when data arrives from that video server (as determined by the source address of the data or the network, channel and subchannel on which the data arrived), the host 728 sends data to the IP video circuit 758 telling it the IP address of the network adapter the video and audio data are to be addressed to and the IP address of any other peripheral to which any associated data is to be sent. The case where the VOD data is not originally encapsulated into an IP packet could happen where a video server is coupled directly to a headend modem or a satellite uplink facility or an ADSL CO. Step 794 is to be also interpreted as covering this alternative case of constructing IP packets using IP addresses supplied from the host 728 which is monitoring all outgoing VOD requests.

The routing process 786 receives the VOD IP packets and reads the IP destination address and determines that the IP address is mapped to the Ethernet address of network adapter that ordered the program. The IP packets addressed to this network adapter are then encapsulated into Ethernet packets addressed to the network adapter that ordered the program and sent to the appropriate network interface circuit in routing circuitry 786 for launching onto LAN 246 (step 796). The household might have multiple TV sets, each with its own network adapter. In such a case, the IP destination address in the VOD data will be used to determine which network adapter ordered the program and that network adapter's Ethernet address will be used in the Ethernet packet headers of the Ethernet packets into which the VOD data IP packets are encapsulated. The routing circuitry will then determine which LAN and NIC to use to get the data to the right TV.

DSL Network Delivery

Figure 9B:
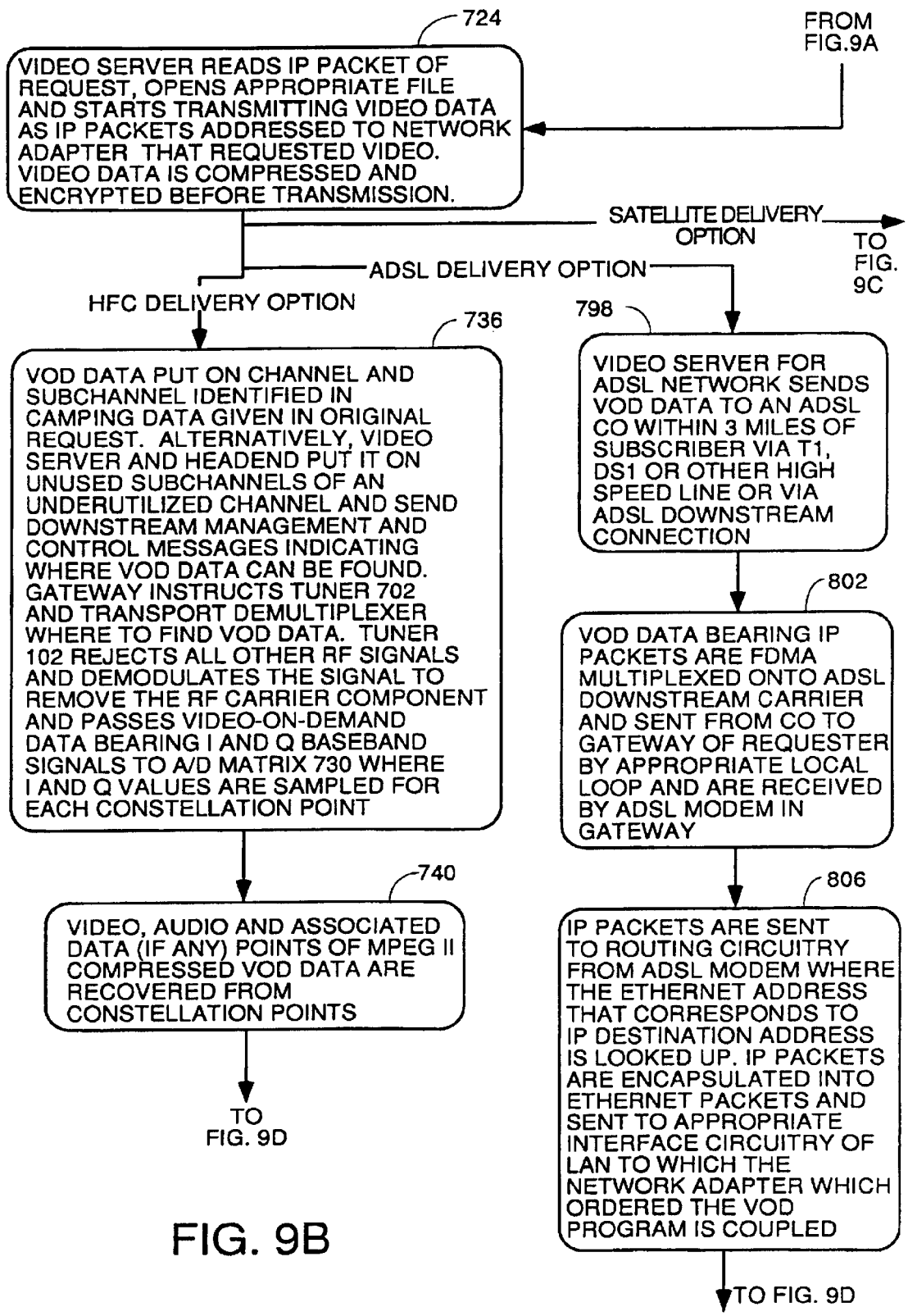
Figure 9C:
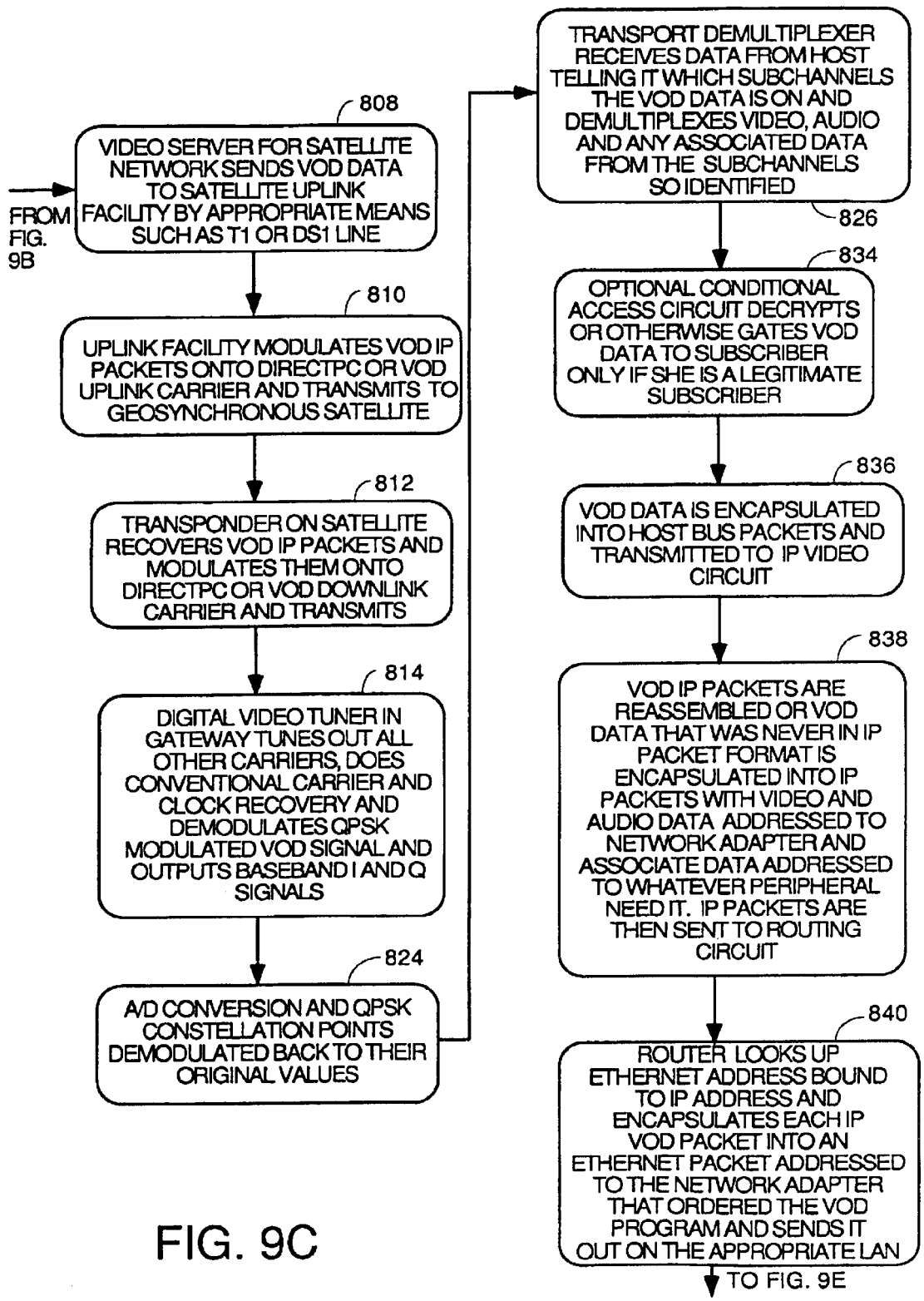
Figure 9D:
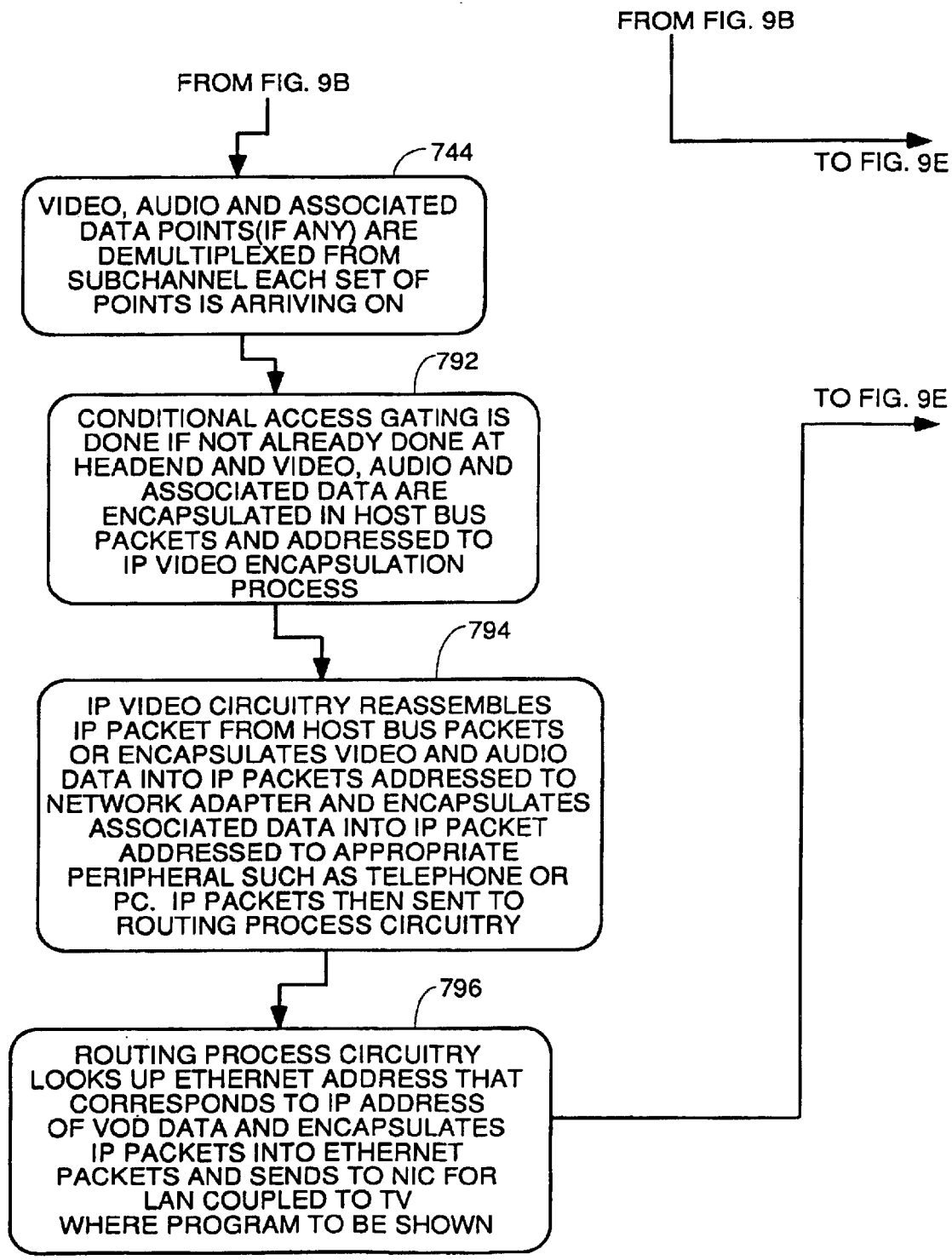

In the case of ADSL delivery (or delivery by any digital subscriber line service with adequate bandwidth), the IP packets are transmitted from the video server to an ADSL central office within approximately 3 miles of the subscriber by a T1 or DS1 line typically although an ADSL downstream connection might be used if the possible maximum load of VOD data being sent to this particular CO is light enough (step 798, FIG. 9B).

From the ADSL central office, the video data IP packets containing MPEG compressed data are FDMA multiplexed onto the ADSL downstream carrier and transmitted to the gateway of the requesting subscriber via the appropriate local loop. At the gateway, the IP packets arrive on the PSTN local loop 759 and coupled through an isolation buffer 804 to the ADSL modem 782(step 802).

The ADSL modem 782 is a conventional structure and recovers the IP packets in conventional manner and outputs them on line 788 to the routing process 786. There, the IP packets bearing VOD data are encapsulated in Ethernet packets addressed to the NIC of network adapter which ordered the video program and sent to the appropriate NIC in routing circuitry 786 which interfaces to the LAN to which the network adapter which ordered the VOD program is coupled (step 806).

In embodiments where only a single LAN is in use at the customer premises, an ADSL modem 800 (shown in dashed lines to indicate it is an alternative embodiment) with an Ethernet output interface may be substituted for ADSL modem 782 with the ADSL modem output coupled directly to the LAN.

Satellite Network Delivery

In the case of satellite delivery of the video data IP packets, the video server for the satellite network delivers the VOD data IP packets to the satellite uplink facility by any suitable means such as a T1 or DS1 leased line or by direct connection to the uplink transmitter if the video server is located at the uplink facility (step 808).

The uplink facility modulates the IP packet data onto the DirecPC uplink carrier or another carrier devoted to VOD applications and transmits it to a geosynchronous satellite (step 810).

A transponder on the satellite then recovers the IP packets and QPSK modulates them (or using some other suitable modulation scheme) onto a VOD downlink carrier and transmits them to all the dishes in its footprint area on the surface of the earth (step 812).

Tuner 780 (FIG. 7A) receives the RF signal on feed 756 from the dish and does conventional carrier and clock recovery so that the recovered carrier and clock signals can be used in demodulating, detecting and demultiplexing the signals as was the case for the preferred embodiment of tuner 702. Tuner 780 receives data from host 728 via host bus 756 that tells it which downstream channel to which it should tune, and it tunes out all other RF signals. The VOD downlink quadrature carriers are then demodulated and I and Q baseband signals are output on lines 816 and 818 (step 814).

Analog to digital conversion can happen anywhere after the tuner 780 and prior to the IP packetization circuit 758. However, for parallelism with the HFC case, we will assume that A/D conversion happens in the QPSK demodulator 820 prior to the constellation point demodulation process. The recovered clock from the tuner 780 is used to synchronize the demodulation and A/D conversion processes in QPSK demodulator 820. The I and Q values of the QPSK constellation points are then demodulated to their original values to yield a stream of video, audio and associated data points on bus 822 (step 824).

The satellite VOD delivery system is much like the HFC system in that video programs are delivered on channels each having a different downlink frequency and each having a plurality of subchannels separated by different PIDs. It is the function of transport demultiplexer 784 to receive data from host 728 telling it which subchannels to recover and to demultiplex the video, audio and associated data points from their respective subchannels (step 826). The transport demultiplexer 784 has any conventional demultiplexing structure that can receive data indicating which subchannels to recover and recover them and can be the same structure as transport demultiplexer 748.

The recovered video, audio and any associated data are output to a conditional access circuit 787 via buses 832, 830 and 822. The optional conditional access circuit 786 functions to decrypt or otherwise gate the VOD data to the subscriber who requested it only if she is a legitimate subscriber and if this gating function was not performed at the satellite uplink facility or the video server (step 834). The conditional access circuit can have any of the known structures to perform this function.

The conditional access circuit has a host bus interface circuit (not separately shown) which functions to take the data from the VOD IP packets (usually the IP packets bearing VOD data are broken up for transmission over the channel) and encapsulate the data into bus packets of the type used on the host bus 756, e.g., PCI bus packets. These packets are addressed to the IP video circuit 758 (step 836).

The IP video circuit functions as previously described. Basically, it takes packet addressed to it off the host bus 756 and either reassembles the IP packet if it was originally an IP packet but was broken up for transmission (such as into ATM cells) or encapsulates the data into an IP packet if it never was in an IP packet format (step 838). Presumably, the incoming VOD data includes the IP destination address in it. However, in some embodiments, the host 728 will tell the IP video circuit 758, "If you receive data from conditional access circuit 787, it is to be addressed to the IP address of network adapter xx which requested it." One way or another, the IP video circuit 758 assembles an IP packet header for each packet that tells the routing circuitry 786 where the packet is to be sent on the LAN. The resulting IP packets are sent to the routing circuit 786 via bus 760 (step 838).

The routing circuit 786 looks up the Ethernet address bound to the IP address, encapsulates each IP packet into an Ethernet packet and routes it to the appropriate network interface circuitry in router 786 for the LAN to which the network adapter is coupled which ordered the VOD program (step 840).

Note that if there is associated data with the VOD program which needs to go to a personal computer or to IP telephone coupled to LAN 246 (or LAN 720), that data has its IP address set to the PC or the telephone as the case may be and the router 786 addresses the Ethernet packets containing this associated data to the Ethernet address of the PC or telephone or other peripheral as the case may be and this is true regardless of whether the VOD data is delivered by ADSL, HFC or satellite (steps 838 and 794).

Wideband Internet Access

Dial up internet connections through modems are very slow. It is much more useful to surf the internet with a much wider bandwidth at least downstream.

Figure 10:
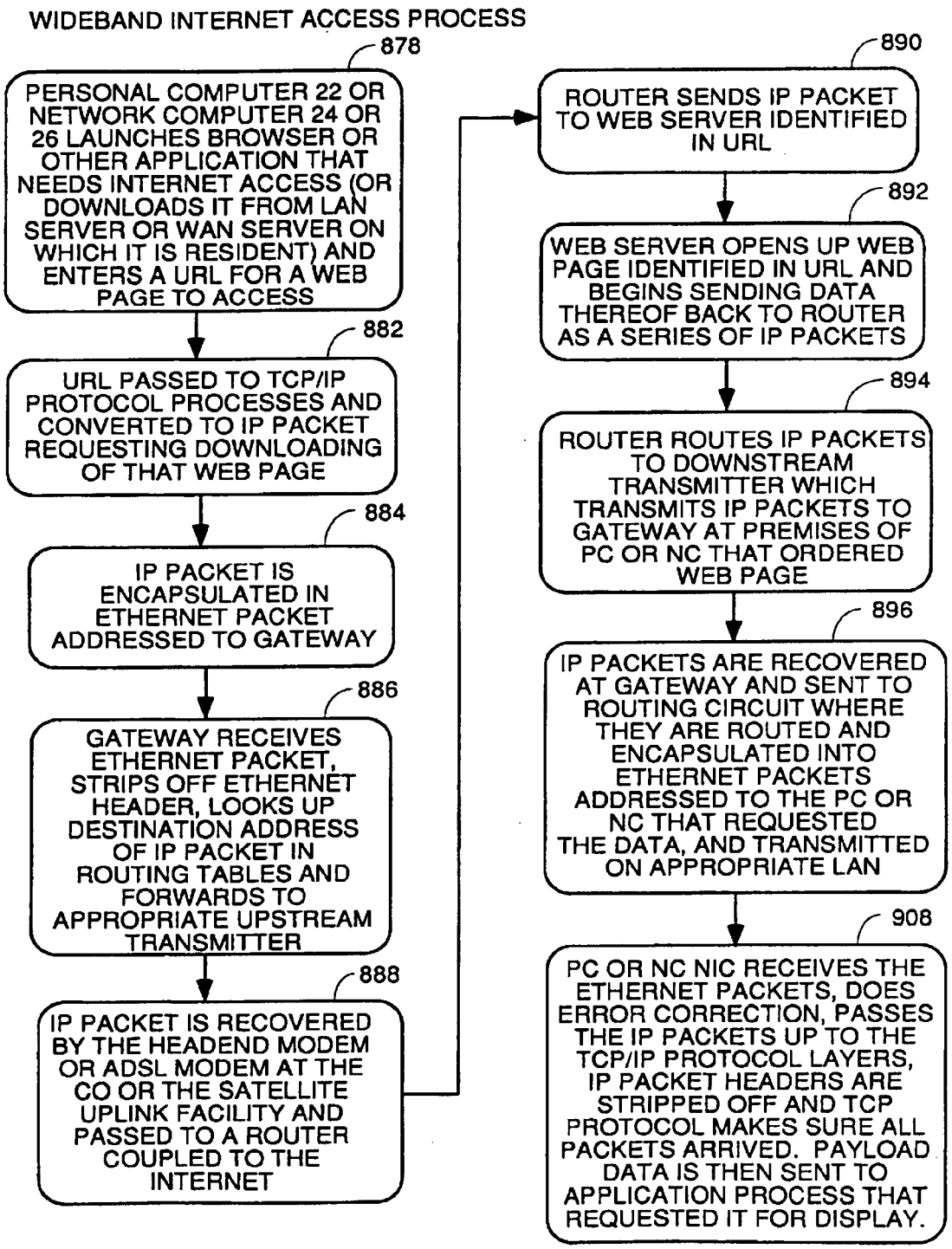
FIG. 10 is a flowchart of a wideband internet access process.

Referring to FIG. 10, there is shown a flowchart of the process of high bandwidth surfing of the internet using one of the HFC, satellite delivered DirectPC or DSL networks. In step 878, a personal computer coupled to LAN 246 or LAN 720 launches its browser and enters a URL of a web page to be viewed. Any network computers coupled to the gateway do not have any local hard drives, so they execute their browsers from the hard disk of the personal computer via known techniques of executing shared software on a server over the network or over a WAN such as the internet. Typically, the network computers indicate which program they want to run by double clicking an icon on their desktops. This action is converted to a request to download the program from a server on the LAN or WAN into the RAM of the network computer. This request is converted by the NIC of the network computer into an Ethernet packet directed to the server on the LAN. The server NIC picks up the packet, opens the file, and generates one or more Ethernet packets directed to the network computer which receives the packets and loads the browser program or other application that needs internet access into RAM and begins executing it.

If the program to be run is resident on a server on the internet, the step of doubling clicking the icon of the program to be run is converted by TCP/IP protocol software layers in the network computer (typically stored in nonvolatile flash EEPROM or ROM) into an IP packet addressed to the server storing the application program to be run. The IP packet is then encapsulated into an Ethernet packet by the NIC of the network computer and is addressed to the gateway. At the gateway, the Ethernet packet is received by the NIC and the Ethernet headers are stripped off by the routing process 786. The packet is then routed to the appropriate transmitter for the upstream medium the user has a subscription for or which is cheapest for internet access if the user has DSL, satellite and HFC modules installed—or some combination thereof (least cost routing process). In other words, the IP packet will be routed to the DOCSIS modem 770 for upstream transmission over the HFC 710 or to the ADSL modem 782 if the DSL service or to conventional modem 880 (which may also be a conventional FAX/Data modem) if satellite downloading service via DirectPC is to be used. The IP packet is sent by one of these media to the headend, ADSL CO or by dialup connection to the satellite uplink facility. At the destination, the IP packet is recovered and routed by a router at the destination to the internet server storing the application to be executed.

The internet server then sends the program to be executed to the network computer by encapsulating the data of the program into IP packets addressed to the NC that requested it. These IP packets arrive at the gateway and are recovered by the DOCSIS modem, ADSL modem or satellite reception circuitry to be described below and sent to the routing process 786. There, they are encapsulated into Ethernet packets addressed to the NIC of the NC that requested the program and launched on the LAN. The NC receives the packets, strips out the data of the program, stores in its RAM and begins executing it.

The user then enters the URL of the web site she wants to visit (step 878). The browser or other application then passes this URL down to TCP/IP protocol software processes in execution on the computer which turn the URL into an IP packet requesting that the web page at that URL be downloaded to the computer that asked for it, as identified by the source address of the IP packet (step 882). This IP packet is then encapsulated into an Ethernet packet addressed to the gateway by the NIC of the NC or PC (step 884).

The gateway's NIC (not shown separately in FIG. 7A) receives the. Ethernet packet, strips off the Ethernet header after error detection and correction and passes the IP packet up to the routing process layers. The router looks up the destination address in its routing tables and forwards the packet to one of the upstream transmitters (step 886). If the user has only one network interface such as an HFC interface only or an ADSL interface only installed (as determined by either a discovery process carried out by the router or by configuration data), the IP packet is forwarded to that upstream transmitter. However, if user has more than one network interface installed, the router may forward the IP packet to an upstream transmitter based upon any criteria such as user choice as indicated by a management and control packet sent to the gateway or a field in the IP packet, by a random or round robin selection process or by a least cost routing algorithm that automatically picks the cheapest service for widebandwidth internet access. Step 886 is intended to represent any of these methods of selecting the upstream transmitter.

If the upstream transmitter is the DOCSIS modem 770, the IP packet is transmitted upstream over a virtual channel devoted to this gateway or assigned to it on the fly by the headend. The virtual channel can be established by TDMA SCDMA or CDMA or possibly by FDMA. The CO modem recovers the IP packet and passes it to a router coupled to the headend (step 888).

If the upstream transmitter is the ADSL modem 882, the IP packet is modulated onto the upstream carrier and transmitted over the PSTN local loop 758 to the ADSL modem at the CO. There, it is recovered and passed to a router coupled to the internet (step 888).

If the downstream medium is going to be the satellite downlink, the upstream transmitter is the conventional modem 880. This modem dials a modem at the satellite uplink facility and transmits the IP packet thereto. The IP packet is recovered and passed to a router coupled to the internet (step 888).

The router sends the IP packet to the web server at the URL (step 890) which opens the web page identified in the URL and begins sending the web page data back to the router as a series of IP packets (step 892).

The IP packets arrive at the router and are sent to the appropriate downstream transmitter. Step 894 is intended to represent downstream. transmission over any of the HFC, DSL or satellite media. In the case of HFC delivery, the downstream transmitter will be the headend modem. The headend modem will either broadcast the IP packet on the downstream carrier to all gateways or transmit it on a virtual downstream channel assigned to the gateway at the premises of the PC or NC that requested the web page (step 894).

If the downstream media is the satellite downlink, the router sends the IP packets to the uplink transmitter which transmits them to the satellite. A transponder on the satellite receives the packets and re-broadcasts them on the downlink channel (step 894).

If the downstream media is a DSL local loop, the router at the CO sends the IP packets to the ADSL modem at the CO which modulates them onto the appropriate DSL downstream carrier (step 894).

Step 896 represents the recovery of the IP packets at the gateway, regardless of the downstream media, transmission to the router, protocol conversion and routing and transmission out on the appropriate LAN. The details of how this happens in the gateway for each different downstream media follows.

In the case of HFC downstream delivery, DOCSIS tuner 704 filters out all but the DOCSIS downstream carrier and removes the RF component. The resulting baseband signal is passed through the A/D matrix on line 732 to the DOCSIS modem 770. There, the IP packets are recovered and sent to the routing circuit 786 via bus 900. Although this is shown as a separate bus, it may actually be the host bus 756 in some embodiments with the IP packets being sent to host microprocessor 728 by encapsulation in PCI bus packets addressed to the host. Likewise for all other buses shown in FIG. 7A going into or coming out of the routing circuit 786. The router 786 looks up the destination address in the IP packets and determines they are addressed to a personal computer or one of the network computers coupled to the local area networks 246 or 720. The router 786 then encapsulates the IP packets into Ethernet packets addressed to the appropriate PC or NC and directs them to the NIC for the proper LAN connected to the PC or NC that requested the data (step 896).

In the case of satellite downstream delivery, tuner 902 in FIG. 7B is directed by host 728 to tune to the DirectPC downstream QPSK modulated carrier. The tuner rejects all other signals and recovers the carrier and synchronizes a local oscillator to generate two coherent reference signals which are phase and frequency matched to the two quadrature carriers used to transmit the downstream IP packets. These local reference signals supply two correlators in the tuner, one for the inphase channel and one for the quadrature channel. Each correlator is comprised of a multiplier and an integrator. Digital QPSK transmission transmitters and receivers as well as other modulation and multiplexing schemes and carrier and clock recovery circuits are described in Haykin, Communication Systems, 3rd Ed. (Wiley & Sons 1994) ISBN 0-471-57178-8 which is hereby incorporated by reference. The digital satellite receiver channel is not limited to QPSK modulation, and any modulation and/or multiplexing scheme used today or subsequently for downstream transmissions may be used with suitable adjustments to the gateway satellite digital data receiver.

The output of receiver 902 is coupled via I and Q buses 906 and 910 to a QPSK demodulator 904 which functions to recover the IP packet data and encapsulate it into bus packets for the host bus addressed to the routing circuit 786. The QPSK demodulator 904 is typically comprised of a decision device that receives the baseband I and Q channel signals and compares them to decision threshold of zero volts. If the I channel voltage is greater than zero, a decision of logic 1 is made but if its voltage is less than zero, a decision of logic 0 is made. If the Q channel voltage is greater than zero, a decision of logic 1 is made but if its voltage is less than zero, a decision of logic 0 is made. Finally, the two binary bit sequences defining the IP packets coming out of the decision circuit are recombined in a multiplexer in demodulator 904 and sent to bus interface circuitry in demodulator 904 for encapsulation into bus packets and transmission via bus 912 and the host bus 756 to the router 786. The router receives them, strips off the host bus packet headers, looks up the IP destination address and finds they are addressed to a PC or NC out on the LANs. The IP packets are then encapsulated into Ethernet packets (or whatever other packet format is used on the LANs) addressed to the PC or NC that ordered the data and sent to the proper NIC (step 896).

If the downstream media is an ADSL local loop, a conventional ADSL modem 782 in FIG. 7A recovers the IP packets and sends them on bus 788 to the router 786. The router receives them, strips off the host bus packet headers (if bus 788 is actually the host bus 756), looks up the IP destination address and finds they are addressed to a PC or NC on the LANs. The IP packets are then encapsulated into suitable LAN packets addressed to the PC or NC that ordered the data and sent to the proper NIC (step 896).

The NIC of the PC or NC that ordered the data receives the Ethernet packets, does error correction and strips off the Ethernet headers. The resulting IP packets are passed up the TCP/IP protocol layers where the IP packet headers are stripped off and the TCP protocol makes sure all the packets have been received. The payload data is then sent to the application that requested it for display (step 908). Processing by the PC or NC of the IP packet data and Ethernet packets is the same as in PCs on a LAN that share modems and dial up connections to the internet through ISPs, and that technology is incorporated by reference.

Reception and Distribution of Analog Video Broadcasts Via Satellite or Terrestial Antenna One of the advantages of the gateway is that it may also be used to distribute analog TV broadcasts to TV's throughout the house using the LAN thereby eliminating the need for separate wiring.

Tuner 914 starts this process by receiving control data from microprocessor 728 defining which C-band analog video channel has been requested by the user. Tuner 914 can be any conventional C-band satellite tuner modified so as to accept digital control data from the host 728 to control which satellite and which transponder to tune to as opposed to receiving this information directly from a remote control or front panel switches. In the home network described herein, users request C-band broadcast channels via their IR keyboards or remote controls. These requests are encapsulated into management and control Ethernet packets addressed to host CPU 728 by the network adapter. The host CPU receives them and generates a PCI bus packet on bus 756 addressed to tuner 914 telling it which channel to tune, i.e., which satellite to turn the dish to and which transponder or channel in the downlink broadcast to which to tune.

The output of tuner 914 on bus 734 is then digitized by an analog-to-digital converter 916. The digital samples on line 918 are input to a video demodulator 920 which functions in the digital domain to demodulate the digitized analog video signal. The video demodulator 920 outputs digital data on line 922 which represents a conventional baseband NTSC, PAL or SECAM format video signal.

The digital data on line 922 is at too high a bit rate to send over the LAN since uncompressed broadcast video consumes about 221 Mbps of bandwidth. Therefore, the video data must be compressed. MPEG II compression is preferred, but any known form of compression currently known or to be developed in the future will suffice since the form of compression is not critical. MPEG II compression circuitry-is well known, and is used for MPEG encoder 926. However, MPEG compression does not compress NTSC, PAL or SECAM format signals. They must first be converted to YUV format luminance and chrominance signals. This conversion is done in video decoder 924, which is a known type of circuit in any video system that uses MPEG II compression.

The compressed video data is encapsulated into PCI (or other type) bus packets addressed to IP video circuit 758 on FIG. 7A. There, the compressed video data is encapsulated into IP packets addressed to the network adapter of the TV where the request originated and the satellite C-band video channel is to be viewed. The IP video circuit 758 determines which IP destination address to use in constructing the IP packets via data received from the host microprocessor 728. When the original request was received, the host microprocessor 728, in addition to telling the tuner 914 which channel to tune, also determined from the source address of the Ethernet packet bearing the request which TV's network adapter requested the data. The IP address of this network adapter is encapsulated into a PCI bus packet and transmitted via host bus 756 to the IP video circuit. The IP packets encapsulating the MPEG packets of compressed, digitized C-band video channel are then transmitted via bus 760 to the routing circuit 786. Bus 760 may simply be the host bus 756 in embodiments where the routing process is carried out in software on the host 728.

The routing process 786 examines the IP packet destination addresses and looks up the corresponding Ethernet addresses. The IP packets are then encapsulated into Ethernet packets and routed to the appropriate LAN network interface card for LAN 246 or 720 depending upon the Ethernet destination address of each packet. The process works in reverse for incoming Ethernet packets from the LAN(s).

When the IP packets reach the network adapter of the TV that requested the CATV channel, they are converted to a video signal that can be displayed by the TV.

Terrestial Broadcast Reception

Reception and distribution of standard TV broadcasts received over an antenna coupled to the gateway is very similar. A standard TV antenna 928 is coupled to the gateway by a coax or twinlead wire 930. A TV tuner 932 tunes the requested channel and outputs the desired channel as an RF or IF signal. Tuner 932 can be a conventional TV tuner modified to receive digital control data from the host computer 728 which controls which analog TV broadcast channel the tuner selects.

A/D converter 934 samples the output RF or IF and feeds the samples to a video demodulator 936. There the signal is demodulated in the digital domain to remove the RF component. As is the case for all the analog signal receiver circuits for both HFC and satellite, the analog-to-digital conversion can happen anywhere along the line of circuits including just before the MPEG encoder.

The output 938 is a digitized version of an NTSC or PAL or SECAM signal. It is fed to a video decoder 940 which converts it to a YUV format. The YUV signal is then compressed by MPEG encoder 942 and put into bus packets of the format used on the host bus 756 (typically PCI) and addressed to the IP video circuit 758.

The IP video circuit strips off the bus packet headers (and may perform error detection and correction) and encapsulates the compressed video data from the PCI bus packets into IP packets addressed to the network adapter of the TV set where the requested channel is to be viewed. The IP packets are then sent to the router 786 where the destination address is looked up and the IP packets are encapsulated into Ethernet packets addressed to the same network adapter and launched onto the appropriate LAN.

LAN Alternative Embodiments

Video is isochronous or stream-oriented. On the other hand, traditional, LAN traffic is more bursty. LANs were not developed to support streaming traffic, and it is therefore possible that a 10 Mbps 10Base-T Ethernet LAN will not have sufficient bandwidth at times to support the load, especially where there are multiple TVs each requesting a different channel along with other simultaneous traffic sharing the 10 Mbps bandwidth. Video is highly bandwidth intensive so even 100 Mbps LANs have trouble supporting high quality video intermingled with more traditional LAN data traffic.

Accordingly, it is within the scope of the genus of the invention to use higher capacity LANs for LANs 246 and 720. Specifically, these LANs can be Fast Ethernet, Switched Ethernet, FDDI, ATM and Fibre Channel Arbitrated Loop. Such LANs are described in Tanenbaum and Horak, supra, and Kembel, Arbitrated Loop, Connectivity Solutions, a division of Northwest Learning Associates, Inc of Tucson, Ariz., (1997) ISBN 0-931836-82-4.

Reception and Distribution of DirecTV Digital Video Broadcasts

The gateway will include a bus slot for a module which can receive regularly scheduled DirecTV and other format digital video broadcasts on downlinks from a satellite. A tuner 944 serves to receive digital control information from host microprocessor as to which channel on the downlink a user has requested. The tuner then tunes to this channel and rejects all other signals and a QAM demodulator 946 demodulates the signal to recover the transmitted data and; outputs a complex baseband signal on line 948. Conventional QAM modulated digital data receivers are taught in Lee & Messerschmitt, Digital Communications, 2d Ed., (Kluwer Academic Publishers 1994) ISBN0-7923-9391-0, Section 6.4.3, pp. 203–208 and FIGS. 6–18 and 6–19, the entirety of this book being hereby incorporated by reference. Typically, the tuner 944 will be comprised of a bandpass filter to tune the desired channel and reject out-of-band signals and doubling as an anti-aliasing filter. Typically, the signal is then digitized and a phase splitter (a filter that passes only frequency components in the positive half of the Fourier spectrum and rejects Fourier components in the negative half) acts in the discrete time domain to remove the negative half Fourier frequency components of the received spectrum to output an analytic signal. Then the positive half frequency components of the received signals are demodulated, i.e., the RF carrier component is removed by mixing with a local carrier which is synchronized to the transmitted carrier.

FIG. 6–16 of Lee et al. at p.204 illustrates three different configurations: for a QAM tuner.

The function of the QAM demodulator 946 is to detect the actual symbols sent. This is typically done by sampling and slicing. A complete QAM tuner to get the received signal back to baseband and demodulator to recover the transmitted symbols is shown in FIG. 6–18(b) of Lee & Messerschmitt for the real valued case and is comprised of two mixers which move the received spectrum back to baseband by multiplying by quadrature shifted local carriers and two receive bandpass filters to reject out of band signals and pass only the positive half Fourier components of inphase and quadrature signals. The I and Q signals are then sampled at the symbol rate and passed through a slicer to recover the symbols actually transmitted. A more complete representation of a practical QAM receiver including both precursor equalization and postcursor equalization and carrier and timing recovery is shown in FIG. 6–23 of Lee & Messerschmitt. Preferably there will also be an error detection and correction circuit as well (not shown).

After the symbols of the compressed video program are recovered, a conventional transport demultiplexer 950 receives digital control input from the host as to which subchannel on which to find the video program which has been ordered and demultiplexes the audio, video and any associated data from those subchannels.

To help manage the load on the LAN, an optional transcoder 952 is used to translate the bit rate of the compressed video down to a lower rate when necessary because of current loading conditions on the LAN. Transcoders are known and were commercially available from Imedia in San Franscisco, Calif. and now from the assignee of the present invention.

The output data of the transcoder is supplied to a conventional conditional access circuit 954 which decrypts the data if the subscriber is authorized to receive the program. Alternatively, the conditional access circuit 954 may function to decrypt the original encrypted data if the user is an authorized subscriber and then re-encrypt the data before transmission on the LAN using the new C5 encryption standard. The re-encrypted data is then packetized into bus packets and transmitted over the host bus 756 to the IP video circuit 758. There it is encapsulated into IP video packets addressed to the network adapter that requested the program and sent over data path 760 to the routing circuit/process 786. The routing process looks up the destination address and maps it to the LAN address of the network adapter and encapsulates the data into Ethernet packets and sends them to the correct NIC for transmission over the LAN. At the network adapter, the packets are processed to convert the data to NTSC, PAL or SECAM video signals and the corresponding synchronized audio. If C5 encryption is used, the data remains encrypted at all stages until it is converted to analog video and audio signals.

A conventional DirecTV receiver modified to receive digital control data telling it which channel and subchannel to tune can be substituted for tuner 944, QAM demodulator 946 and transport demultiplexer 950. Alternatively, the satellite receiver taught in U.S. Pat. No. 5,983,071 may be used but modified to remove the audio decoder 160, the D/A converter 164, the video decoder 170 and the NTSC encoder 174. Those functions all happen at the network adapter after distribution over the LAN. If the receiver of U.S. Pat. No. 5,983,071 is substituted for the tuner 944, QAM demodulator 946 and transport demultiplexer 958 and the conditional access circuit 954, the audio and video output stream on lines 162 and 172 of the patent will be supplied to the transcoder 952. The receiver taught in U.S. Pat. No. 5,983,071 may also be used in place of tuner 702, A/D matrix 730, QAM demodulator 746, conditional access circuit 726 and transport demultiplexer 748. Again, this receiver will be modified to remove the following components taught in the patent: audio decoder 160, the D/A converter 164, the video decoder 170 and the NTSC encoder 174. Those functions all happen at the network adapter after distribution over the LAN. A transcoder may also optionally substituted into the HFC digital video receiver module circuit that includes tuner 702, and the conditional access circuits 726 and 786 may both be modified as described above to re-encrypt the recovered data under the C5 standard to prevent digital copies from being made. If the receiver of U.S. Pat. No. 5,983,071 is substituted for the tuner 702, QAM demodulator 730 and transport demultiplexer 748 and the conditional access circuit 726, the audio and video output stream on lines 162 and 172 of the patent will be supplied to either a transcoder, if present, or to bus interface circuitry (not shown) which packetizes it and sends it to the IP video circuit 758 over the host bus.

Pay Per View Push Technology Gateway Compatibility

The gateway can also be used to receive pay per view or free regularly scheduled broadcasts of digital or analog video programs. Push technology means a video server at or coupled to the HFC headend, ADSL CO or satellite uplink has a regular schedule of video programs that it outputs at specific times on specific channels. A menu displayed on the television set or publication is used by the user to select the program the user wishes to view. The user selects the program she wishes to view at the time the program is supposed to start by entering the program number (the program number can be mapped to the service provider and the video server IP address or that information can be entered manually) on her remote control or keyboard. That program number is encapsulated into an Ethernet request packet and transmitted to the gateway where it is routed to the host. The host 728 then sends the appropriate command data over the host bus to tuner 702, or 700 or 780 or 914 or 944 or 932 or ADSL modem 782 to tune to the appropriate channel, depending upon which medium the program will be arriving. In the case of digital video, the host also sends control packets to the transport demultiplexer 950 or 784 or 748 to control them to demultiplex the compressed video and audio signals from the correct subchannels. If transcoders are used in the digital or analog video receiver modules, the host will monitor the monitor the load status of the LAN in any known way and send appropriate control packets to the transcoders over the host bus to control the bit rate of the compressed video transmitted over the LAN so as to not exceed the available bandwidth under varying load conditions.

IP Telephony

Since there is a LAN that runs throughout the customer premises, it is useful to use the LAN to distribute video and audio and FAX telephony data to the video phones, telephones, FAX machines and FAX modems throughout the premises. Also, since all these physical telephony devices are coupled to a computer, it is useful to include an IP and/or PBX telephony module 953 in the gateway to provide functionality that the user could not formerly obtain from POTS service. POTS service can provide conference calling, call forwarding, caller ID, voice mail and pager notification of voice mail messages as well as other services through facilities such as Centrex provided by the CO switch. However, these services all cost extra money, and can be implemented locally in the gateway through use of "PBX on a card" expansion circuitry to extend the functionality of the host. Such. telephony circuitry 953 to extend the functionality of DOS and Windows based personal computers to include PBX functionality, voice mail and a host of other features is commercially available as the VSI and Incline systems from Picazo Communications, Inc. of San Jose, Calif. and from Netphone, Inc. of Marlborough, Mass., and Altigen Communications, Inc., the details of which are hereby incorporated by reference. The Netphone PBX on a card technology which can be used to implement circuit 953 is described in U.S. Pat. No. 5,875,234 which is hereby incorporated by reference. This patent basically teaches a PBX circuit on an expansion card that is coupled to the host bus of a network server. The PBX card can establish and maintain telephone calls and do normal PBX call control functions. The PBX card can be controlled from telephony enabled applications on the server/gateway or by telephony enabled applications running on PCs via the LAN connection to the gateway. Any known expansion circuitry to add PBX functionality to a LAN server regardless of whether it is implemented on one circuit board or more than one may be used for circuit 953.

Typically, the circuit 953 will have its own switching circuit for connecting phone calls from extension phones coupled to conventional phone lines to CO trunk lines and vice versa.

In some embodiments, the PBX functionality alone may be sufficient. However, use of the internet for telephony is a growing market, and websites such as www.net2phone.com already exist to allow long distance telephone conversations to take place over the internet regardless of distance for 10 cents per minute. To allow users to take advantage of these services, PCs on LANs 246 and 720 will need to be equipped with microphones and speakers. In such a class of embodiments, the IP & PBX telephony circuit 953 will include circuitry to digitize analog voice signals arriving from the extension phones via conventional phone lines 954. The IP & PBX telephony circuit 953 may also include packetization circuitry in some embodiments to receive Ethernet packets carrying digitized voice from the PCs on LANs 246 or 720 from router 786 via bus 956 and packetize them into IP packets addressed to the internet server providing the IP telephony services. These IP packets are then sent back over bus 956 to router 786 where they are routed to the server identified in the destination address of the IP packet. The routing can be least cost routing if multiple high bandwidth upstream media such as HFC and ADSL upstream high speed internet access modules such as DOCSIS modem 770 and ADSL modem 782 are present in the gateway. In other embodiments, the PBX expansion module 953 will do call control switching and provide other services between extension lines 954 and the CO trunk lines, and analog telephone signals from the extension phones on line 954 will be digitized and packetized into an IP packet addressed to an IP telephony server on the internet whose IP address is fixed and known to be the IP address to which the telephone data from the conventional POTS telephones is to be directed.

Then, instead of sending data from Ethernet packets bearing telephony data from PCs, telephones and FAX machines on the LAN for encapsulation into IP packets by the IP & PBX telephony module 953, the IP packet encapsulation will be done at the source. In other words, if a PC or Network Computer or phone or FAX at the customer premises wants to send data to an IP telephony server on the internet, the digital data generated by the source device will be encapsulated by the source device into IP packets addressed to the IP telephony server on the internet. These packets will then be encapsulated into Ethernet packets and sent to the gateway. The gateway will then strip off the Ethernet packet headers and route the enclosed IP packets to the server on the internet to which they are addressed via the DOCSIS modem 770, the ADSL modem 782 or possibly by the conventional modem 880 in FIG. 7A (although use of the conventional modem would only make sense if higher bandwidth upstream media was not available).

Modular Construction of Gateway

Figure 8:
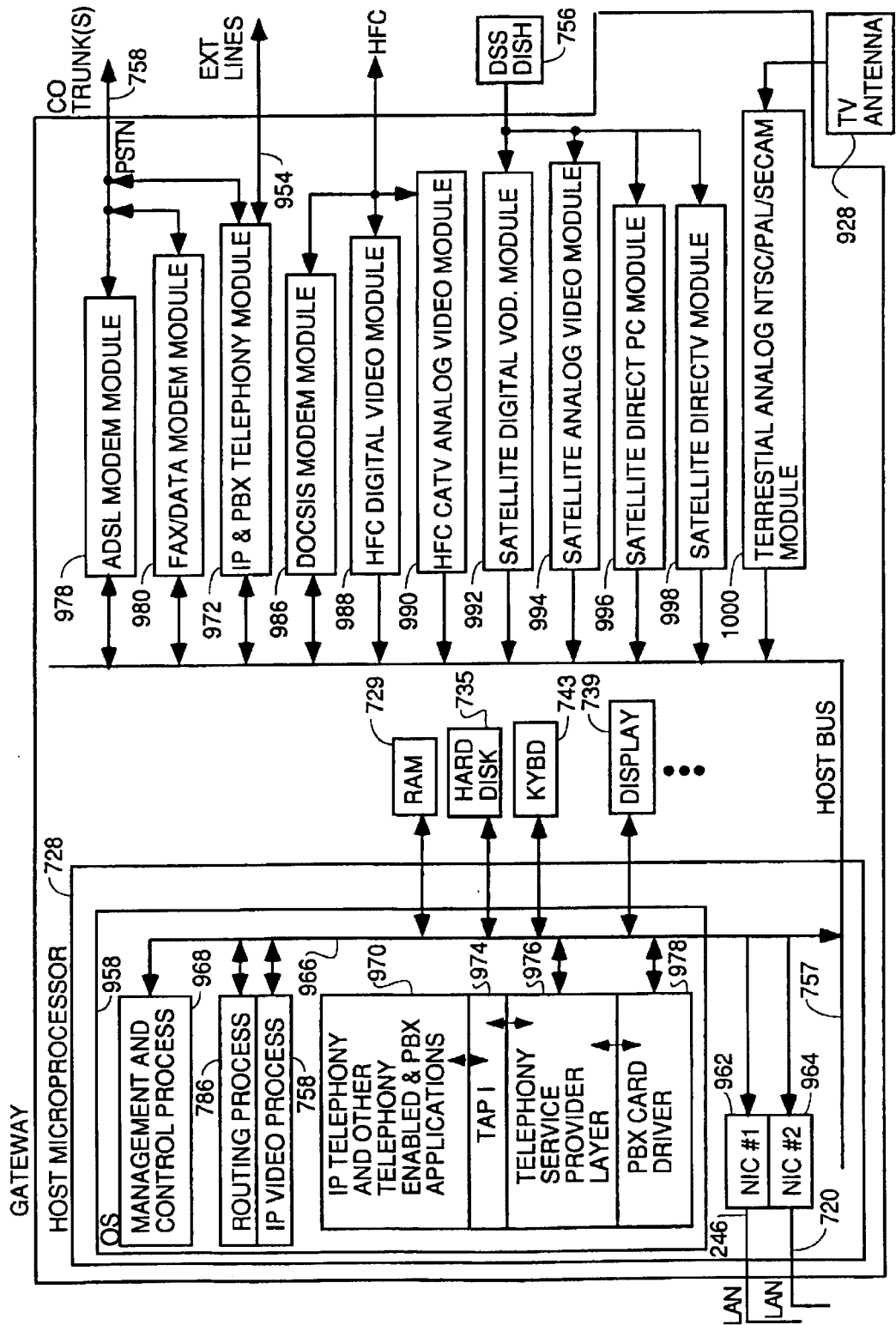
FIG. 8 is a block diagram of a modular version of the gateway.

Referring to FIG. 8, there is shown a block diagram illustrating the software architecture and modular construction of an embodiment of the gateway/LAN server. As mentioned above, in alternative embodiments, the gateway may actually be comprised of two or more servers to divide the labor but each coupled to the expansion modules by a bus/LAN structure 756. For example, one server may run only the PBX control software and IP telephony software and another server may run only the management and control and routing process needed for the push and pull video applications and high speed internet access and perform any routing functions needed for IP telephony by the first server.

The software processes in the host or server run in conjunction with the operating system 958 and use its application programmatic interfaces (API) for message transfers between processes and to send data to the LAN interface or NIC 962 and 964 and the host bus 756. The data paths between the various software processes and between the various processes and NICs 962 and 964 and the host bus 756 through the operating system are symbolized by data path 966. This data path represents any of the typical methods and apparatus for transferring data between processes or between processes and circuits in the gateway. For example, NIC #1 962 may receive an Ethernet packet bearing a request for a video-on-demand program that is addressed to the management and control process 968. One way NIC 962 can transfer that packet to the routing process 786 is by writing the data into on-board scratchpad RAM and invoking a software interrupt for the routing process 786 and passing it a pointer to the message in RAM. The routing process then executes an interrupt service routine for that interrupt and reads the data from the scratchpad RAM at the address passed with the interrupt or at some preassigned address stored in an interrupt table. Processes and circuits can also pass messages by writing them into predetermined locations in shared address space in RAM 729 with the destination circuit or process and then setting an interrupt bit and storing an interrupt number in a register. The interrupt bit causes the host to execute a generic interrupt service routine to retrieve the interrupt number and then look up the interrupt number in an interrupt vector table. The table would return the address of the beginning of an interrupt service routine for that number. Each circuit or process would have an interrupt number and an associated interrupt service routine. The service routine pointed to by the vector table would then be executed and retrieve the data and return it to the process or circuit associated with that interrupt. Each of the expansion modules could pass data or IP packets to the routing process 786 or the IP video process 758 in that way.

A management and control process 968 receives video-on-demand and other requests for services and data as described in the detailed descriptions of each module. These other requests can include the numbers of CATV or terrestial channels to tune in or requests for DirecPC or ADSL or HFC high speed internet access. Other data the management and control process will receive in alternative embodiments is LAN available bandwidth status and other network management type data. In response, the management and control process sends out the appropriate control data to the tuners, transport demultiplexers, transcoders, conditional access circuits, IP video process and other circuits or processes to manage retrieving the requested data and distributing it to the right peripheral, or to transmit data upstream on particular upstream channels. These upstream channels may be preassigned or assigned by downstream control messages from the headend or ADSL CO or satellite uplink server.

The routing process 786 translates between IP and Ethernet or other LAN protocols and functions as previously described. The IP video process 758 encapsulates data sent to it over the host bus into IP packets addressed to the proper peripheral device.

The IP telephony and other telephony enabled and PBX processes represented by block 970 control the IP and PBX telephony expansion module to implement PBX functions, carry out IP telephony etc. For example, there may be 5 conventional or LAN telephones in the home each of which is primarily answered by one person in the family. One of the processes of block 970 may implement direct inward dialing such that each telephone has its own virtual telephone number which an outsider can dial when, for example, they want to talk to teenager Judy without the inconvenience of accidently talking to her father. Likewise, two extension phones may wish to have a conference call with a phone in some other state. The PBX control software controls the switch in the PBX module 972 to implement any of these desired PBX functions. The IP telephony process carries out IP telephony, by, for example, receiving digital data from conventional POTS phones via telephony module 972 and encapsulates it into IP packets which are passed to router 786 and vice versa. IP packets received from LAN enabled telephones are just passed directly to the router 786.

Likewise, a database program or word processing program being run on a PC or NC out on the LAN may be telephony enabled. For example, a rolodex file made by a word processing program may contain telephone numbers and the user may look up a person by name and then double click on the phone number. This double click will be converted by the telephony enabled application into an Ethernet packet requesting that the telephone number be dialed. This Ethernet packet is sent to NIC 962 or 964 and is there passed up to the router 786. The router strips the Ethernet header off and passes the data of the request to a PBX application represented by block 970. The PBX application makes a function call to a library program of the OS 958 through the standard TAPI interface 974.

The TAPI interface represents a collection of predefined Windows function calls, each of which invokes a library program from a telephony dynamic linked library of programs. The TAPI function calls provide a standard telephony programmatic interface to applications that want to perform telephone functions. The basic level of functions allow application programs to carry out basic inbound and outbound voice and data calls by providing programs that can be invoked to initialize and open and close TAPI lines, read and write various parameters that control a line device, handle the details of placing an outbound voice or data call or answer an inbound voice or data call, recognize, translate and or build telephone "addresses" or dialing strings, manipulating call handles etc. Other programs in the TAPI library provide more advanced functions such as digit or tone generation and detection, call acceptance and rejection, redirection, call forwarding, park, hold, conference, etc. These advanced features are called supplemental telephony services and allow multiple telephone handsets or other line devices to share only a single CO trunk line or to share multiple CO trunk lines in a PBX type arrangement. The trunk lines can be analog, T1, ISDN or DSL. Because TAPI also supports the logical construct of phone devices, the NCs and PCs out on the network with TAPI libraries can actually have multi-line virtual telephones implemented in code running thereon so that every room with a PC in it can also have a multi-line phone capable of speakerphone, conference, hold, park, call forwarding and other advanced capabilities not normally found on standard home telephones.

TAPI services focus on "line devices" as a means for transporting information from one place to another. A line device can be a standard telephone handset, a fax board, a data modem, a telephony card or any physical device coupled to a telephone line. In the system depicted in FIG. 8, the ADSL modem module 978, conventional modem module 980 and IP and PBX telephony module 972 are all line devices. Because a line device is a logical construct, TAPI can see multiple line devices all coupled to the same physical telephone line. A TAPI call control program (dialer.exe) can accept multiple simultaneous TAPI service requests from, for example, the PBX application, the IP telephony application and other telephony enabled applications all represented by block 970 and queue them all for service in order.

Communications between the application programs and the TAPI library are by the Windows messaging function using predefined TAPI data structures. Telephony libraries of other operating system may be substituted for the Window TAPI library and the data structures and messaging functions of the operating system in use can be substituted.

How TAPI is structured and how application programs can be written to utilize this resource are all defined in Amundsen, MAPI, SAPI & TAPI Developer's Guide, (SAMS Publishing 1996) ISBN 0-672-30928-9, which is hereby incorporated by reference.

Returning to the current example, the TAPI program executes and makes a function call to the telephone service provider process 976 and passes it the number to be dialed. The TSP layer 976 isolates the TAPI library program from needing to know the details of the specific hardware installed and it isolates the particular hardware which is installed from having to be designed for the specific telephony enabled application programs which are present. It is a translator between the TAPI world and the hardware world. In other words, the TSP layer 976 implements the TSPI fucntions that are used by TAPI implementation. Each TSP then uses whatever interface is appropriate to control the telephony hardware to which it is connected. The TSP layer 976 and the PBX card driver layer 978 actually can be combined in some embodiments, and in other embodiments, the TSP layer can be used to interface to other telephony hardware such as a FAX modem expansion module 980 at the gateway by which FAXes may be sent using data received from PCs that do not have FAX modems or connections to telephone lines available at their location on the network.

Assuming the TSP and PBX card drivers are separate processes, either TSP 976 or TAPI program 974 then invokes the proper function call of a PBX card driver process 978 and passes it the number to be dialed. The PBX card driver speaks the specific language of the IP and PBX telephony module 972 and sends it a properly formatted message to control the switch and other circuitry thereon to seize a CO trunk line and generate the appropriate DTMF tones to dial the requested number when a dial tone is detected.

When the person answers, the voice is digitized by a codec in the PBX card 972 and the data is passed back to the PBX card driver which then passes it back up through all the layers to the router. The router encapsulates the data into-an Ethernet packet addressed to the telephone or other line device that made the call and passes the packets to the appropriate NIC. From the NIC, the packets are transmitted via LAN to the network adapter of the telephone or PC or NC that originated the call. The reverse thing happens for voice going out from the PC, NC or telephone which originated the call to the person who answered the phone.

The host bus is coupled via bus connectors and expansion slots to one or more expansion modules which implement the transmitter and receiver circuitry and other interface circuitry necessary to interface the gateway to the satellite, HFC, POTS or DSL media or any other media such as the power lines or wireless local loops which may be developed in the future. Modules are shown for currently existing technologies only, but newer upstream and downstream media are sure to follow, and the genus of the invention includes expansion modules of whatever type are needed to interface to these newer media.

The ADSL modem module 978 may be any conventional ADSL modem 782 or SDSL modem or any other modem to interface to any type of digital subscriber line local loop which can be digitally controlled by the host 728. It will include any connectors and isolation circuitry needed to connect to the DSL CO trunk line 758. The FAX/Data Modem Module 980 can be any conventional FAX/Data modem or simple data modem for coupling via suitable connectors and isolation circuitry to extension phone lines 954 within the customer premises as well as DSL CO trunk lines 758 and which can be digitally controlled by the host 728.

The IP & PBX telephony module 972 can be any known or future developed "PBX on a card" including one or more expansion cards which give a conventional personal computer host 728 running any operating system PBX capabilities and which can be digitally controlled by the host 128. It can include any needed additional known circuitry and software needed to implement IP telephony functions.

A DOCSIS modem module 986 can be any known or future developed cable modem that conforms to the DOCSIS standard or any new standard for modems that allow high speed data transfers from a customer premises to a headend cable modem and/or the internet over a CATV HFC cable plant, and which can be digitally controlled by the host 728.

An HFC digital video module 988 can be any digital video receiver which can be digitally controlled by the host 728 and is compatible with reception of digitized compressed video data transmitted over HFC. In the system of FIG. 7A, for example, the HFC digital video module 988 would typically include tuner 708, an, A/D converter included in matrix 730, QAM demodulator 746, transport demultiplexer 748 and conditional access circuit 726 to communicate with the shared IP video process 758 running in software on the host. It may also include the upstream and downstream combiner and isolation circuits 790 and 798 although this combiner and isolation circuitry may be shared by all HFC interface modules in some embodiments.

An HFC analog video module 990 can be any receiver capable of receiving regularly scheduled analog CATV transmissions over HFC which can digitize and compress the data for transmission over the LAN and which can be digitally controlled by the host 728. In the exemplary embodiment of FIG. 7A and 7B, the module 990 typically would include tuner 700, an A/D converter from matrix 730, video demodulator 738, video decoder 714 and MPEG encoder 747. It may also include the upstream and downstream combiner and isolation circuits 790 and 798 although this combiner and isolation circuitry may be shared by all HFC interface modules in some embodiments.

In some species within the genus of the invention, all HFC interface modules such as 986, 988 and 990 may be combined into one HFC interface module. Likewise for all expansion modules that interface to the PSTN and extension phone lines or all modules that interface with the satellite dish.

A satellite digital video-on-demand module 992 can be any satellite receiver which can be digitally controlled by the host 728 to tune in and receive a specifically requested compressed digital video-on-demand broadcast from a satellite. In the embodiment of FIGS. 7A and 7B, it includes tuner 780, QPSK demodulator 820, transport demultiplexer 784 and conditional access circuit 786.

A satellite analog video module 994 can be any conventional C-band satellite receiver modified to receive tuning commands digitally from the host 728 and modified to digitize and compress the video program for distribution on a LAN. In the embodiment of FIGS. 7A and 7B, it would include tuner 914, A/D converter 916, video demodulator 920, video decoder 924 and MPEG encoder 926.

A satellite DirectPC module 996 can be any conventional DirectPC receiver or any equivalent receiver for receiving IP packetized data transmitted from a satellite capable of being digitally controlled by a host computer and send the recovered IP packets to a routing process being run by the host. In the embodiment of FIGS. 4A and 4B, it would include tuner 302 and QPSK demodulator 304.

A satellite DirecTV module 998 can be any conventional DirecTV receiver or equivalent digital satellite TV broadcast receiver which can receive regularly-scheduled, compressed, digital TV broadcasts from a satellite but modified to be controlled digitally by the host 728 to tune to a requested broadcast channel. In the embodiment of FIGS. 7A and 7B, this module would include tuner 944, QAM demodulator 946, transport demultiplexer 950, optionally transcoder 952 and conditional access circuit 854.

A terrestial analog NTSC or PAL or SECAM module 100 can be any receiver capable of being digitally tuned by the host computer which can receive regularly scheduled analog TV broadcasts via an antenna and digitize and compress them for distribution over a LAN. In the embodiment of FIGS. 7A and 7B, it would include tuner 932, A/D converter 934, video demodulator 936, video decoder 940 and MPEG encoder 942.

Any of the modules defined above which recover or generate digital data for transmission on the LAN can optionally include a transcoder to translate the original bit rate to a lower bit rate where needed because of network loading. Likewise, any module that recovers digital data that encodes copyrighted materials such as video or audio programs may include a C5 standard encryption circuit to re-encode the digital data before transmission on the LAN to prevent perfect, unauthorized digital copies which could happen if the digital data were to be transmitted in the clear.

Although the invention has been disclosed in terms of the preferred and alternative embodiments disclosed herein, those skilled in the art will appreciate that modifications and improvements may be made without departing from the scope of the invention. All such modifications are intended to be included within the scope of the claims appended hereto.

What is claimed is:

1. A gateway for a home network comprising:
   one or more network interface circuits for coupling to one or more local area networks;
   a router having port coupled to said one or more network interface circuits and having an port for receiving packets to be routed onto a local area network for routing packets and encapsulating said packets in LAN packets that can be transmitted on a local area network selected by said routing process and transmitting said LAN packets on said local area network selected by said routing process;
   an IP video circuit having an output coupled to said input of said router and having an input for receiving compressed video data of a video program to be viewed, and functioning to packetize said compressed video data into packets that can be routed by said router;
   a conditional access circuit having an output coupled to said IP video circuit and having an input for receiving recompressed data, functioning to selectively decrypt encrypted programs;
   a transcoder circuit having an output for coupling recompressed data to said conditional access circuit and having an input for receiving MPEG packets of a video program;
   a transport demultiplexer for receiving control signals at a control input specifying which subchannel(s) to demultiplex and for extracting MPEG packets transported in the specified subchannel(s);
   a quadrature amplitude demodulator having an input and having an output coupled to said transport demultiplexer, for recovering digital data of a requested program and supplying said digital data at said output;
   a tuner having an input for coupling to a source of a radio frequency carrier signal modulated with digital data encoding said requested program, and having an output coupled to said quadrature amplitude demodulator, for tuning to a carrier signal specified by control data received at a control input and filtering out substantially all other signals; and
   a control means for receiving a request for a program transmitted to said gateway via a local area network and controlling the appropriate circuits in said gateway to carry out the following functions:
   request said program,
   receive downstream message data indicating upon which channel and subchannel(s) said requested program will be transmitted,
   tune to a carrier signal of said channel, recover digital data encoding said requested program, recompress said digital data to a bandwidth which can be transmitted in the available bandwidth on a local area network to which a set top decoder which requested program is coupled and transmit said recompressed data to a network interface circuit for a local area network to which said set top decoder is coupled;

and wherein said router also functions to strip LAN packet headers from LAN packets received from a local area network to which said router is coupled and recover packets encapsulated in said LAN packets and route packets addressed to said control means to said control means.

2. The apparatus of claim 1 further comprising a DOCSIS compatible cable modem capable of transmitting spread spectrum upstream bursts, said modem coupled to said router and having a port for coupling to a hybrid fiber coaxial cable (HFC) signal distribution system for sending digital data to a headend via said HFC and a DOCSIS upstream channel and for receiving digital data from said headend via a DOCSIS downstream channel.

3. The apparatus of claim 2 further comprising means coupled to said IP video circuit for coupling to a hybrid fiber coaxial cable system for receiving digital video transmissions of broadcast programs and video on demand programs and recovering MPEG packets containing a video program desired for viewing and performing conditional access processing and supplying authorized MPEG packets to said IP video circuit.

4. The apparatus of claim 2 further comprising means coupled to said IP video circuit for tuning analog video broadcasts, digitizing and recovering a digital representation of an NTSC, PAL or SECAM video signal, decoding said video signal into YUV format, compressing the YUV format signal into MPEG packets and delivering the MPEG packets to said IP video circuit.

5. The apparatus of claim 2 further comprising means for tuning an RF signal QPSK modulated with symbols encoding an MPEG transport stream, demodulating the QPSK modulating to recover an MPEG transport stream, demultiplexing the MPEG transport stream to recover MPEG packets containing a video program to be viewed, performing conditional access processing on said MPEG packets and supplying authorized MPEG packets to said IP video circuit.

6. The apparatus of claim 1 further comprising means for tuning an RF signal QPSK modulated with symbols encoding digital data for use in a computer, demodulating said QPSK symbols to recover Internet Protocol packets (IP packets) and supplying said IP packets to said IP video circuit.

7. The apparatus of claim 1 further comprising means for tuning an RF signal modulated with an analog video signal, digitizing, demodulating to recover an NTSC, PAL or SECAM video signal, decoding said video signal to YUV format, and compressing said YUV format video signal into MPEG packets and supplying MPEG packets to said IP video circuit.

8. A gateway apparatus comprising:
a host computer having a host bus;
one or more local area network interfaces or bus interfaces coupling said host computer to one or more local area networks or buses than carry data between said gateway and one or more devices located at a customer premises;
external network interface circuits coupled to said host bus for interfacing said host computer to one or more networks external to said customer premises including at least a DOCSIS compatible cable modem for bidirectional digital data communication over a hybrid fiber coaxial cable network, and one or more video network interface circuits functioning to receive analog and/or digital video signals delivered over a hybrid fiber coaxial cable network or via satellite or terrestial and deliver digital video data compressed using MPEG compression; and wherein said host computer is programmed to implement an IP packetization process to receive said compressed digital video data from said one or more video external network interface circuits and packetize said compressed digital video data into IP packets addressed to the device and/or process which requested said digital video data and which is coupled to said gateway by one or more of said local area networks or busses, and said host computer being further programmed with a routing process to receive said IP packets from said IP packetization process and to receive IP packets from said DOCSIS compatible cable modem and automatically do all routing, encapsulation and protocol conversion necessary to deliver said IP packets to a device and/or process in execution on a device coupled to said gateway apparatus via one of said local area network interfaces or bus interfaces and identified by address information in said IP packets, and to receive data from a device and/or process in execution on a device coupled to said gateway apparatus via one of said local area network interfaces or bus interfaces and do any and all deencapsulation, encapsulation, protocol conversion and routing necessary for each packet to be automatically delivered to an appropriate one or more of said external network interfaces coupled to a device and/or process to which each packet is addressed for upstream delivery via an appropriate medium of transmission to whatever device and/or process to which said data is addressed, and said host computer programmed with a management and control process for receiving requests for data from a device and/or process coupled to one or more of said local area network interfaces or said bus interfaces, and sending digital control data to one or more of said external network interface circuits to control them to obtain said requested data from a source coupled to said gateway via one or more of said external network interfaces.

9. The apparatus of claim 8 wherein said external network interface circuits are modular such that each can be removed and only the external network interfaces are present in said gateway which are necessary to use user selected services provided by sources coupled to said external networks.

10. The apparatus of claim 8 wherein said routing process controls said host computer to receive internet protocol formatted packets either from said IP packetization process or directly from an external network interface circuit and, with said network interface, look up the Ethernet or other LAN address of the device coupled to said local area network that corresponds to the internet protocol packet's destination address, and do all the protocol conversions necessary to encapsulate each said internet protocol packet into one or more Ethernet or other local area network packets (hereafter LAN packets) addressed to a device which requested data in said internet protocol packet and transmit said LAN packets over the appropriate local area network to the device which requested said data, or controls said host computer to transmit said internet protocol formatted packets to one or more devices and/or processes to which they are addressed via one or more busses which couple said gateway to one or more customer premises equipment devices, and further controls said host computer to receive Ethernet or other LAN packets that include internet protocol packets from devices coupled to said local area networks via said local area network interface(s) and do all the protocol conversions necessary to strip off the LAN packet header and route the encapsulated internet protocol packet to the appropriate external network interface circuit for transmission on an external network to a server to which the internet protocol packet is addressed.

11. The apparatus of claim 8 wherein said management and control process is structured to control said host computer to receive Ethernet or other LAN packets or bus data from devices coupled to said local area network(s) or said bus or buses, said packets or bus data containing requests to download specific web pages at URLs identified in said packet or to receive and distribute regularly scheduled video broadcasts over a CATV hybrid fiber coaxial cable system, a satellite downlink or a terrestial broadcast, or to request a video program to be delivered over a CATV hybrid fiber coaxial cable system or said satellite downlink or via a digital subscriber line local loop, and generating and sending appropriate control data to an appropriate one of said external network interface circuits to cause the requested data or video broadcast or video-on-demand program to be received.

12. The apparatus of claim 8 wherein said one or more external network interface circuits further comprises a digital subscriber line modem.

13. The apparatus of claim 8 wherein said one or more external network interface circuits further comprises a conventional POTS line fax and/or data modem.

14. The apparatus of claim 1 wherein said one or more external network interface circuits further comprises an internet packet telephony circuit to interface said gateway to plain old telephone service and/or digital subscriber line phone lines from a public service telephone network central office.

15. The apparatus of claim 8 wherein said one or more external network interface circuits further comprises a private branch exchange (PBX) telephony circuit for interfacing said gateway to one or more plain old telephone service (POTS) telephone lines which are internal or external to said customer premises and/or one or more digital subscriber line (DSL) modems coupled to a public service telephone network central office, said PBX telephony circuit including a switch controlled by a plurality of processes controlling said host computer to implement PBX telephony functions for line devices such as telephones coupled to said one or more POTS or DSL lines or to said local area network, said processes including a PBX application process, one or more processes implementing a telephone application programmatic interface (TAPI) dynamic linked library and a PBX card driver process.

16. The apparatus of claim 8 wherein said DOCSIS cable modem is compatible with any DOCSIS national standard for cable modems as of the filing date of the parent patent application of this patent application.

17. The apparatus of claim 8 wherein said one or more external network interface circuits comprises a digital video receiver for interfacing said gateway to a CATV hybrid fiber coaxial cable system connection, said receiver capable of receiving and demodulating and recovering digitized, compressed broadcast video or video-on-demand program data in an MPEG transport stream modulated onto a downstream carrier and requested by a device coupled to one or more of said local area networks or busses, and said digital video receiver also structured to demultiplex desired audio and video component data of said MPEG transport stream and transmitting said recovered component data to said IP packetization process.

18. The apparatus of claim 8 wherein said one or more external network interface circuits comprises a receiver for interfacing said gateway to a CATV hybrid fiber coaxial (HFC) cable system connection, said receiver capable of receiving analog video signals on said HFC requested by a device coupled to one or more of said local area networks or buses and digitizing and demodulate said analog video signals to generate uncompressed digital video program data and then encoding the resulting uncompressed video program data into a format in which said video program data can be compressed, and then compressing said video program data into MPEG packets and transmitting said MPEG packet to said IP packetization process.

19. The apparatus of claim 8 wherein said one or more external network interface circuits comprises a receiver for interfacing said gateway to a satellite dish and receiving compressed digital data of an MPEG transport stream and encoding a regularly scheduled television program and modulated onto a downlink carrier, said television program being requested by a device coupled to one or more of said local area networks or buses and demodulating and recovering said MPEG transport stream digital data and transport demultiplexing said MPEG transport stream to extract MPEG packets encoding audio and video data components of said requested television program therefrom and transmitting said recovered audio and video data components to said IP packetization process.

20. The apparatus of claim 8 wherein said one or more external network interface circuits comprises a receiver for interfacing said gateway to a satellite dish and receiving compressed digital data of an MPEG transport stream encoding a requested video-on-demand television program modulated onto a downlink carrier and requested by a device coupled to one or more of said local area networks or buses, and demodulating and recovering digital data of said MPEG transport stream and transport demultiplexing said MPEG transport stream to extract MPEG packets encoding audio and video data components of said requested video-on-demand television program therefrom and transmitting said recovered audio and video data components to said IP packetization process.

21. The apparatus of claim 1 wherein said one or more external network interface circuits comprises a receiver for interfacing said gateway to a satellite dish and receiving analog regularly scheduled television programs modulated onto a downlink carrier requested by a device coupled to said local area network and demodulating and digitizing said television signals and encoding the digital data into a format that can be compressed and compressing said digital data and transmitting said compressed digital data via said host bus to said IP packetization process.

22. The apparatus of claim 8 wherein said one or more external network interface circuits comprises a wideband receiver for interfacing said gateway to a satellite dish and receiving digital data encoding a web page or other information from a server on a wide area network such as the internet said web page or other information being encapsulated into internet protocol packets (hereafter IP packets) and requested by a device coupled to one or more of said local area networks or buses of said gateway, and that have said IP packets having been modulated onto a downlink carrier broadcast from said satellite, and said wideband receiver structured to demodulate and recover said IP packets and transmitting said IP packets via said host bus to said routing process.

23. The apparatus of claim 8 wherein said one or more external network interface circuits comprises a receiver for interfacing said gateway to a conventional terrestial broadcast television antenna and receiving a regularly scheduled television program signal requested by a device coupled to said local area network and modulated onto a terrestial broadcast carrier and demodulating and digitizing said signals to generate digital data, and encoding digital data into a format that can be compressed and compressing said digital data and transmitting said compressed digital data to said IP packetization process.

24. A gateway apparatus comprising:

a host bus;

a plurality of expansion connectors electrically coupled to said host bus;

one or more expansion modules coupled to said host bus through one or more of said expansion connectors, each expansion module including the appropriate circuitry to interface with an external network medium comprised of either a hybrid fiber coaxial cable of a CATV system, a digital subscriber line local loop, an analog plain old telephone service line or a satellite dish or an antenna;

one or more network interface adapters for coupling said gateway to one or more local area networks or busses which convey digital data to one or more items of customer premises equipment;

a host computer having a central processing unit or microprocessor coupled to said host bus and programmed to perform at least a management and control process to receive requests transmitted from said one or more items of customer premises equipment to said gateway via one or more of said local area networks or buses for data or video or audio programs and to react thereto by appropriately controlling said one or more expansion modules to retrieve the requested data or video or audio program, and programmed to perform an IP packetization process to receive downstream digital data from one or more of said expansion modules which is not already in IP packet form and data from said management and control process and encapsulate said data into internet protocol packets addressed to the customer premises equipment and one or more processes running on customer premises equipment which requested said data, and said host computer further programmed to perform a routing process to do all packetization, protocol conversion and routing functions necessary to route packets between any of said expansion modules and any of said one or more local area networks and/or busses.

* * * * *